(12) United States Patent
Fleizach et al.

(10) Patent No.: US 10,466,883 B2
(45) Date of Patent: Nov. 5, 2019

(54) SCREENREADER USER INTERFACE

(71) Applicant: Apple Inc., Cupertino, CA (US)

(72) Inventors: Christopher Fleizach, Morgan Hill, CA (US); Eric T. Seymour, San Jose, CA (US); Aaron Everitt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 854 days.

(21) Appl. No.: 14/839,894

(22) Filed: Aug. 28, 2015

(65) Prior Publication Data

US 2016/0259535 A1 Sep. 8, 2016

Related U.S. Application Data

(60) Provisional application No. 62/127,285, filed on Mar. 2, 2015.

(51) Int. Cl.
*G06F 3/048* (2013.01)
*G06F 3/0484* (2013.01)
(Continued)

(52) U.S. Cl.
CPC .......... *G06F 3/04847* (2013.01); *G06F 1/163* (2013.01); *G06F 3/0362* (2013.01);
(Continued)

(58) Field of Classification Search
CPC .... G06F 9/451; G06F 3/0488; G06F 3/04883; G06F 3/016; G06F 1/1643; G06F 3/0481
See application file for complete search history.

(56) References Cited

U.S. PATENT DOCUMENTS 6,266,098 B1 7/2001 Cove et al.
6,323,846 B1 11/2001 Westerman et al.
(Continued)

FOREIGN PATENT DOCUMENTS

EP 1052566 A1 11/2000
EP 1832969 A2 9/2007
(Continued)

OTHER PUBLICATIONS

International Search Report and Written Opinion received for PCT Patent Application No. PCT/US2015/054974, dated Apr. 20, 2016, 20 pages.
(Continued)

*Primary Examiner* — Haoshian Shih
(74) *Attorney, Agent, or Firm* — Dentons US LLP

(57) ABSTRACT

The present disclosure relates to screenreader techniques and volume control techniques for electronic devices. In some embodiments, a device displays a plurality of user interface objects in an ordered progression. A rotation of a rotary input mechanism is detected. In response to the rotation of the rotary input mechanism, if a rotary screenreader navigation mode is activated, a visual highlight is displayed and an auditory output is produced. In some embodiments, a device has a volume setting. A gesture is detected, and a volume adjustment mode is activated. The gesture ends with a contact being maintained, and the volume setting is adjusted in accordance with detected movement of the contact.

60 Claims, 43 Drawing Sheets

(51) Int. Cl.
| | |
|---|---|
| *G06F 1/16* | (2006.01) |
| *G06F 3/0362* | (2013.01) |
| *G06F 3/0482* | (2013.01) |
| *G06F 3/0488* | (2013.01) |
| *G06F 3/16* | (2006.01) |
| *G06F 3/0485* | (2013.01) |
| *G09B 21/00* | (2006.01) |
| *G10L 13/00* | (2006.01) |

(52) U.S. Cl.
CPC .......... *G06F 3/0482* (2013.01); *G06F 3/0485* (2013.01); *G06F 3/04883* (2013.01); *G06F 3/165* (2013.01); *G06F 3/167* (2013.01); *G09B 21/006* (2013.01); *G06F 2203/04806* (2013.01); *G06F 2203/04808* (2013.01); *G10L 13/00* (2013.01)

(56) References Cited

U.S. PATENT DOCUMENTS

| | | | |
|---|---|---|---|
| 6,556,222 | B1 | 4/2003 | Narayanaswami |
| 6,570,557 | B1 | 5/2003 | Westerman et al. |
| 6,661,438 | B1 | 12/2003 | Shiraishi et al. |
| 6,662,023 | B1 | 12/2003 | Helle |
| 6,677,932 | B1 | 1/2004 | Westerman |
| 6,809,724 | B1 | 10/2004 | Shiraishi et al. |
| 6,889,337 | B1 | 5/2005 | Yee |
| 7,081,905 | B1 | 7/2006 | Raghunath |
| 7,130,664 | B1 | 10/2006 | Williams |
| 7,484,174 | B2 | 1/2009 | Alderson |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,050,997 | B1 | 11/2011 | Nosek et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 8,543,081 | B2 | 9/2013 | Scott et al. |
| 8,613,070 | B1 | 12/2013 | Borzycki et al. |
| 8,666,361 | B2 | 3/2014 | Chu et al. |
| 8,675,084 | B2 | 3/2014 | Bolton et al. |
| 2002/0015024 | A1 | 2/2002 | Westerman et al. |
| 2004/0070612 | A1* | 4/2004 | Sinclair ................. G06F 9/451 715/762 |
| 2005/0001821 | A1 | 1/2005 | Low |
| 2005/0187873 | A1 | 8/2005 | Labrou et al. |
| 2005/0191159 | A1 | 9/2005 | Benko |
| 2006/0017692 | A1 | 1/2006 | Wehrenberg et al. |
| 2006/0026536 | A1 | 2/2006 | Hotelling et al. |
| 2006/0033724 | A1 | 2/2006 | Chaudhri et al. |
| 2006/0150084 | A1 | 7/2006 | Dietl et al. |
| 2006/0150110 | A1 | 7/2006 | Dietl et al. |
| 2006/0197753 | A1 | 9/2006 | Hotelling |
| 2006/0294025 | A1 | 12/2006 | Mengerink |
| 2007/0135043 | A1 | 6/2007 | Hayes et al. |
| 2008/0320391 | A1 | 12/2008 | Lemay et al. |
| 2009/0036165 | A1 | 2/2009 | Brede |
| 2009/0199130 | A1 | 8/2009 | Tsern et al. |
| 2009/0205041 | A1 | 8/2009 | Michalske |
| 2009/0244015 | A1 | 10/2009 | Sengupta et al. |
| 2010/0082481 | A1 | 4/2010 | Lin et al. |
| 2010/0223145 | A1 | 9/2010 | Dragt |
| 2010/0267362 | A1 | 10/2010 | Smith et al. |
| 2010/0309147 | A1* | 12/2010 | Fleizach ............. G06F 3/04883 345/173 |
| 2011/0022472 | A1 | 1/2011 | Zon et al. |
| 2011/0088086 | A1 | 4/2011 | Swink et al. |
| 2011/0251892 | A1 | 10/2011 | Laracey et al. |
| 2012/0011437 | A1* | 1/2012 | James ................... G06F 1/1643 715/702 |
| 2012/0089507 | A1 | 4/2012 | Zhang et al. |
| 2012/0159380 | A1 | 6/2012 | Kocienda et al. |
| 2012/0197743 | A1 | 8/2012 | Grigg et al. |
| 2012/0258684 | A1 | 10/2012 | Franz et al. |
| 2012/0290449 | A1 | 11/2012 | Mullen et al. |
| 2012/0310760 | A1 | 12/2012 | Phillips et al. |
| 2012/0322370 | A1 | 12/2012 | Lee |
| 2012/0322371 | A1 | 12/2012 | Lee |
| 2013/0063364 | A1 | 3/2013 | Moore |
| 2013/0063389 | A1 | 3/2013 | Moore |
| 2013/0085931 | A1 | 4/2013 | Runyan |
| 2013/0097566 | A1 | 4/2013 | Berglund |
| 2013/0103519 | A1 | 4/2013 | Kountotsis et al. |
| 2013/0110719 | A1 | 5/2013 | Carter et al. |
| 2013/0143512 | A1 | 6/2013 | Hernandez et al. |
| 2013/0225118 | A1 | 8/2013 | Jang et al. |
| 2013/0244615 | A1 | 9/2013 | Miller et al. |
| 2013/0295872 | A1 | 11/2013 | Guday et al. |
| 2013/0304651 | A1 | 11/2013 | Smith et al. |
| 2013/0332358 | A1 | 12/2013 | Zhao |
| 2013/0332364 | A1 | 12/2013 | Templeton et al. |
| 2013/0332827 | A1* | 12/2013 | Smith ..................... G06F 3/016 715/702 |
| 2014/0028735 | A1 | 1/2014 | Williams et al. |
| 2014/0058733 | A1 | 2/2014 | Voorhees et al. |
| 2014/0058935 | A1 | 2/2014 | Mijares |
| 2014/0068751 | A1 | 3/2014 | Last et al. |
| 2014/0074716 | A1 | 3/2014 | Ni |
| 2014/0101056 | A1 | 4/2014 | Wendling |
| 2014/0122331 | A1 | 5/2014 | Vaish et al. |
| 2014/0129441 | A1 | 5/2014 | Blanco et al. |
| 2014/0143145 | A1 | 5/2014 | Kortina et al. |
| 2014/0143737 | A1 | 5/2014 | Mistry et al. |
| 2014/0155031 | A1 | 6/2014 | Lee et al. |
| 2014/0279442 | A1 | 9/2014 | Luoma et al. |
| 2014/0279556 | A1 | 9/2014 | Priebatsch et al. |
| 2014/0365977 | A1* | 12/2014 | Elyada ................. G06F 3/0488 715/863 |

FOREIGN PATENT DOCUMENTS

| | | |
|---|---|---|
| EP | 2551784 A1 | 1/2013 |
| EP | 2725537 A1 | 4/2014 |
| EP | 2733598 A2 | 5/2014 |
| JP | 55-80084 A | 6/1980 |
| TW | I244040 B | 11/2005 |
| TW | I305518 B | 1/2009 |
| TW | 201349078 A | 12/2013 |
| WO | 2005/109829 A1 | 11/2005 |
| WO | 2006/037545 A2 | 4/2006 |
| WO | 2010/039337 A2 | 4/2010 |
| WO | 2013/023224 A2 | 2/2013 |
| WO | 2013/097895 A1 | 7/2013 |
| WO | 2013/135270 A1 | 9/2013 |
| WO | 2013/169842 A2 | 11/2013 |
| WO | 2014/040675 A2 | 3/2014 |
| WO | 2014/078965 A1 | 5/2014 |

OTHER PUBLICATIONS

International Preliminary Report on Patentability received for PCT Patent Application No. PCT/US2015/054974, dated Sep. 14, 2017, 14 pages.
"iPhone User Guide for iOS 7.1 Software", Mar. 2014, pp. 1-162.
Mark Gurman, "Apple Watch iPhone 'Companion' app Revealed w/ New Watch features, Monograms", Jan. 13, 2015, pp. 1-18.
Invitation to pay additional fees received for PCT Patent Application No. PCT/US2015/054974, dated Feb. 12, 2016, 7 pages.
Final Office Action received for U.S. Appl. No. 14/503,072, dated Sep. 1, 2015, 16 pages.
Non Final Office Action received for U.S. Appl. No. 14/503,072, dated Jan. 26, 2015, 12 pages.
Non Final Office Action received for U.S. Appl. No. 14/503,296, dated Jan. 30, 2015, 16 pages.

(56) References Cited

OTHER PUBLICATIONS

Non-Final Office Action received for U.S. Appl. No. 14/503,372, dated Dec. 5, 2014, 11 pages.
Non-Final Office Action received for U.S. Appl. No. 14/503,381, dated May 13, 2015, 13 pages.
Non-Final Office Action received for U.S. Appl. No. 14/599,425, dated Mar. 17, 2015, 16 pages.
Office Action received for Australian Patent Application No. 2015100734, dated Jul. 29, 2015, 5 pages.
Kamijo, Noboru, "Next Generation Mobile System—WatchPad1. 5", Available at "http://researcher.ibm.com/researcher/view_group_subpage.php?id=5617", retrieved on Jul. 4, 2015, 2 pages.
Lemay et al., U.S. Appl. No. 60/936,562, filed Jun. 20, 2007, titled "Portable Multifunction Device, Method, and Graphical User Interface for Playing Online Videos", 61 pages.
NDTV, "Sony SmartWatch 2 Launched in India for Rs. 14,990", available at "http://gadgets.ndtv.com/others/news/sony-smartwatch-2-launched-in-india-for-rs-14990-420319", Sep. 18, 2013, 4 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.
International Search Report and Written Opinion received for PCT Patent Application No. PCT/US2015/019321, dated Jun. 3, 2015, 11 pages.
Apple, "iPhone User's Guide", 2007, 137 pages.
"i Phone User Guide for iOS 7.1 Software", available online at <https://manuals.info.apple.com/MANUALS/1000/MA1681/en_US/iphone_ios7_user_guide.pdf> retrived on Aug. 10, 2015, 162 pages.
Headset Button Controller v7.3 APK Full APP Download for Andriod, Blackberry, iPhone, Jan. 27, 2014, 11 pages.
Colt, Sam, "Here's One Way Apple's Smartwatch Could Be Better Than Anything Else", Business Insider, Aug. 21, 2014, pp. 1-4.
International Search Report and Written Opinion received for PCT Patent Application No. PCT/US2015/019322, dated Jun. 18, 2015, 16 pages.
Final Office Action received for U.S. Appl. No. 14/503,296, dated Jul. 2, 2015, 7 pages.
Yang et al., U.S. Appl. No. 62/006,211, filed Jun. 1, 2014, titled "Displaying Options, Assigning Notification, Ignoring Messages, and Simultaneous User Interface Displays in a Messaging Application", 254 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/019298, dated Jul. 13, 2015, 17 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2015/032474, dated Aug. 19, 2015, 8 pages.
International Search Report and Written Opinion received for PCT Patent Application No. PCT/US2015/019317, dated Aug. 25, 2015, 24 pages.
Fuji Film, "Taking Pictures Remotely : Free iPhone/Android App Fuji Film Camera Remote", Available at <http://app.fujifilm-dsc.com/en/camera_remote/guide05.html>, Apr. 22, 2014, 3 pages.
PlayMemories Camera Apps, "PlayMemories Camera Apps Help Guide", Available at <https://www.playmemoriescameraapps.com/portal/manual/IS9104-NPIA09014_00-F00002/en/index.html>, 2012, 3 pages.
Techsmith, "Snag it 11—Snagit 11.4 Help", Available at <http://assets.techsmith.com/Downloads/ua-tutorials-snagit-11/Snagit_11.pdf>, Jan. 2014, 146 pages.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
"Kinect Gesture Commands—Kinect Voice Commands", Xbox Wire, 2 pages.
Chan, Christine, "Handoff Your Browser to Your iPhone or iPad! Plus a Chance to Win a Copy!", Appadvice, 2 pages.
Frakes, Dan, "How to Get Started with Airplay", Macworld, May 2013, 8 pages.
Shankland, Stephen, "Chrome OS Gets 'OK Google' Voice Search Control", available online at http://www.cnet.com/news/chrome-os-gets-ok-google-voice-search-control/, May 21, 2014, 4 page.
Notice of Allowance received for Taiwanese Patent Application No. 104135930, dated Nov. 9, 2016, 4 pages (1 page of English Translation of Search Report and 3 pages of Official Copy).

\* cited by examiner

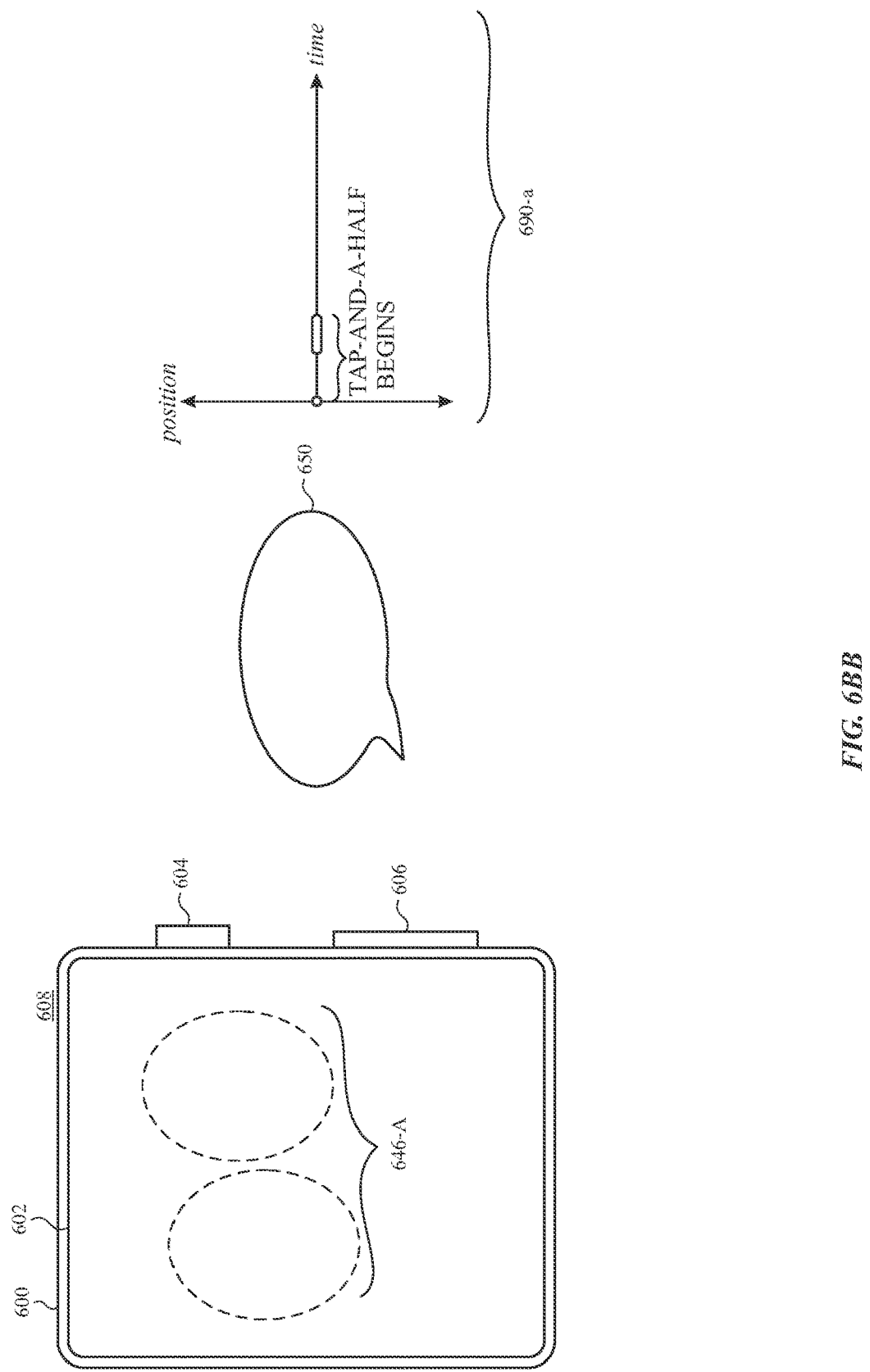

SCREENREADER USER INTERFACE

RELATED APPLICATIONS

This application claims benefit of U.S. Provisional Patent Application No. 62/127,285, entitled "Screenreader User Interface," filed on Mar. 2, 2015 of which is hereby incorporated by reference in its entirety.

FIELD

The present disclosure relates generally to computer user interfaces, and more specifically to techniques for navigating or configuring a user screenreader interface.

BACKGROUND

Users who are blind or have low vision may have difficulty using electronic devices with touch-sensitive surfaces, particularly when interaction with affordances displayed on a touch-sensitive display is required. Such users may require techniques for navigating between and selecting various options through touch interfaces. Users who are blind or have low vision may benefit from special user interfaces to aid them in efficiently and effectively using electronic devices.

BRIEF SUMMARY

Some techniques for providing, configuring, and/or navigating blind/low-vision user interfaces are generally cumbersome and inefficient. For example, existing techniques use a complex and time-consuming user interface, which can include multiple key presses, keystrokes, or gestures. Some techniques for navigating blind/low-vision user interfaces require repeatedly occluding the screen to use touch gestures to navigate between displayed options. Other techniques require complex menu navigation to adjust volume settings for blind/low-vision user interfaces, or require dedicated hardware buttons to control volume. Existing techniques require more time than necessary, wasting user time and device energy. This latter consideration is particularly important in battery-operated devices.

Accordingly, there is a need for electronic devices with faster, more efficient methods and interfaces for providing, configuring, and/or navigating blind/low-vision user interfaces. Specifically, there is a need for improved methods for navigating blind/low-vision user interfaces, including methods for navigating displayed and undisplayed options using various input gestures and controls. Such methods and interfaces optionally complement or replace other methods for providing, configuring, and/or navigating blind/low-vision user interfaces. Such methods and interfaces reduce the cognitive burden on a user and produce a more efficient human-machine interface, including by providing gestures that are location-independent, providing gestures that are unlikely to be entered accidentally, and providing gestures configured to be efficiently and comfortably entered on devices with small screens and/or small touch-sensitive surfaces. For battery-operated computing devices, such methods and interfaces conserve power and increase the time between battery charges.

There is also a need for electronic devices with faster, more efficient methods and interfaces for accessing and manipulating volume controls on electronic devices, including volume controls for blind/low-vision user interfaces. Such methods and interfaces optionally complement or replace other methods for accessing and manipulating volume controls on electronic devices, including volume controls for blind/low-vision user interfaces. Such methods and interfaces reduce the cognitive burden on a user and produce a more efficient human-machine interface, including by providing a location independent gesture for accessing volume, and providing a volume-control technique that dynamically provides auditory output, both of which are particularly important for users who rely on auditory output as a primary means of interacting with a device. For battery-operated computing devices, such methods and interfaces conserve power and increase the time between battery charges.

The above deficiencies and other problems are reduced or eliminated by the disclosed devices, methods, and computer-readable media. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has hardware input mechanisms such as depressible buttons and/or rotatable input mechanisms. In some embodiments, the device has a graphical user interface (GUI), one or more processors, memory, and one or more modules, programs, or sets of instructions stored in the memory for performing multiple functions. In some embodiments, the user interacts with the GUI through finger contacts and gestures on the touch-sensitive surface and/or through rotating the rotatable input mechanism and/or through depressing hardware buttons. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In accordance with some embodiments, a method is performed at an electronic device having a display, an audio output part, and a rotary input mechanism. The method includes displaying, on the display, a plurality of user interface objects in an ordered progression; displaying a visual highlight associated with a first user interface object of the plurality of interface objects and producing auditory output associated with the first user interface object; detecting rotation of the rotary input mechanism in a first rotational direction; and in response to detecting rotation of the rotary input mechanism in the first rotational direction: if a rotary navigation mode is activated, displaying a visual highlight associated with a second user interface object of the plurality of user interface objects and producing auditory output associated with the second user interface object, wherein the second user interface object follows the first user interface object in the ordered progression, and if a rotary navigation mode is not activated, forgoing displaying a visual highlight associated with the second user interface object and forgoing producing auditory output associated with the second user interface object.

In accordance with some embodiments, a method is performed at a device with a touch-sensitive surface. The method includes detecting a gesture corresponding to an instruction to activate a volume adjustment mode, wherein a location of the gesture is not associated with a volume-control object displayed before detection of the gesture, and the gesture comprises a contact; in response to detecting the gesture, activating the volume adjustment mode; and while the volume adjustment mode is active: detecting movement of the contact, wherein the movement has a component along a predefined axis of the touch-sensitive surface; and adjusting a volume setting of the device in accordance with a magnitude of the component.

In accordance with some embodiments, a non-transitory computer-readable storage medium stores one or more programs, the one or more programs comprising instructions which when executed by a portable multifunction device with a display, an audio output part, and a rotatable input mechanism, cause the device to: display, on the display, a plurality of user interface objects in an ordered progression; display a visual highlight associated with a first user interface object of the plurality of interface objects and producing auditory output associated with the first user interface object; detect rotation of the rotary input mechanism in a first rotational direction; and in response to detecting rotation of the rotary input mechanism in the first rotational direction: if a rotary navigation mode is activated, display a visual highlight associated with a second user interface object of the plurality of user interface objects and produce auditory output associated with the second user interface object, wherein the second user interface object follows the first user interface object in the ordered progression, if a rotary navigation mode is not activated, forgo displaying a visual highlight associated with the second user interface object and forgo producing auditory output associated with the second user interface object.

In accordance with some embodiments, a transitory computer-readable storage medium stores one or more programs, the one or more programs comprising instructions, which when executed by a portable multifunction device with a display, an audio output part, and a rotatable input mechanism, cause the device to: display, on the display, a plurality of user interface objects in an ordered progression; display a visual highlight associated with a first user interface object of the plurality of interface objects and producing auditory output associated with the first user interface object; detect rotation of the rotary input mechanism in a first rotational direction; and in response to detecting rotation of the rotary input mechanism in the first rotational direction: if a rotary navigation mode is activated, display a visual highlight associated with a second user interface object of the plurality of user interface objects and produce auditory output associated with the second user interface object, wherein the second user interface object follows the first user interface object in the ordered progression, if a rotary navigation mode is not activated, forgo displaying a visual highlight associated with the second user interface object and forgo producing auditory output associated with the second user interface object.

In accordance with some embodiment, a device includes a display; an audio output part; a rotary input mechanism; one or more processors; and memory storing instructions that, when executed by the one or more processors, cause the device to: display, on the display, a plurality of user interface objects in an ordered progression; display a visual highlight associated with a first user interface object of the plurality of interface objects and producing auditory output associated with the first user interface object; detect rotation of the rotary input mechanism in a first rotational direction; and in response to detecting rotation of the rotary input mechanism in the first rotational direction: if a rotary navigation mode is activated, display a visual highlight associated with a second user interface object of the plurality of user interface objects and produce auditory output associated with the second user interface object, wherein the second user interface object follows the first user interface object in the ordered progression, if a rotary navigation mode is not activated, forgo displaying a visual highlight associated with the second user interface object and forgo producing auditory output associated with the second user interface object.

In accordance with some embodiments, a device comprises means for displaying a plurality of user interface objects in an ordered progression; means for displaying a visual highlight associated with a first user interface object of the plurality of interface objects and producing auditory output associated with the first user interface object; means for detecting rotation of a rotary input mechanism in a first rotational direction; and means for, in response to detecting rotation of the rotary input mechanism in the first rotational direction: if a rotary navigation mode is activated, displaying a visual highlight associated with a second user interface object of the plurality of user interface objects and producing auditory output associated with the second user interface object, wherein the second user interface object follows the first user interface object in the ordered progression, if a rotary navigation mode is not activated, forgoing displaying a visual highlight associated with the second user interface object and forgoing producing auditory output associated with the second user interface object.

In accordance with some embodiments, a non-transitory computer-readable storage medium stores one or more programs, the one or more programs comprising instructions which when executed by a portable multifunction device with a touch-sensitive surface cause the device to: detect a gesture corresponding to an instruction to activate a volume adjustment mode, wherein a location of the gesture is not associated with a volume-control object displayed before detection of the gesture, and the gesture comprises a contact; in response to detecting the gesture, activate the volume adjustment mode; and while the volume adjustment mode is active: detect movement of the contact, wherein the movement has a component along a predefined axis of the touch-sensitive surface; and adjust a volume setting of the device in accordance with a magnitude of the component.

In accordance with some embodiments, a transitory computer-readable storage medium stores one or more programs, the one or more programs comprising instructions which when executed by a portable multifunction device with a touch-sensitive surface: cause the device to: detect a gesture corresponding to an instruction to activate a volume adjustment mode, wherein a location of the gesture is not associated with a volume-control object displayed before detection of the gesture, and the gesture comprises a contact; in response to detecting the gesture, activate the volume adjustment mode; and while the volume adjustment mode is active: detect movement of the contact, wherein the movement has a component along a predefined axis of the touch-sensitive surface; and adjust a volume setting of the device in accordance with a magnitude of the component.

In accordance with some embodiments, a device includes a touch-sensitive surface; one or more processors; and memory storing instructions that, when executed by the one or more processors, cause the device to: detect a gesture corresponding to an instruction to activate a volume adjustment mode, wherein a location of the gesture is not associated with a volume-control object displayed before detection of the gesture, and the gesture comprises a contact; in response to detecting the gesture, activate the volume adjustment mode; and while the volume adjustment mode is active: detect movement of the contact, wherein the movement has a component along a predefined axis of the touch-sensitive surface; and adjust a volume setting of the device in accordance with a magnitude of the component.

In accordance with some embodiments, a device includes means for detecting a gesture corresponding to an instruction to activate a volume adjustment mode, wherein a location of the gesture is not associated with a volume-control object displayed before detection of the gesture, and the gesture comprises a contact; means for, in response to detecting the gesture, activating the volume adjustment mode; and means for, while the volume adjustment mode is active: detecting movement of the contact, wherein the movement has a component along a predefined axis of the touch-sensitive surface; and adjusting a volume setting of the device in accordance with a magnitude of the component.

In accordance with some embodiments, an electronic device includes a display unit; an auditory output unit; a rotary input unit; and a processing unit coupled to the display unit, the auditory output unit, and the rotary input unit. The processing unit configured to enable displaying, on the display unit, a plurality of user interface objects in an ordered progression; enable displaying a visual highlight associated with a first user interface object of the plurality of interface objects and enable producing auditory output associated with the first user interface object; detect rotation of the rotary input unit in a first rotational direction; and in response to detecting rotation of the rotary input unit in the first rotational direction: if a rotary navigation mode is activated, enable displaying a visual highlight associated with a second user interface object of the plurality of user interface objects and enable producing auditory output associated with the second user interface object, wherein the second user interface object follows the first user interface object in the ordered progression, and if a rotary navigation mode is not activated, forgo enabling displaying a visual highlight associated with the second user interface object and forgo enabling producing auditory output associated with the second user interface object.

In accordance with some embodiments, an electronic device includes a touch-sensitive surface unit, and a processing unit coupled to the touch-sensitive surface unit. The processing unit configured to: detect a gesture corresponding to an instruction to activate a volume adjustment mode, wherein a location of the gesture is not associated with a volume-control object displayed before detection of the gesture, and the gesture comprises a contact; in response to detecting the gesture, activate the volume adjustment mode; and while the volume adjustment mode is active: detect movement of the contact, wherein the movement has a component along a predefined axis of the touch-sensitive surface; and adjust a volume setting of the device in accordance with a magnitude of the component.

Thus, devices are provided with faster, more efficient methods and interfaces for providing, configuring, and/or navigating blind/low-vision user interfaces, thereby increasing the effectiveness, efficiency, and user satisfaction with such devices. Such methods and interfaces optionally complement or replace other methods for providing, configuring, and/or navigating blind/low-vision user interfaces.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
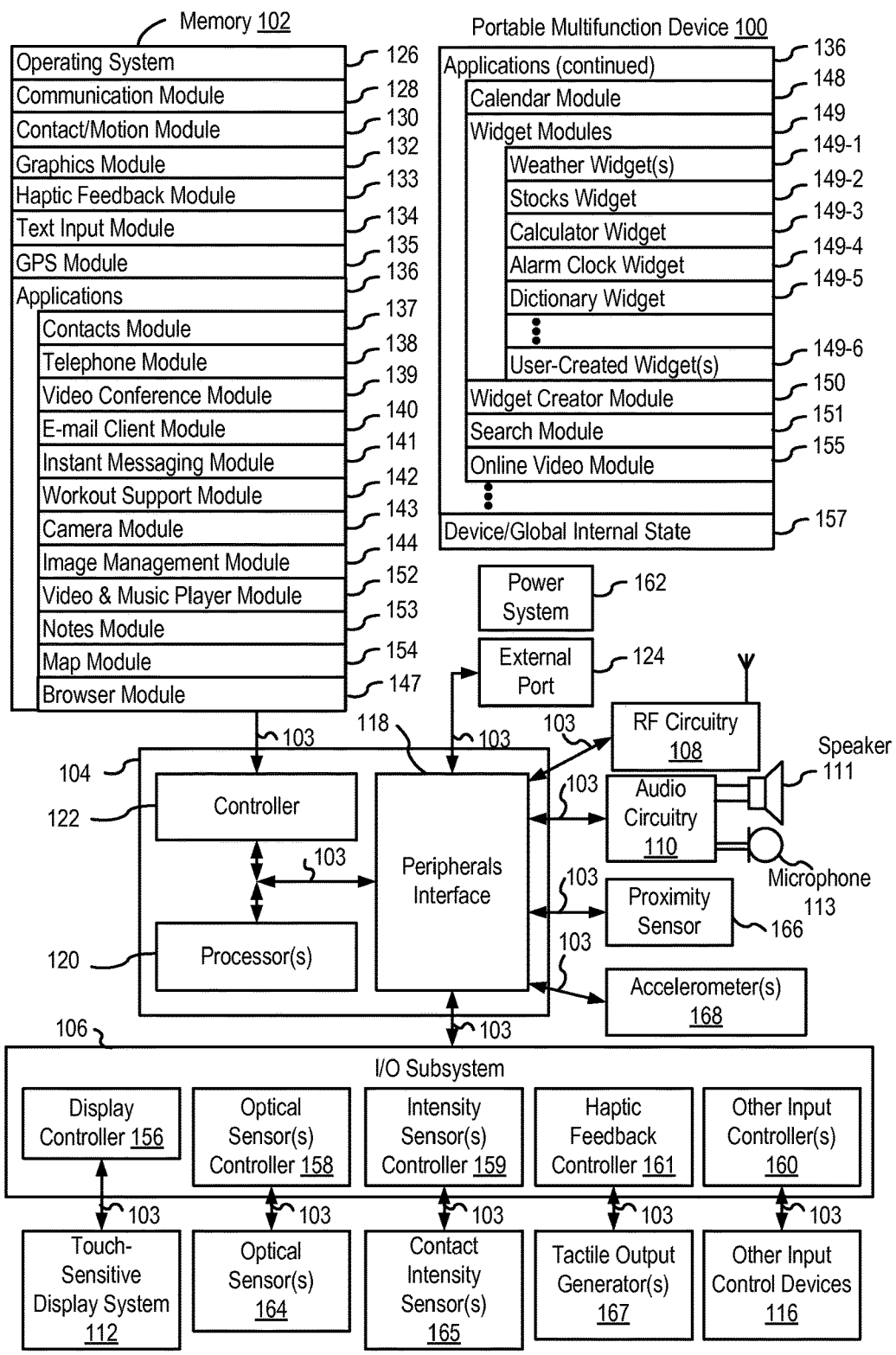
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for providing, configuring, and/or navigating blind/low-vision user interfaces. The embodiments described herein improve on current methods by allowing for efficient, convenient, fast, and intuitive ways to activate, configure, and use a blind/low-vision user interface, and to control volume settings for an electronic device and/or for a blind/low-vision user interface. Such techniques can reduce the cognitive burden on a user who access event notifications, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for providing, configuring, and/or navigating blind/low-vision user interfaces. FIGS. 6A-6EE illustrate exemplary user interfaces. The user interfaces in the figures are also used to illustrate the processes described below, including the processes in FIGS. 7A-7G and 8A-7B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes one or more computer-readable storage mediums. The computer-readable storage mediums are optionally tangible and non-transitory. Memory 102 optionally includes one or more computer-readable storage mediums. The computer-readable storage mediums are optionally transitory. The computer-readable storage mediums are optionally transitory. Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
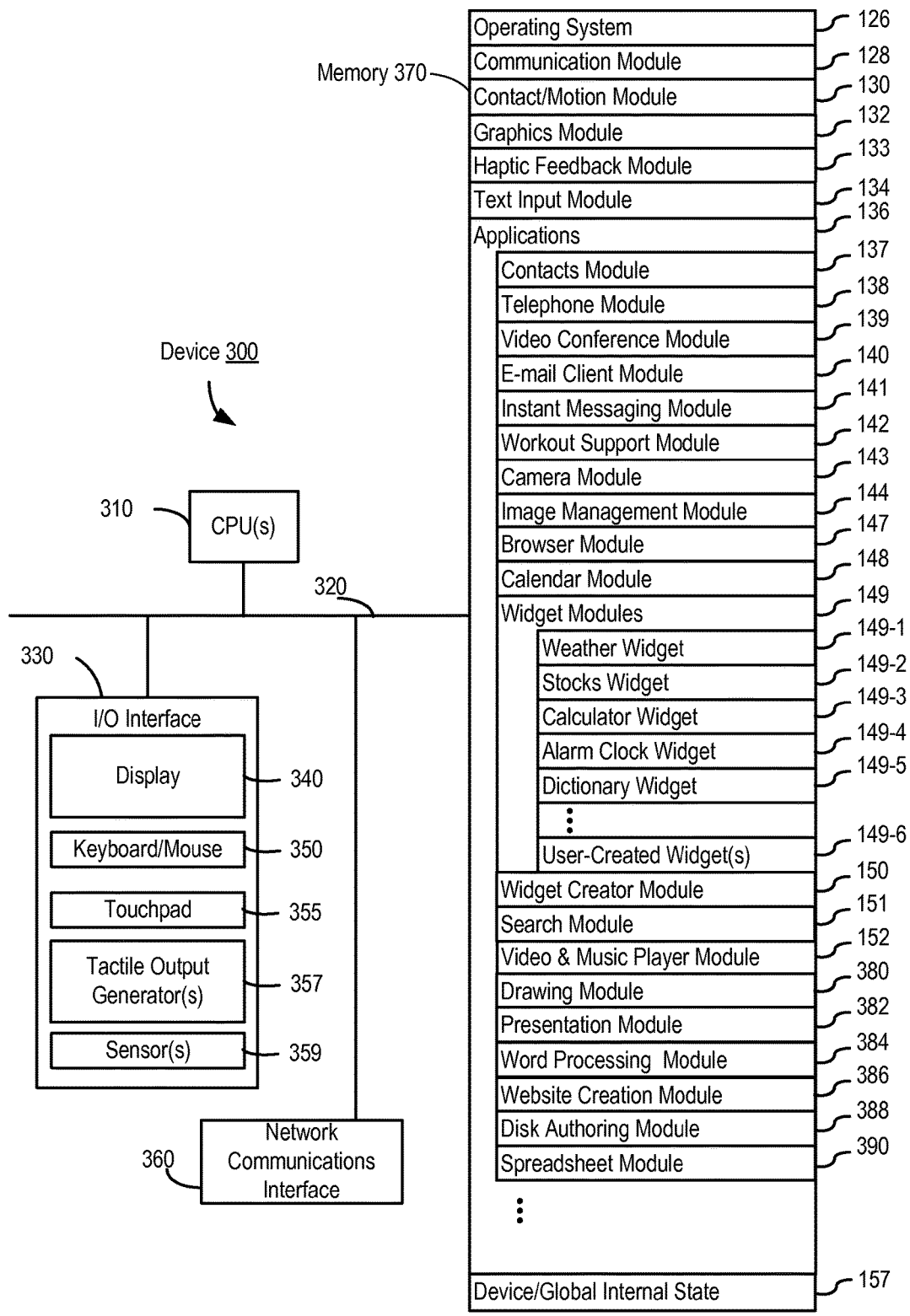
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
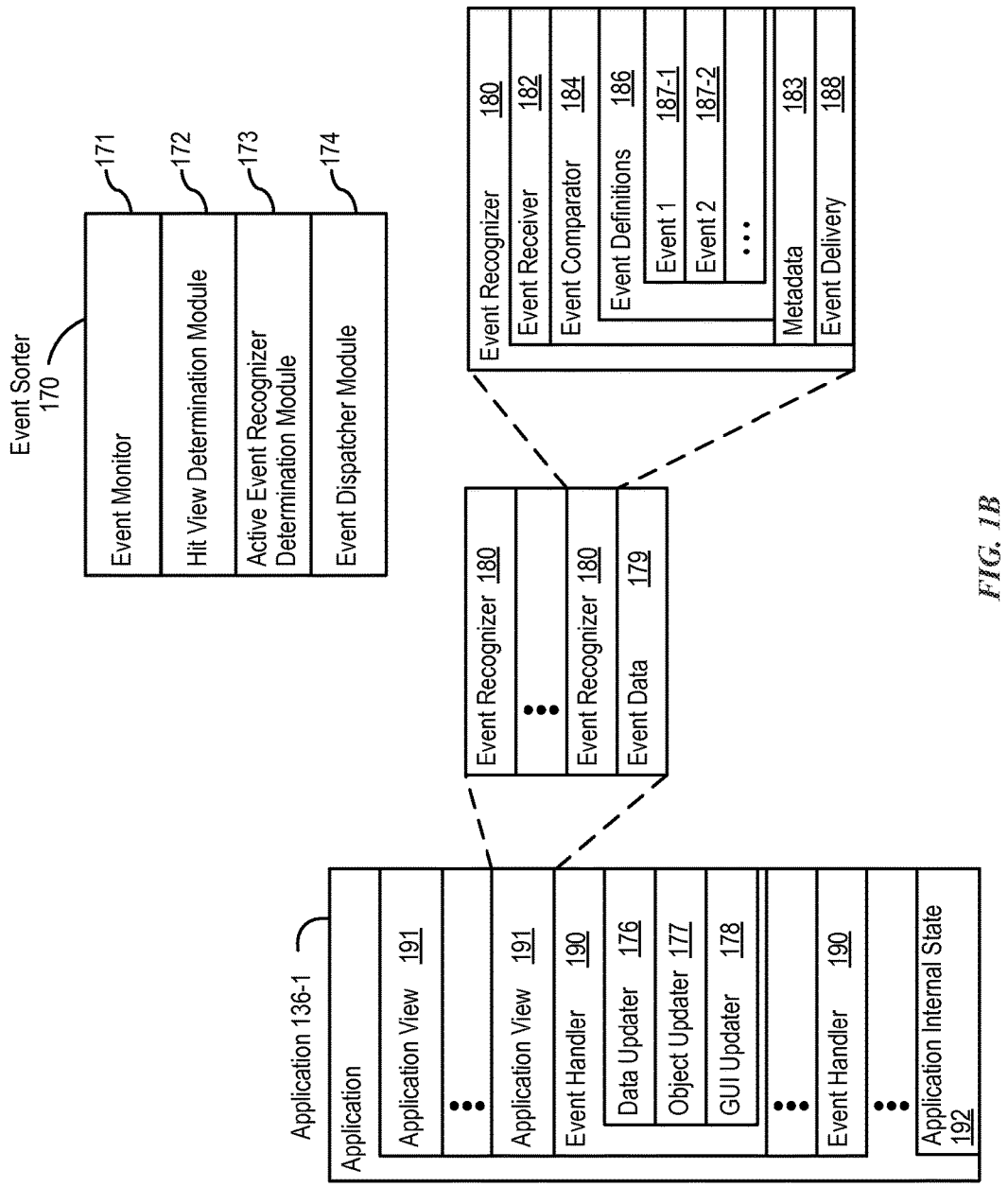
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
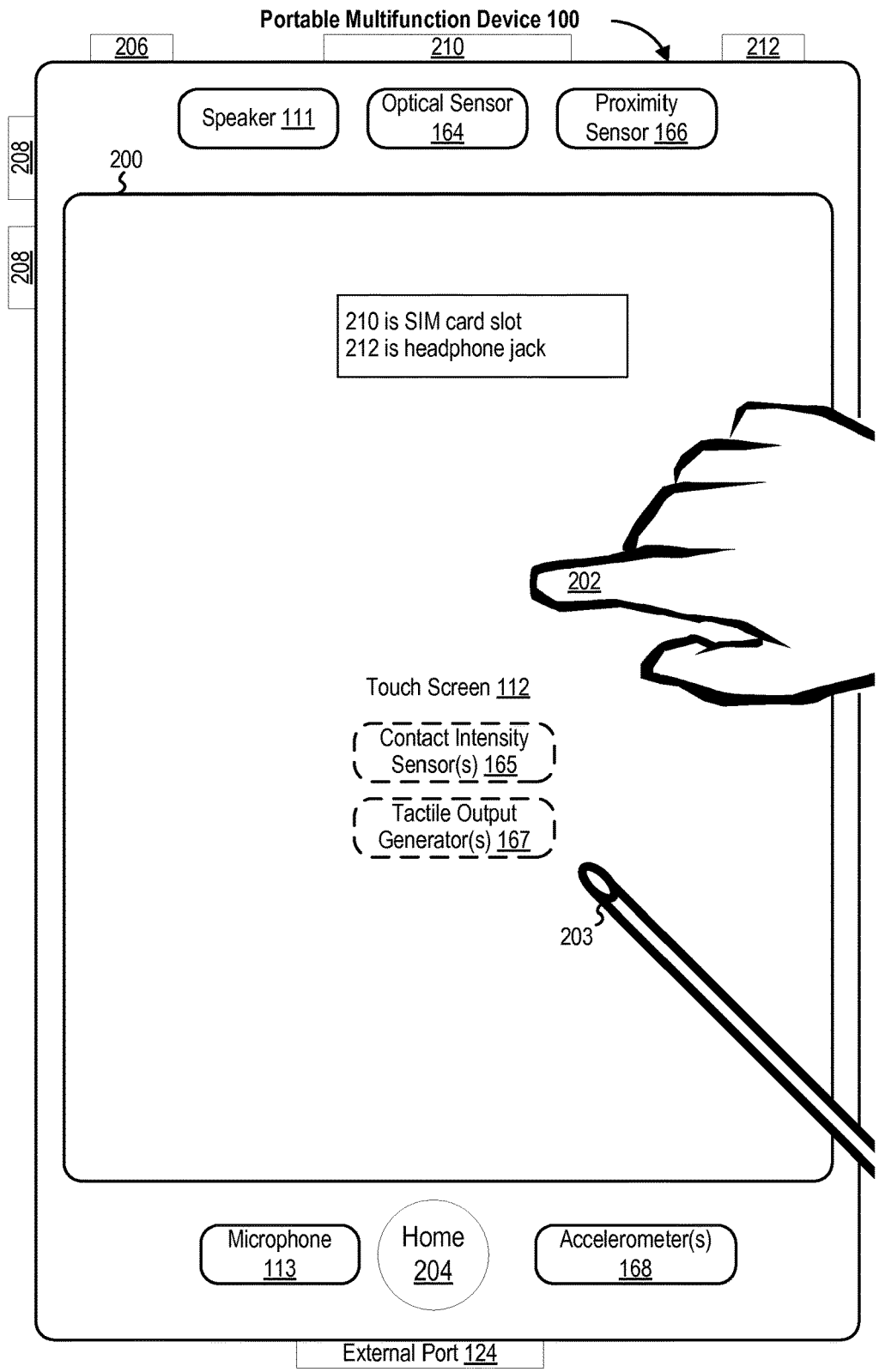
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 are, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that is, optionally, implemented on, for example, portable multifunction device 100.

Figure 4A:
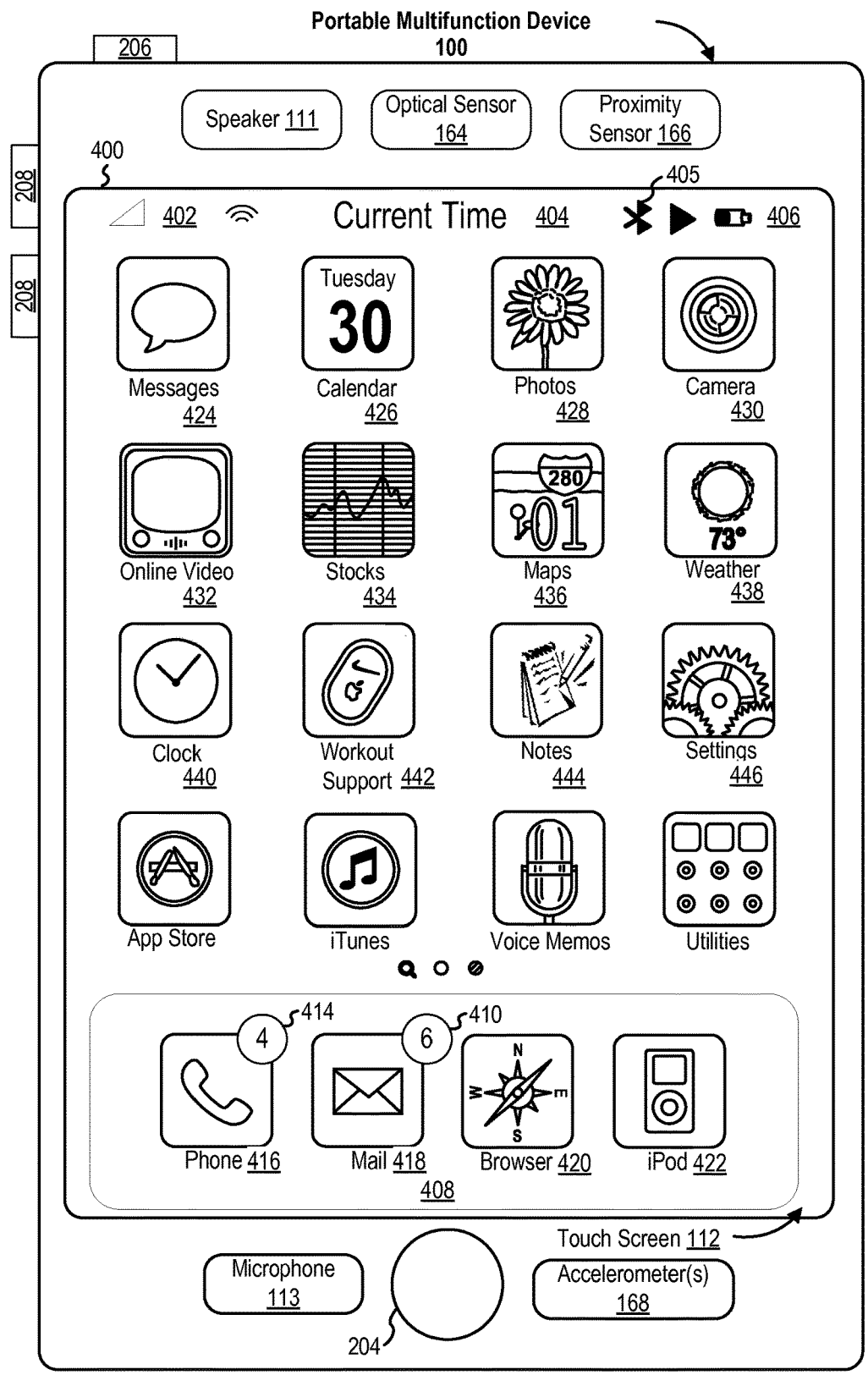
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
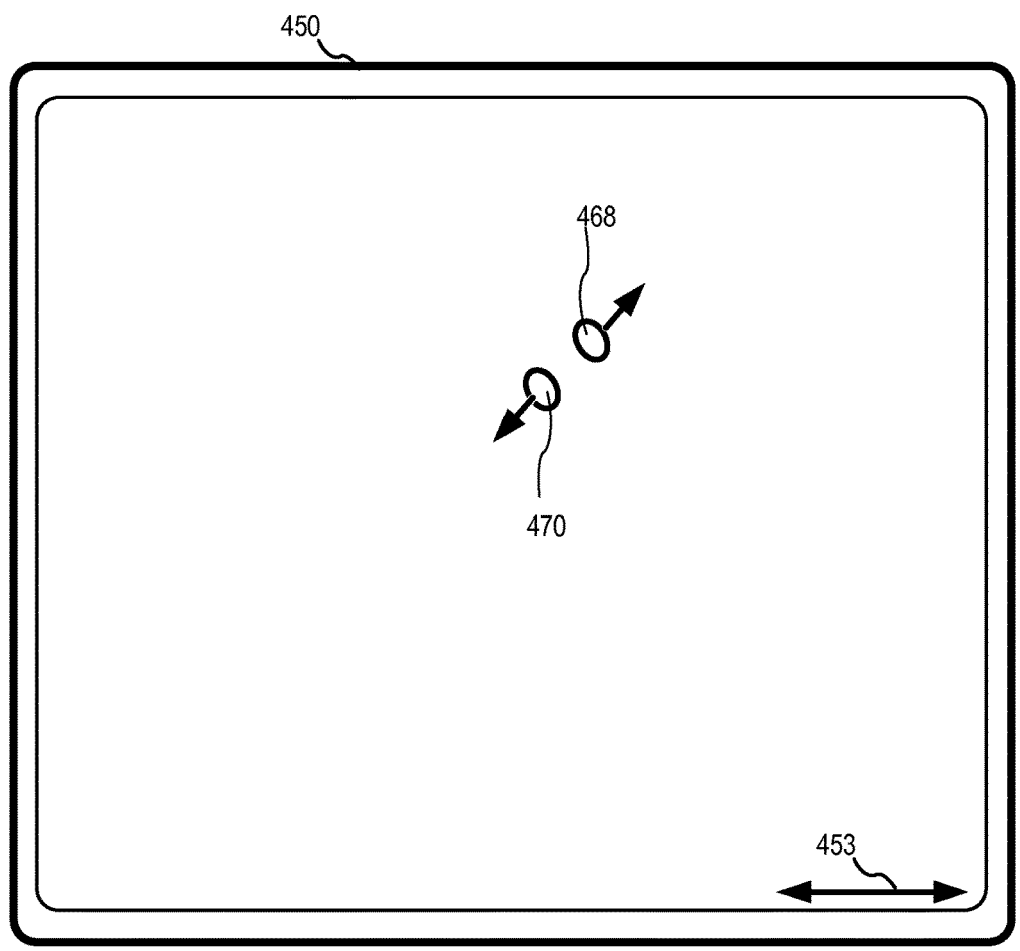
FIG. 4B illustrates an exemplary user interface for a multifunction device with a touch-sensitive surface that is separate from the display in accordance with some embodiments.
Figure 4B:
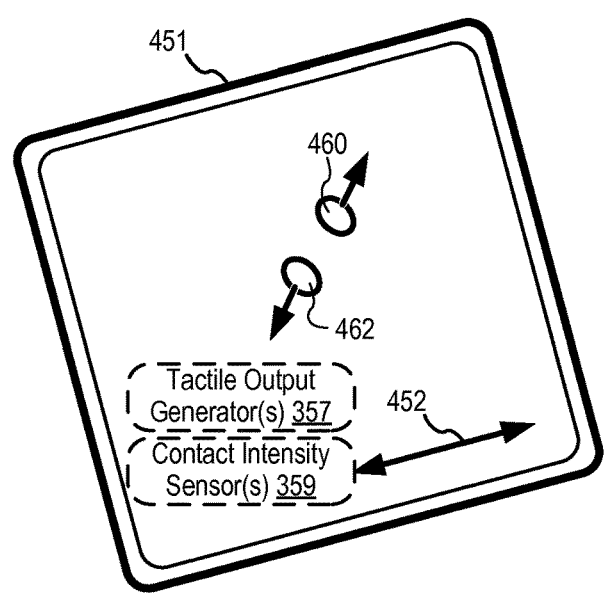

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
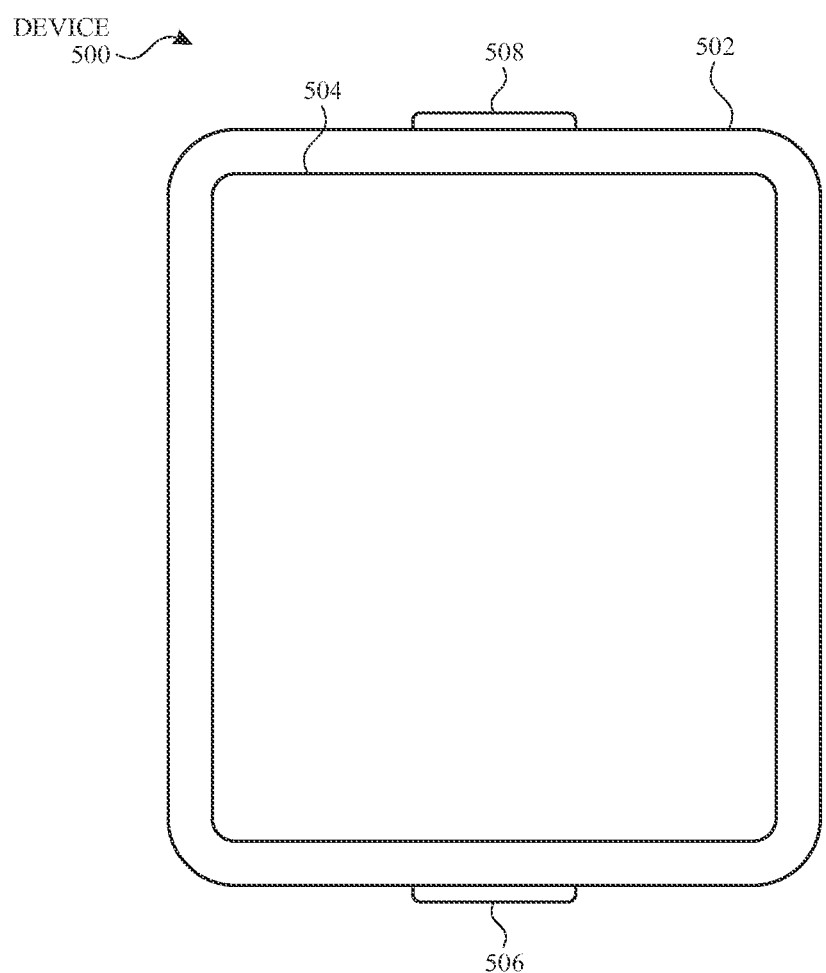
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
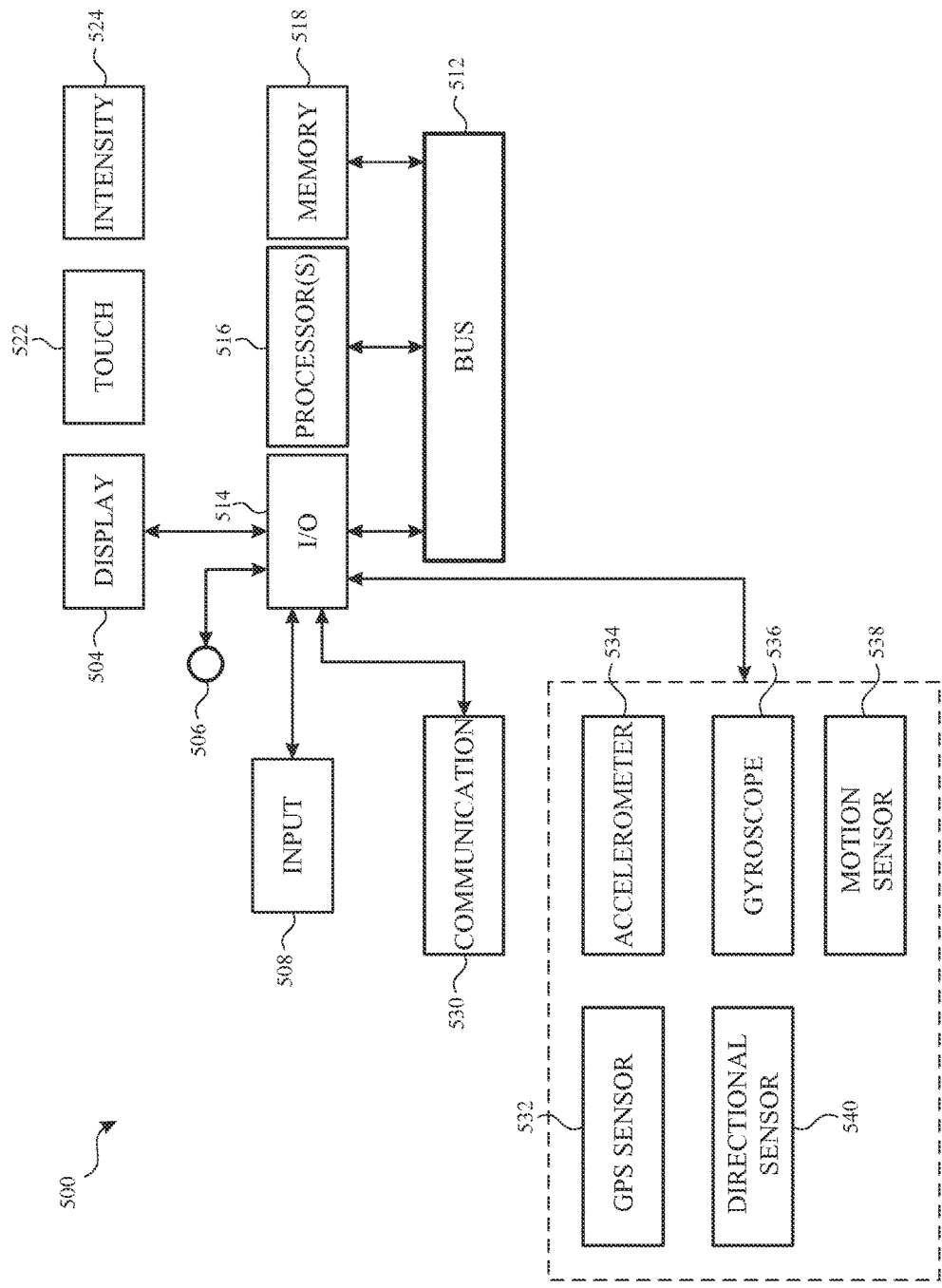
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a transitory or non-transitory computer-readable storage medium, for storing computer-executable instructions, which, when executed by one or more computer processors 516, for example, can cause the computer processors to perform the techniques described above, including processes 700 and 800 (FIGS. 7 and 8). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

Figure 5C:
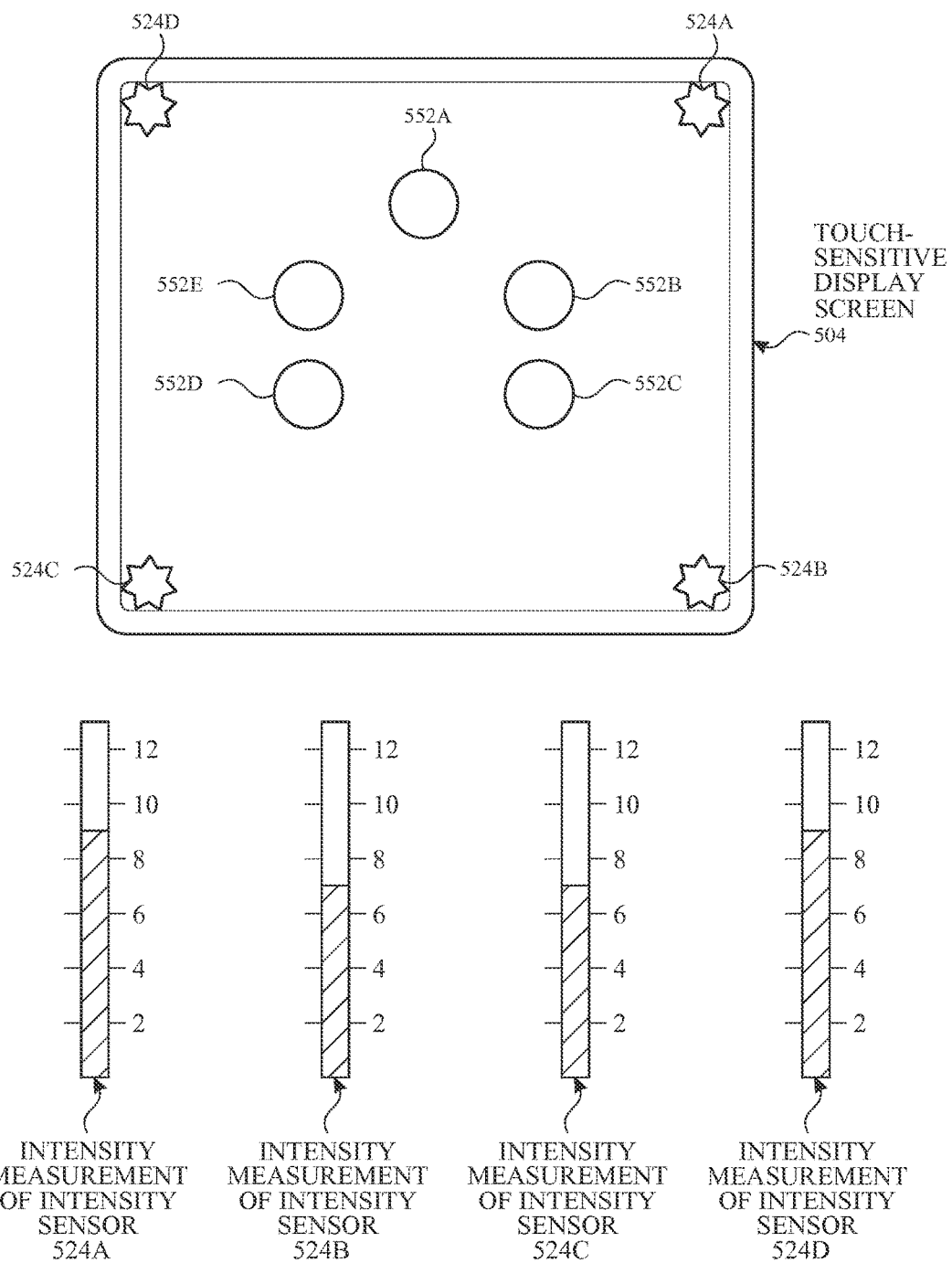
FIGS. 5C-5D illustrate exemplary components of a personal electronic device having a touch-sensitive display and intensity sensors in accordance with some embodiments.
Figure 5D:
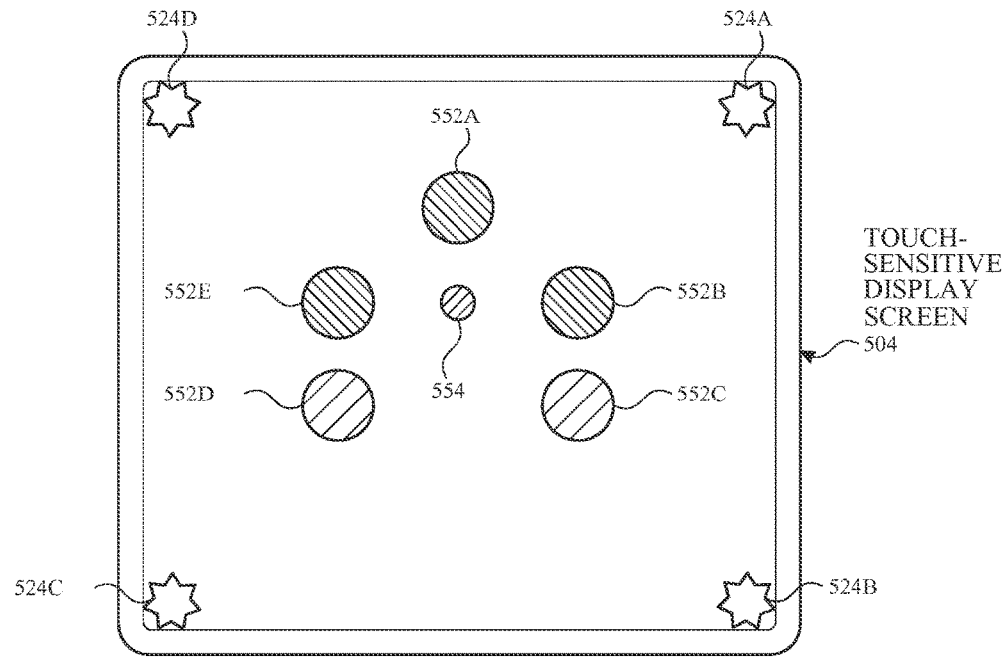
Figure 5D:
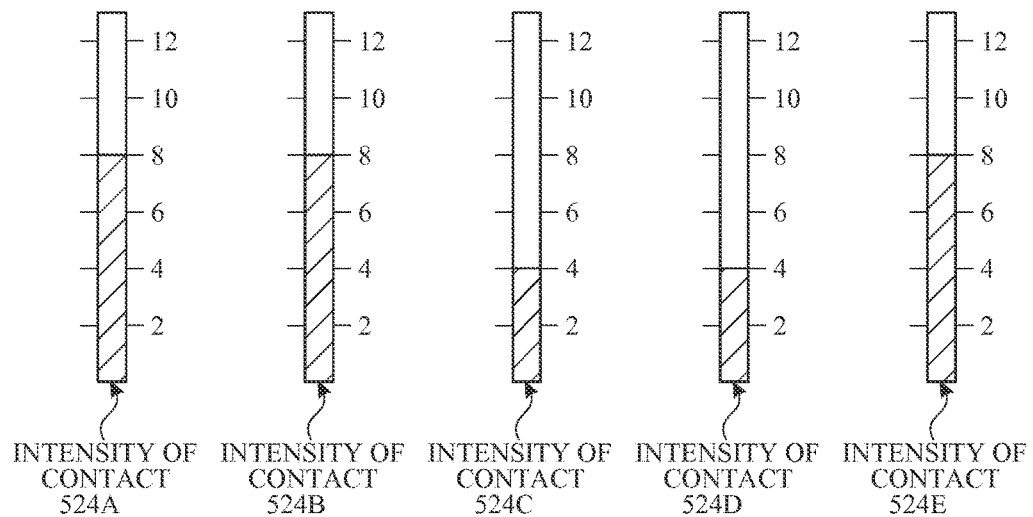

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
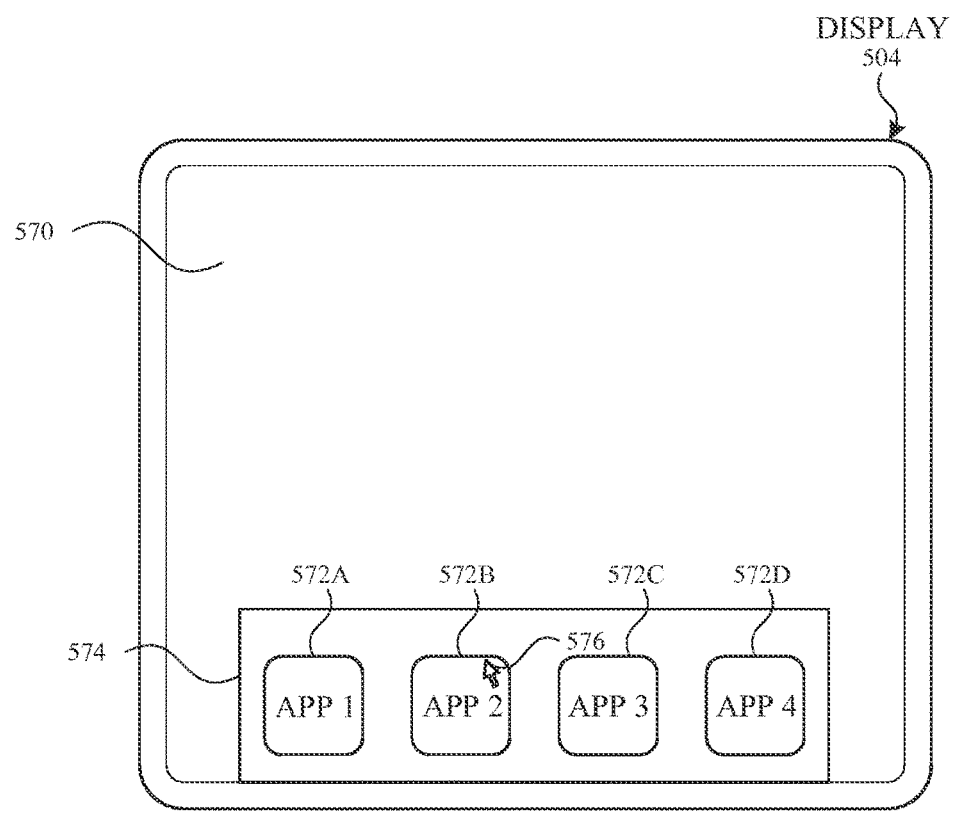
FIGS. 5E-5H illustrate exemplary components and user interfaces of a personal electronic device in accordance with some embodiments.
Figure 5E:
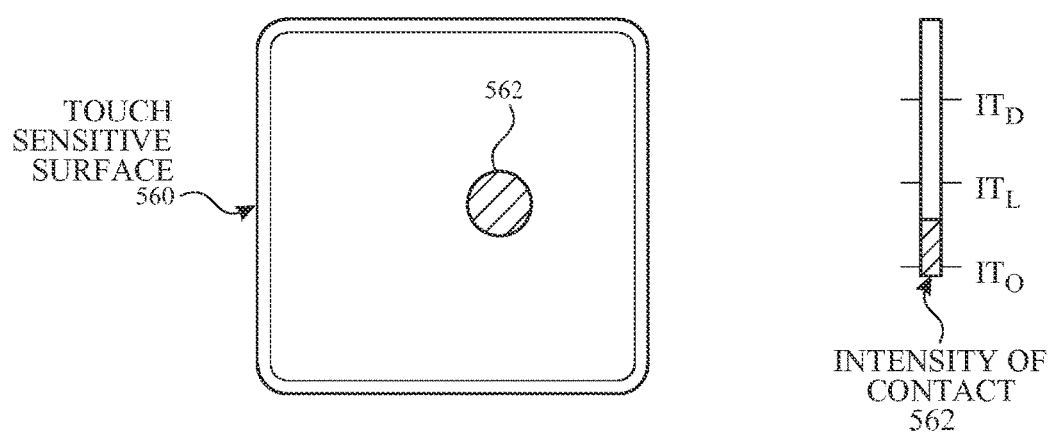
Figure 5F:
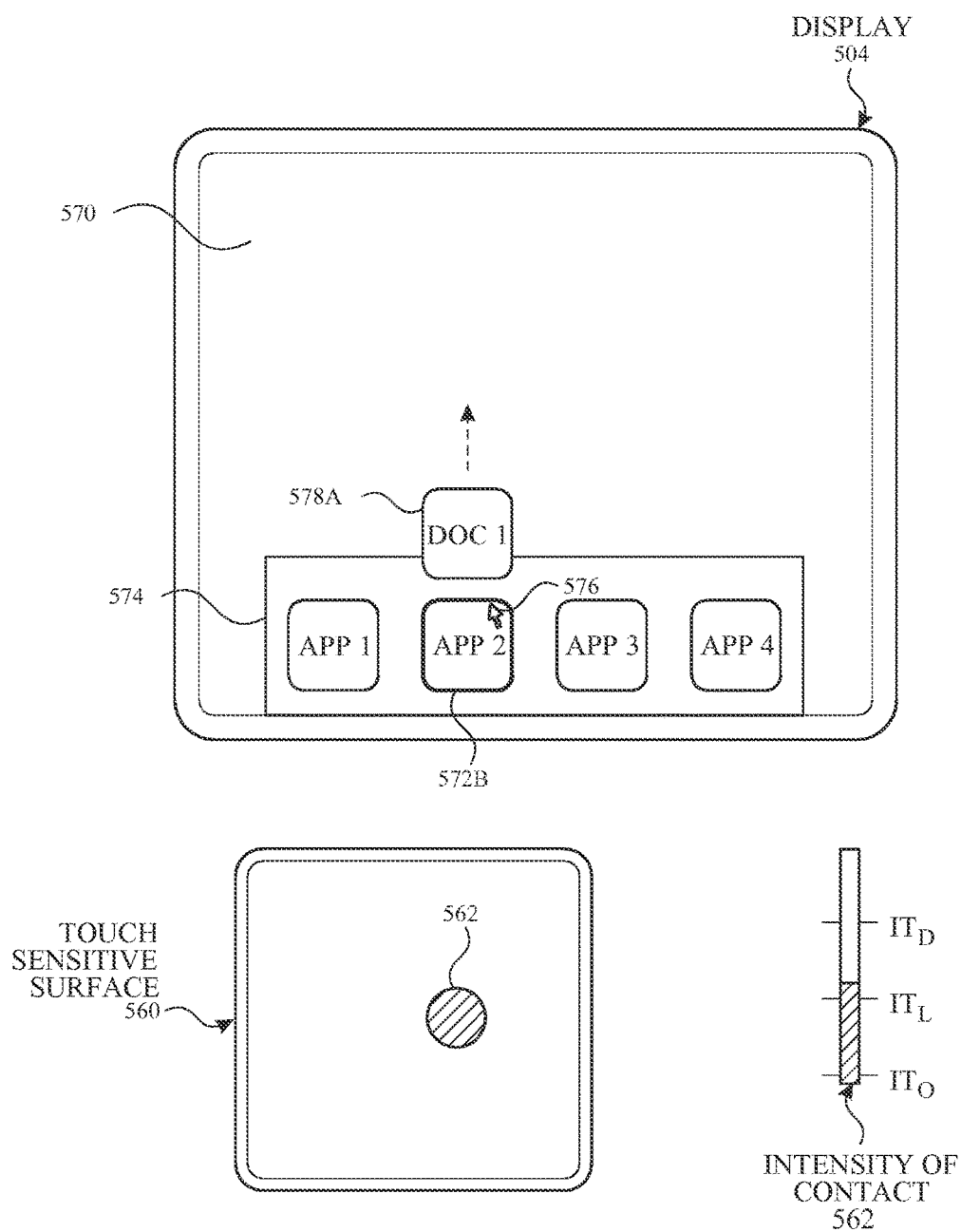
Figure 5G:
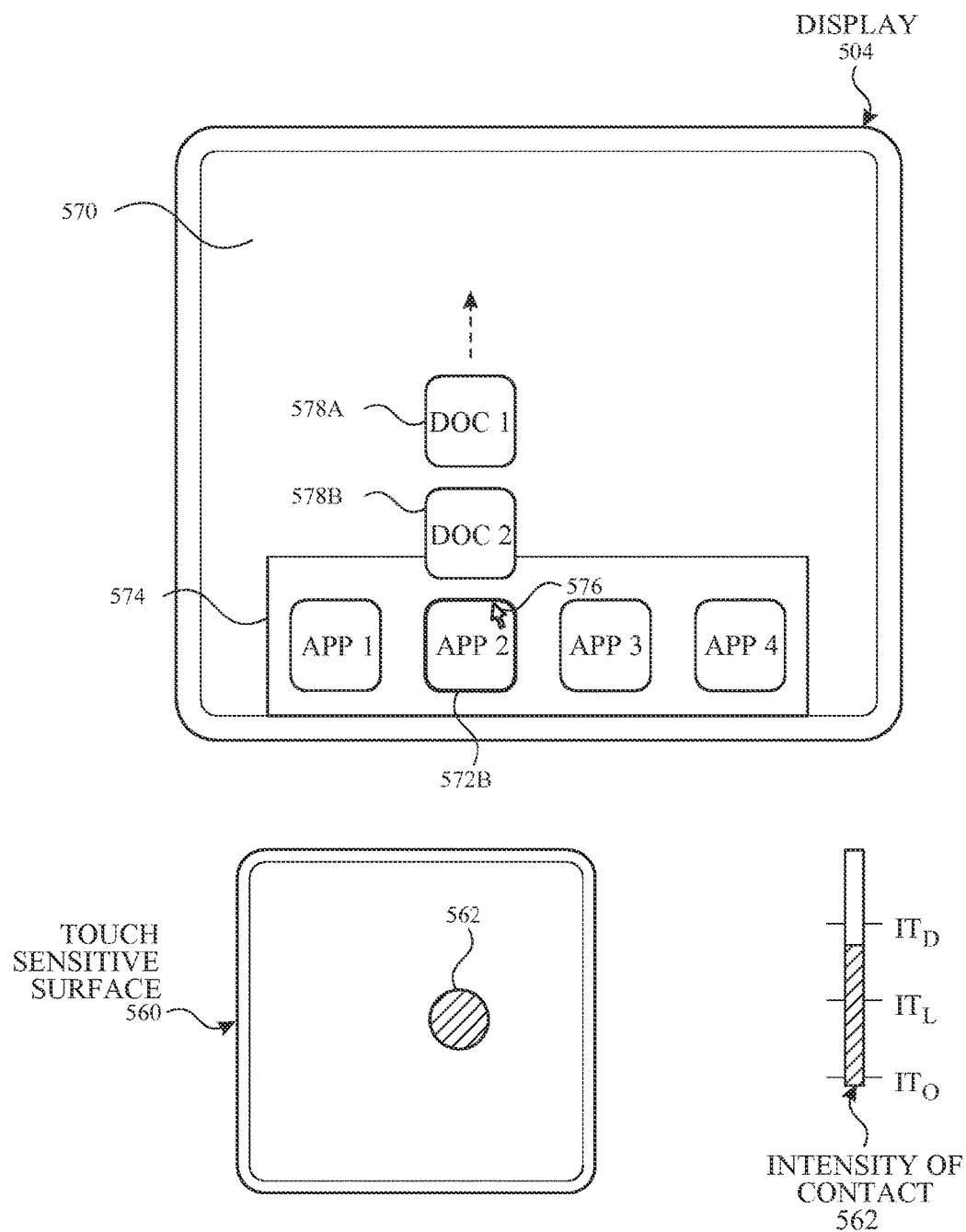
Figure 5H:
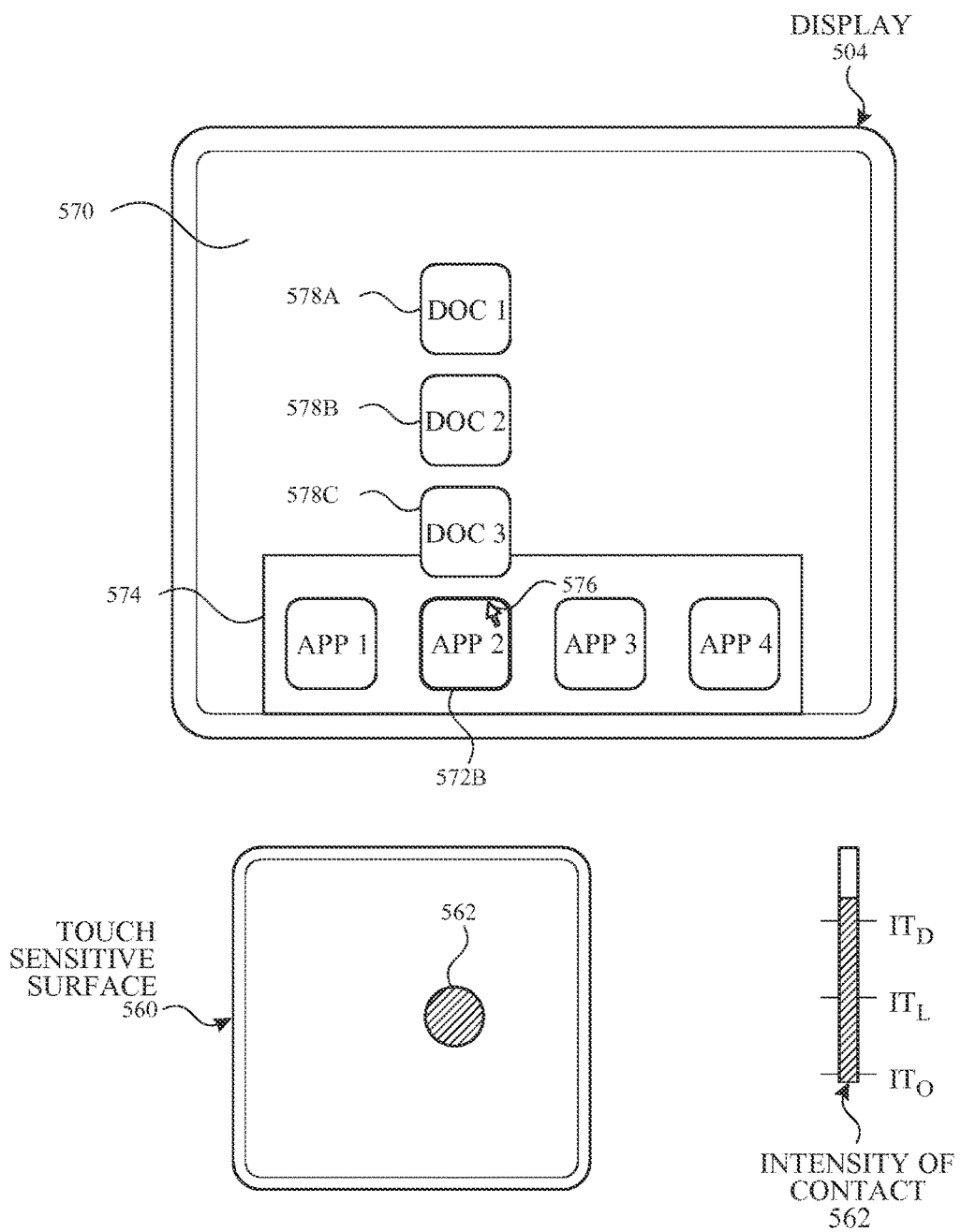

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed toward embodiments of user interfaces (UI) and associated processes that are optionally implemented on an electronic device, such as device 300 or portable multifunction device 100.

Figure 6A:
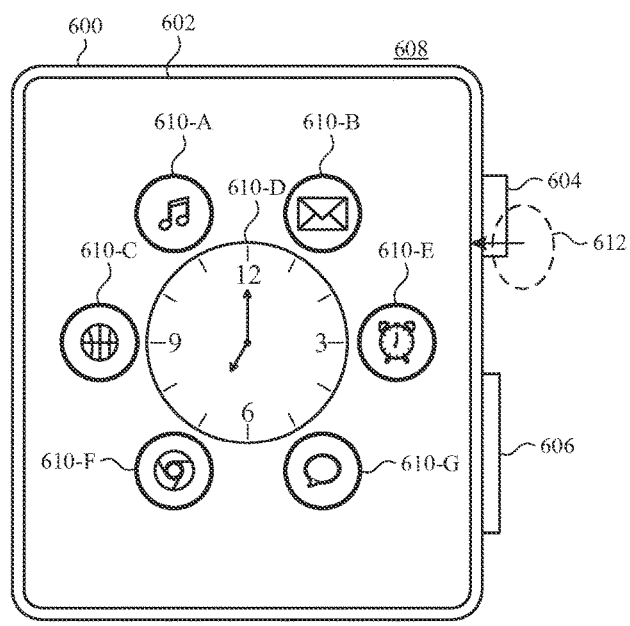
FIGS. 6A-6AA illustrate user interfaces for navigating a screenreader user interface in accordance with some embodiments.

FIGS. 6A-6EE illustrate exemplary user interfaces. FIGS. 7A-7G and 8A-8B, are flow diagrams illustrating exemplary methods. The user interfaces in FIGS. 6A-6W are used to illustrate the processes in FIGS. 7A-7G and 8A-8B.

Attention is now directed to techniques for activating, configuring, and navigating a user interface. In some embodiments, the user interface is intended for and/or configured for use by users who are blind or have low vision. In some embodiments, the user interface implements a "screenreader" concept by which options are read aloud to the user; that is, an audio output part, such as an integrated speaker, audio data port, or other communication interface, is configured to output an audio indication to provide information to the user about an option that may be selected, an action that may be executed, the current interface displayed on the screen, or other information about the interface. In this way, the device may be said to "read" the screen aloud to the user. The device optionally reads aloud a name, word, explanation, or other audio cue associated with any element of a user interface, such as the name of an interface, the content of an interface, objects displayed in an interface, or options available for selection in the interface.

In some embodiments, a user optionally navigates through a plurality of options that may be selected, and the device will read aloud each separate option as the user navigates. When the user hears the name of an option that he wishes to select, the user optionally selects the option by delivering an input to the device. In this way, in some embodiments, the user optionally determines what options are available on a particular user interface or screen by listening to the names of the available options, and optionally does so before entering any input that will select one of the options. Blind and low-vision users can optionally efficiently navigate complex user interfaces in this manner while minimizing accidental or incorrect inputs and maximizing speed and accuracy.

In some embodiments, the techniques for a screenreader are available on a device as a screenreader "mode" that is optionally activated and deactivated in accordance with certain user inputs. In some embodiments, activation of the screenreader mode alters a gesture set for controlling the device, such that a single gesture or a single input detected at the same time in the same interface at the same location causes the device to perform different functions in accordance with whether or not screenreader mode is activated. In some embodiments, screenreader mode supports multiple control modes, such that a user optionally configures the gesture set for controlling screenreader mode by activating and deactivating control sub-modes of screenreader mode.

FIG. 6A depicts an exemplary device 600 that can, optionally, embody the techniques described herein. In some embodiments, device 600 is device 100, 300, and/or 500 (FIGS. 1, 3, and 5). In some embodiments, device 600 has the form factor of a watch, such that it optionally is configured to be worn on a strap on a wrist, and it optionally has the size, shape, and/or general appearance of a watch.

Device 600 comprises display 602, which is touch screen 112 (FIG. 1A), display 340 (FIG. 3A), and/or touch screen 504 in some embodiments. In some embodiments, display 602 is a pressure-sensitive display.

Device 600 also comprises rotatable input mechanism 604, which is input mechanism 506 in some embodiments. In some embodiments, rotatable input mechanism 604 is coupled to the device and can optionally be rotated by manual manipulation by a user. In some embodiments, rotatable input mechanism 604 can optionally be rotated about one axis or about more than one axis. In some embodiments, rotatable input mechanism 604 can optionally, in addition to being rotated, be depressed as a button. In some embodiments, the rotatable input mechanism can optionally be depressed along a single axis or along more than one axis. In some embodiments, rotatable input mechanism 604 can optionally be depressed along an axis of rotation. In the illustrated example, rotatable input mechanism 604 is rotatable in either rotational direction about an axis extending horizontally across the illustration, along the page from left to right, through the center of rotatable input mechanism. In the illustrated example, rotatable input mechanism 604 is depressible as a button, in that it can optionally be pressed inward, toward display 602, to the left.

In some embodiments, rotatable input mechanism 604 comprises a touch-sensitive element, such as one or more touch-sensitive surfaces. The one or more touch-sensitive surfaces can optionally be capacitive surfaces configured to detect the presence of a finger or an input mechanism such as a stylus.

In some embodiments, device 600 is configured to detect and process signals generated in accordance with inputs delivered through rotatable input mechanism 604, such as rotation in either rotational direction, depression, or the touch or presence of a finger or other input stylus.

In some embodiments, rotatable input mechanism 604 has the form factor of a watch crown, such that it is disposed on the side of a device that is or has the form factor of a watch, and it can optionally have the size, shape, and/or general appearance of a watch crown.

Device 600 also comprises input mechanism 606, which is input mechanism 508 in some embodiments.

Device 600 also comprises audio output part 608. In some embodiments, audio output part 608 is a speaker such as speaker 111. In some embodiments, audio output part 608 is an audio speaker or a data jack or a data interface configured to convey signals to produce audio output. In some embodiments, device 600 is configured to be able to adjust one or more volume settings of audio output part 608.

Attention is now directed to exemplary techniques for activating, configuring, and navigating a blind/low-vision user interface. FIG. 6A depicts a user interface of device 600, displayed on display 602. The user interface includes a plurality of user interface objects 610-A through 610-G. In some embodiments, user interface objects 610-A through 610-G are displayed affordances that correspond to selectable options or functions of device 600. For example, user interface object 610-A corresponds to an option for a music application of device 600, user interface object 610-B corresponds to an option for a mail application of device 600, and user interface object 610-D corresponds to an option for a clock application of device 600. In some embodiments, the options or applications associated with displayed user interface objects can optionally be selected in accordance with the detection of a touch input at a location corresponding to the displayed user interface object, such as a touch input detected at a location on display 602 where the object is currently displayed.

FIG. 6A depicts a user input for activating a screenreader mode. In the example shown, the input is user input 612, which is a linear depression of the rotatable input mechanism 604. In some embodiments, input 612 is a single depression. In other embodiments, input 612 is a plurality of successive depressions. In some embodiments, one or more of the depressions constituting input 612 can optionally be depressions that are maintained for different periods of time and/or are spaced apart from one another by different periods of time. In some other embodiments, touch gestures detected on display 602 and/or interaction with input mechanism 606 can optionally constitute an input for activating a screenreader mode.

Figure 6B:
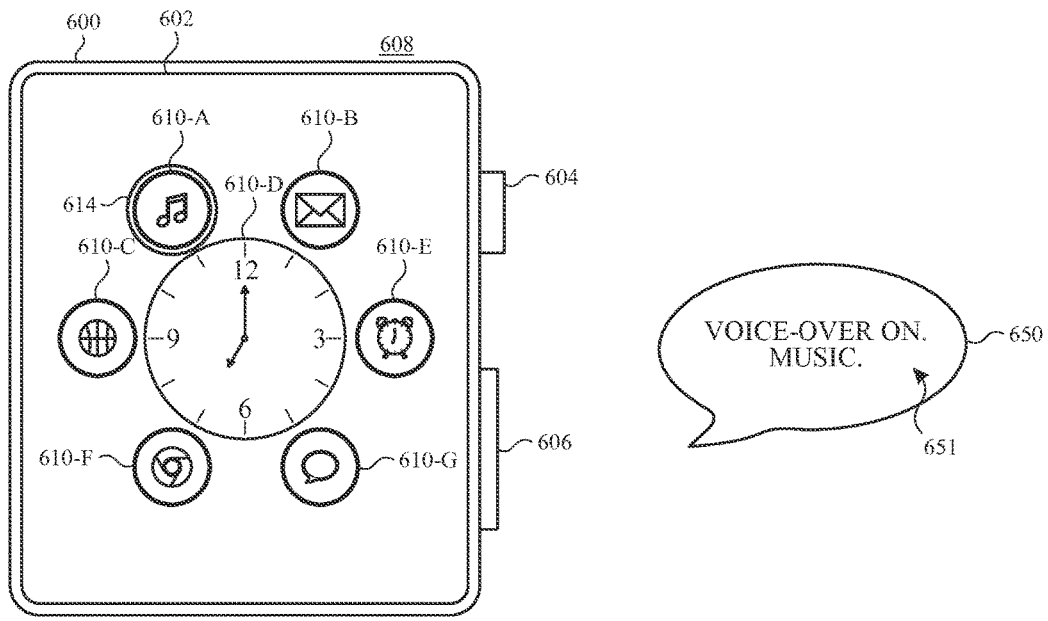
FIGS. 6BB-6EE illustrate user interfaces for adjusting volume in accordance with some embodiments.

FIG. 6B depicts activation of a screenreader mode in response to the detection of user input 612 depicted in FIG. 6A. To aid in the illustration of voiceover mode, FIG. 6B shows voice bubble 650, which is an abstraction depicting the auditory output associated with the activation of screenreader mode by device 600 in FIG. 6B. In FIG. 6B and the other figures containing voice bubble 650, voice bubble 650 should be understood to represent one example of an audio output that can optionally be produced at a moment in time by device 600, such as through audio output part 608. The audio output, such as speech, depicted in voice bubble 650 in FIG. 6B and in other figures can optionally be produced by device 600 concurrently with the user interface in the figure being displayed, and/or in response to the detection of a user input detected in the previous figure. For example, in FIG. 6B, the audio output 651, a voiceover reading "Voiceover on. Music," is produced by audio output part 608 in response to user input 612 detected in FIG. 6A.

FIG. 6B further depicts visual highlight 614. In some embodiments, visual highlight 614 is a visual object displayed on display 602 for the purpose of highlighting a pre-selected user interface object in screenreader mode. In some embodiments, displayed visual highlights correspond to all or part of an audio output that is concurrently produced or provided, or that is produced or provided at a time corresponding to the beginning of the display of the visual highlight. A visual highlight can optionally be any visual element displayed on display 602, such as a color, symbol, shape, brightness, animation, or other displayed element, and can optionally be associated with any user interface object. In the depicted example, visual highlight 614 is an outline that is outlining user interface object 610-A. As will be explained in greater detail below, one or both of visual highlight 614 and audio output 650 can optionally indicate the pre-selection of user interface object 610-A. That is, in some embodiments the production of audio output 650 and/or display of visual highlight 614 can optionally indicate a user interface object that will be activated, or a function that will be selected in response to the detection of a selection input. In the example shown, the audio output 650 speaking "Music" and the display of visual highlight 614 corresponding to user interface object 610-A both indicate that a selection gesture will activate a music application of device 600 that is associated with user interface object 610-A.

Figure 6C:
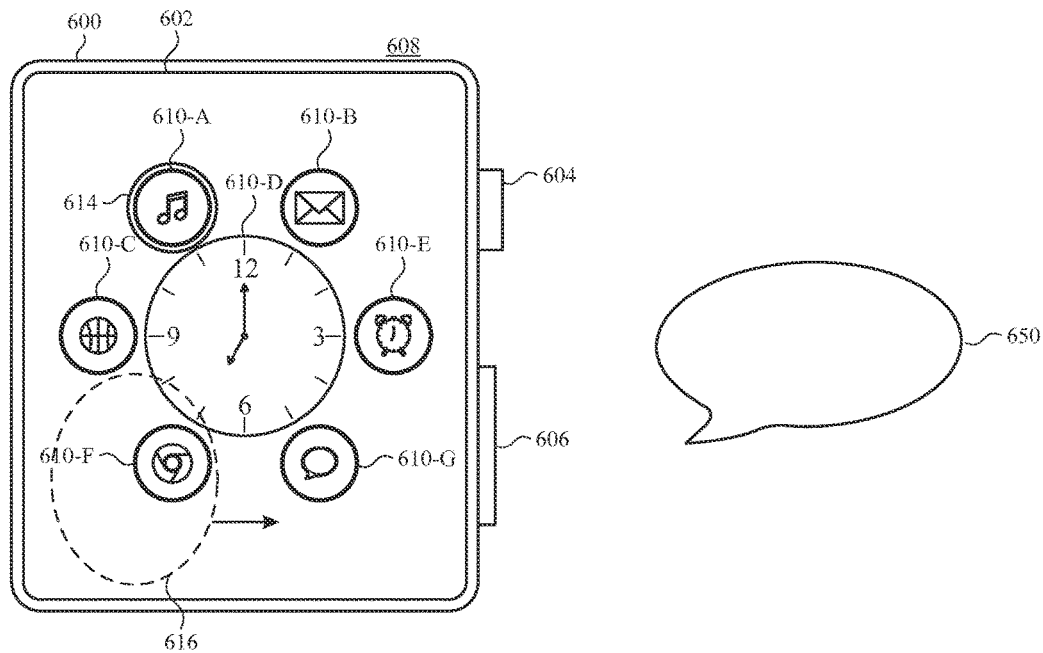

FIG. 6C depicts a user input for navigating between options in screenreader mode. In some embodiments, "navigating" can optionally refer to the conceptual movement of a visual highlight or of a pre-selected option from one available option to another. In some embodiments, "navigating" can optionally also refer to the actual selection of a displayed or undisplayed user interface option, and/or the changing of user interface screens. In some embodiments, the movement of a visual highlight from one displayed element to another displayed element on a user interface screen can optionally constitute "navigating" through options in a screenreader mode. In the example shown, the user input for navigating through options in screenreader mode is a rightward horizontal swipe 616 detected on display 602. In some embodiments, such a rightward swipe input can optionally be an input for navigating forward through user interface options in screenreader mode. In some embodiments, the user input can optionally be any other suitable touch gesture or interaction with a hardware mechanism. In some embodiments, swipe gesture 616 can optionally be detected at any location on display 602, such that it need not correspond to any displayed user interface object or displayed visual highlight. In some embodiments, swipe 616 can optionally be detected at any location on display 602, subject only to the qualification that the gesture must be recognized as a swipe gesture by touch-sensitive display 602. Location-independent gestures are particularly advantageous in screenreader applications because blind and low-vision users may have difficulty performing gestures that require a precise location.

Figure 6D:
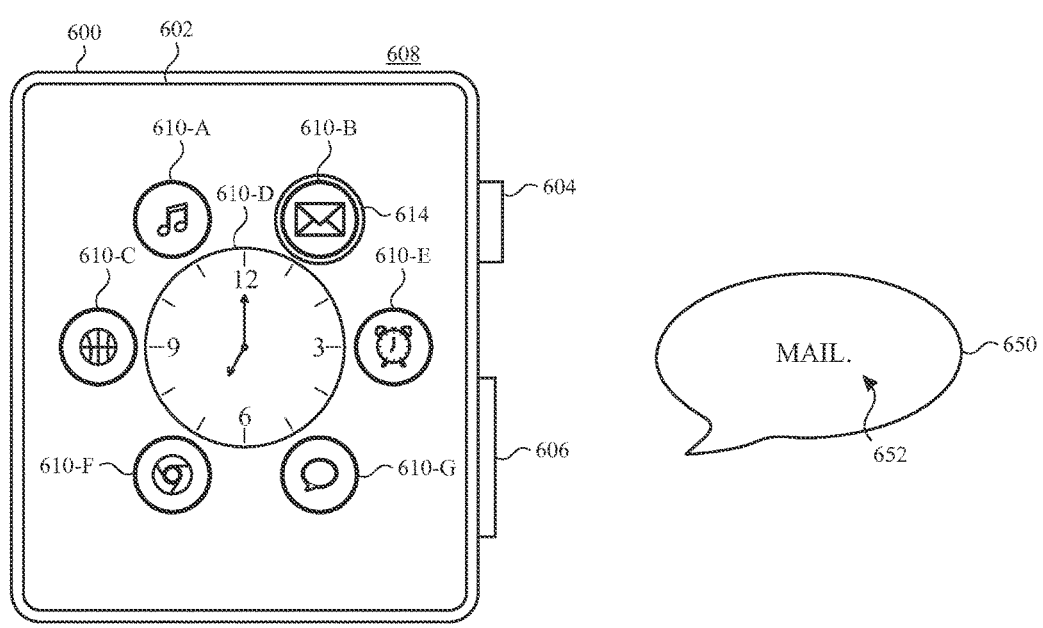

FIG. 6D depicts navigation in a screenreader mode in response to the user input detected in FIG. 6C. In FIG. 6D, visual highlight 614 has moved from user interface object 610-A forward to user interface object 610-B in response to horizontal swipe 616. In the depicted example, visual highlight 614 has the same appearance (an outline of a user interface object) before and after it moves to a different user interface object. In other embodiments, visual highlights change appearance (shape, color, brightness, animation, etc.) when they change position. In some embodiments, an animation corresponding to a visual highlight changing positions is displayed, such as an animation of the visual highlight translating across the display, or an animation of the visual highlight fading away and fading back in at a different location.

Concurrently with visual highlight 614 changing positions in FIG. 6D, device 600 produces, through audio output part 608, audio output 652 comprising the speech output "Mail." Audio output 652 indicates that visual highlight 614 has moved to user interface object 610-B, which corresponds to a mail application of device 600.

Figure 6E:
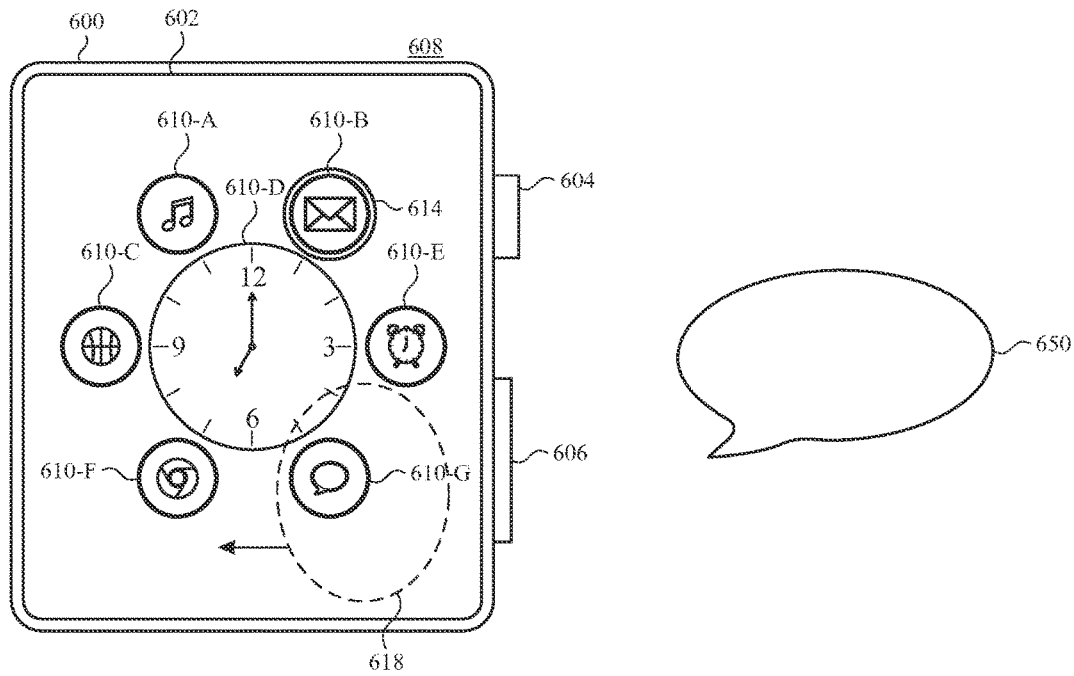

FIG. 6E depicts another user input for navigating between options in screenreader mode. In the example shown, the user input for navigating through options in screenreader mode is a leftward horizontal swipe 618 detected on display 602. In some embodiments, such a leftward swipe input can optionally be an input for navigating backward through user interface options in screenreader mode. In some embodiments, the user input can optionally be any other suitable touch gesture or interaction with a hardware mechanism. In some embodiments, swipe gesture 618 can optionally be detected at any location on display 602, such that it need not correspond to any displayed user interface object or displayed visual highlight. In some embodiments, swipe 618 can optionally be detected at any location on display 602 subject only to the qualification that the gesture must be recognized as a swipe gesture by touch-sensitive display 602. Location-independent gestures are particularly advantageous in screenreader applications because blind and low-vision users may have difficulty performing gestures that require a precise location.

Figure 6F:
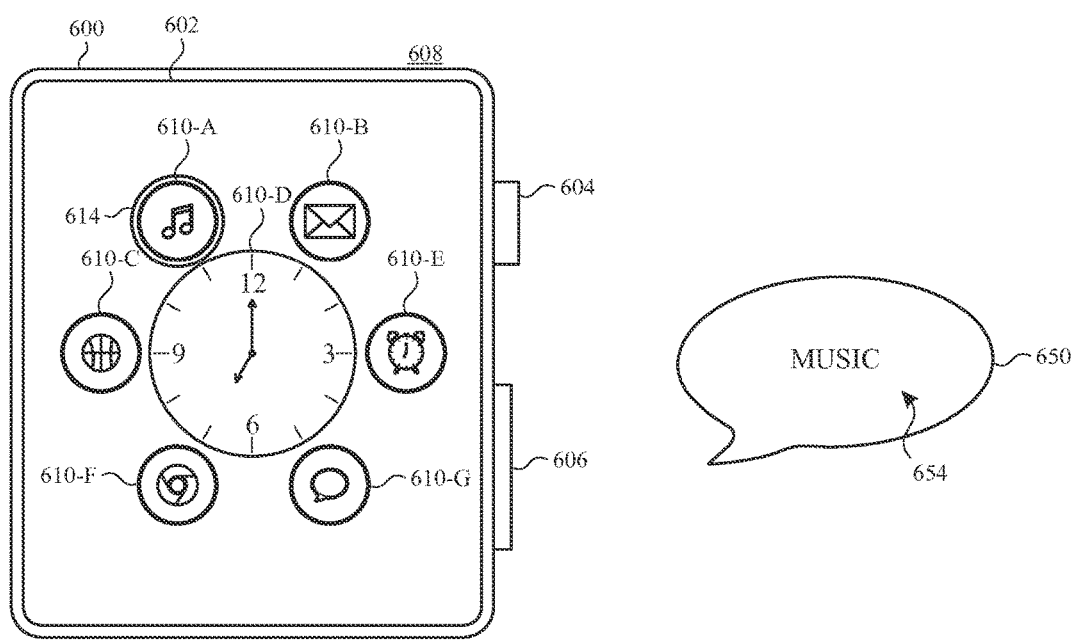

FIG. 6F depicts navigation in a screenreader mode in response to the user input detected in FIG. 6E. In FIG. 6F, visual highlight 614 has moved from user interface object 610-B back to user interface object 610-A in response to horizontal swipe 618. In the depicted example, visual highlight 614 has the same appearance (an outline of a user interface object) before and after it moves to a different user interface object. In other embodiments, visual highlights change appearance (shape, color, brightness, animation, etc.) when they change position. In some embodiments, an animation corresponding to a visual highlight changing positions is displayed, such as an animation of the visual highlight translating across the display, or an animation of the visual highlight fading away and fading back in at a different location.

Concurrently with visual highlight 614 changing positions in FIG. 6F, device 600 produces, through audio output part 608, audio output 654 comprising the speech output "Music." Audio output 654 indicates that visual highlight 614 has moved to user interface object 610-B, which corresponds to a music application of device 600.

Figure 6G:
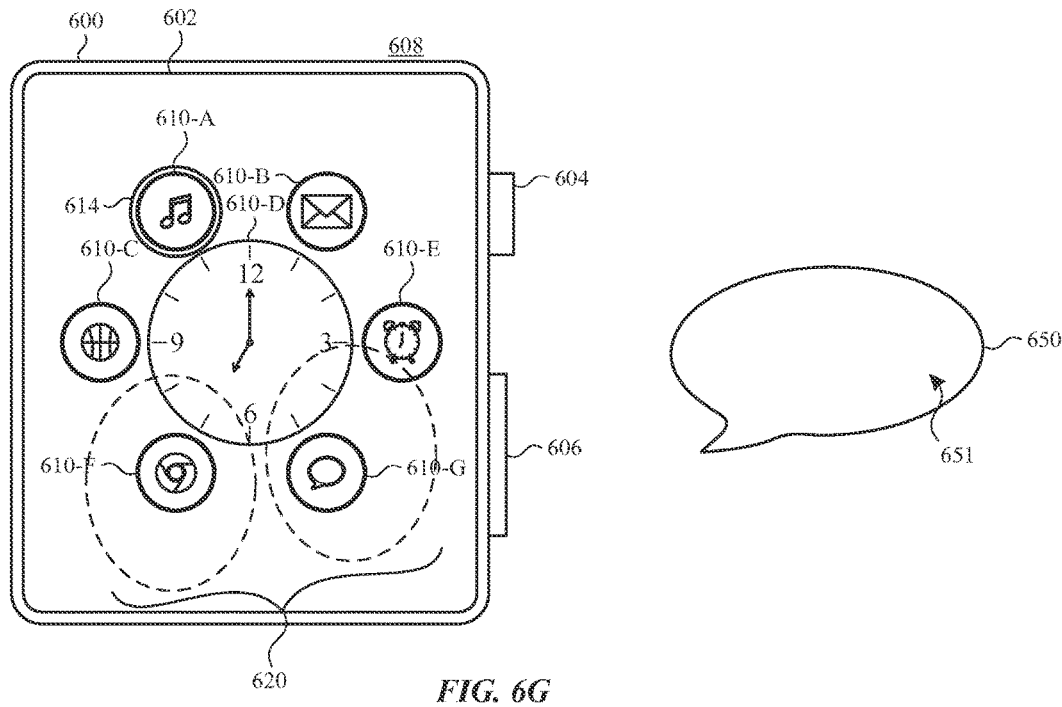

FIG. 6G depicts a user input for activating a rotary navigation mode. In some embodiments, rotary navigation mode allows for navigation in screenreader mode (e.g., movement of visual highlight 614 from one displayed user interface object to another) to be carried out through interaction with a rotary input mechanism, such as rotary input mechanism 604. Rotary navigation mode can optionally cause a native function of a rotary input mechanism (e.g., scrolling, zooming, etc.) to be suppressed or forgone in favor of a screenreader navigation function. Rotary navigation function, in some embodiments, allows for multiple input techniques for navigating in screenreader mode, by allowing for navigation either by a touch input (e.g., swipes 616 and 618) or by rotation of a rotary input mechanism. In some embodiments, touch inputs can optionally be utilized to navigate by one displayed user interface object at a time, while rotary inputs can optionally offer additional flexibility. In some embodiments, a shorter or slower rotation of a rotary input mechanism can optionally cause navigation by one user interface object, while a faster or longer rotation of a rotary input mechanism can optionally cause navigation by more than one user interface object. In some embodiments, predefined distance/angle and/or speed thresholds can optionally be defined, or such thresholds can optionally be dynamically defined, to determine a number of user interface objects by which to navigate in response to a rotation of a rotary input mechanism. In some embodiments, the rate of navigation or the number of user interface objects by which a visual highlight is moved or an option is advanced can optionally be directly proportional to an angle, distance, or speed of rotation of a rotary input mechanism, while in other embodiments, the rate of navigation or number of options navigated can optionally have a non-linear relationship to the rate or distance/angle of rotation (e.g., a very fast rotation can optionally cause navigation all the way to a final option with less total rotation angle than would be required to navigate to the last option one at a time in response to a slower rotation).

In some embodiments, rotary navigation mode is a sub-mode of screenreader mode, such that rotary navigation mode can optionally be activated and deactivated while screenreader mode is activated. In some embodiments, deactivation of screenreader mode can optionally automatically deactivate rotary navigation mode. In some embodiments, the activation or deactivation of rotary navigation mode can optionally be stored such that it is persistent within screenreader mode; a device can optionally thus store an indication as to whether rotary navigation mode is activated or deactivated, such that it can be automatically activated or deactivated upon a subsequent reactivation of screenreader mode.

In the example shown in FIG. 6G, the input for activating rotary navigation mode is two-finger triple-tap 620. In other embodiments, the input can optionally comprise any other touch input, such as any other multi-touch input and/or any other multiple-tap input. In other embodiments, the input can optionally comprise actuation of a hardware control, voice control, or any other suitable input means. In some embodiments, tap gesture 620 can optionally be detected at any location on display 602, such that it need not correspond to any displayed user interface object or displayed visual highlight. In some embodiments, swipe 618 can optionally be detected at any location on display 602 subject only to the qualification that the gesture must be recognized as a swipe gesture by touch-sensitive display 602. Location-independent gestures are particularly advantageous in screenreader applications because blind and low-vision users may have difficulty performing gestures that require a precise location.

Figure 6H:
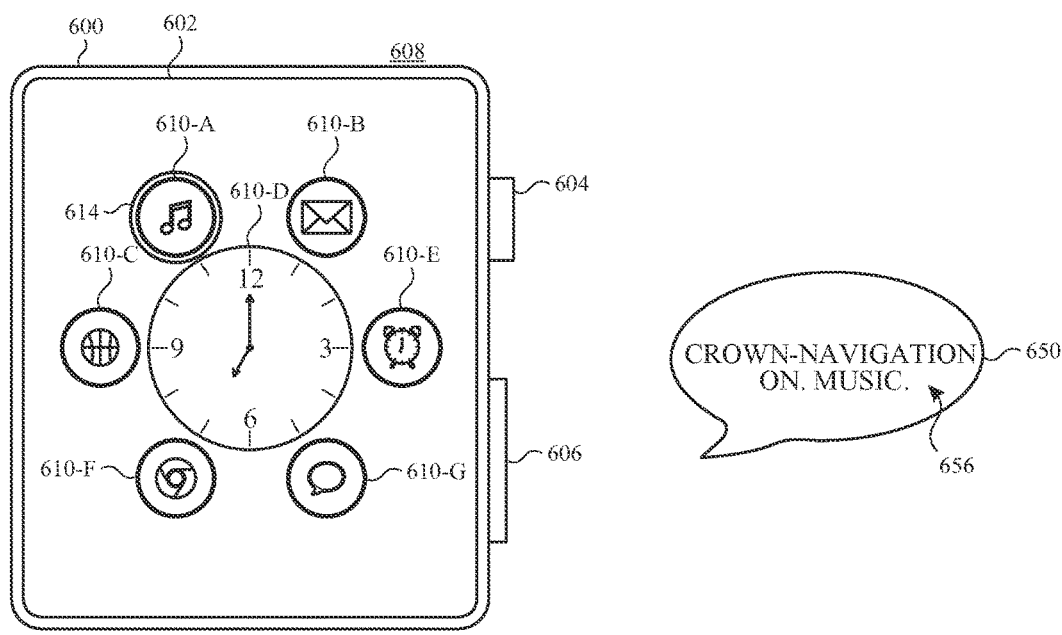

FIG. 6H depicts activation of a rotary navigation mode in response to the detection of user input tap 620 depicted in FIG. 6G. Concurrently with the activation of rotary navigation mode, device 600 produces, through audio output part 608, audio output 654 comprising the speech output "Crown-navigation on. Music." Audio output 656 indicates that rotary input mode (e.g., crown navigation) has been activated, and can optionally also indicate or re-indicate a user interface object that is currently selected (e.g., music icon user interface object 610-A).

Figure 6I:
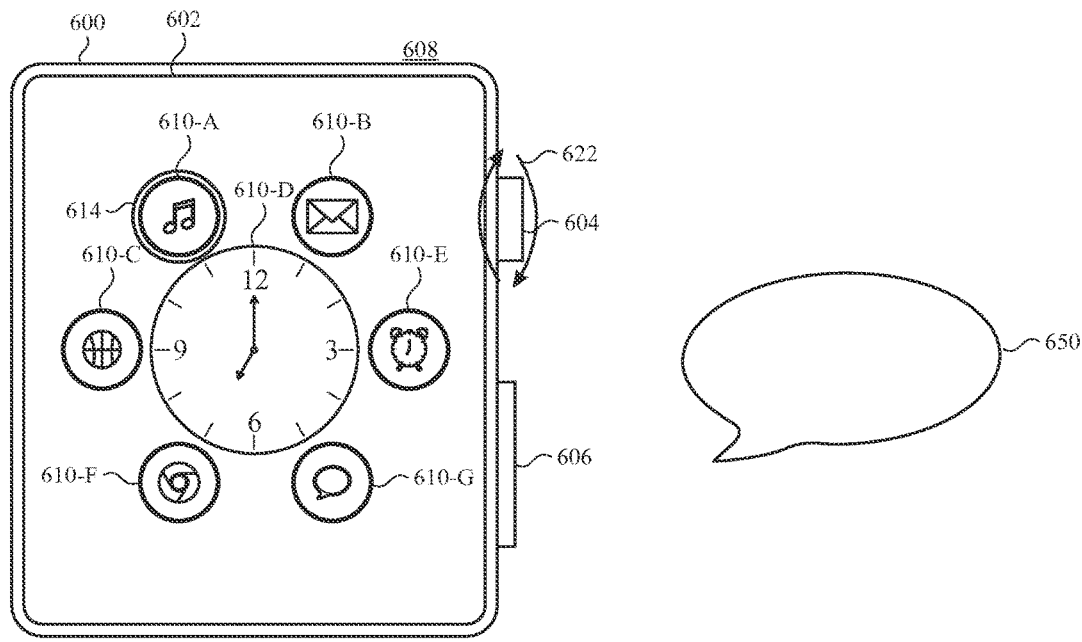

FIG. 6I depicts a user input for navigating forward through pre-selected and/or highlighted options and/or user interface objects in a rotary navigation screenreader mode. In the depicted example, the input is rotation 622, which is a rotation in a first rotational direction of rotatable input mechanism 604. The first rotational direction, in the depicted example, is a rotation about the axis extending from left to right, along the page, through the center of rotatable input mechanism 604. The rotation is a clockwise rotation when viewed from the right side of the device, such that the side of rotatable input mechanism 604 that is facing the same direction as display 602 on device 600 is moved upwards as mechanism 604 is rotated in the first rotational direction.

Figure 6J:
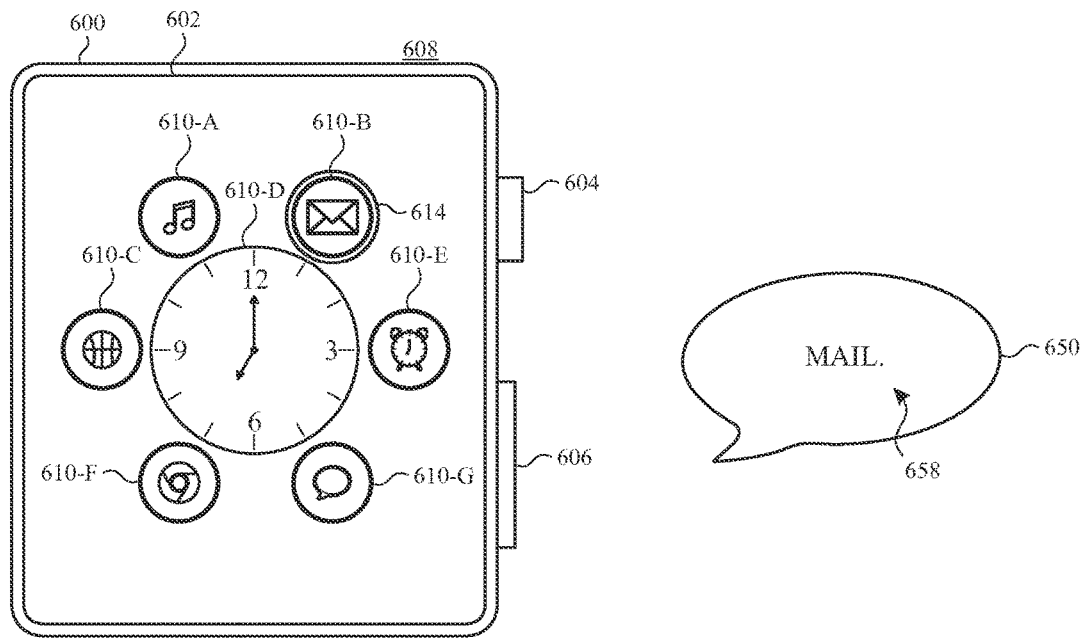

FIG. 6J depicts navigation in a rotary navigation mode in response to the user input detected in FIG. 6I. In FIG. 6J, visual highlight 614 has moved from user interface object 610-A forward to user interface object 610-B in response to rotation 622. In the depicted example, rotation 622 has caused device 600 to advance visual highlight 614 by one option, from user interface object 610-A to user interface object 610-B. In this way, the user interface appears similar to the user interface described above with reference to FIG. 6D. Concurrently with visual highlight 614 changing positions in FIG. 6J, device 600 produces, through audio output part 608, audio output 658 comprising the speech output "Mail." Audio output 658, like audio output 652 described above with reference to FIG. 6D, indicates that visual highlight 614 has moved forward to user interface object 610-B, which corresponds to a mail application of device 600.

Figure 6K:
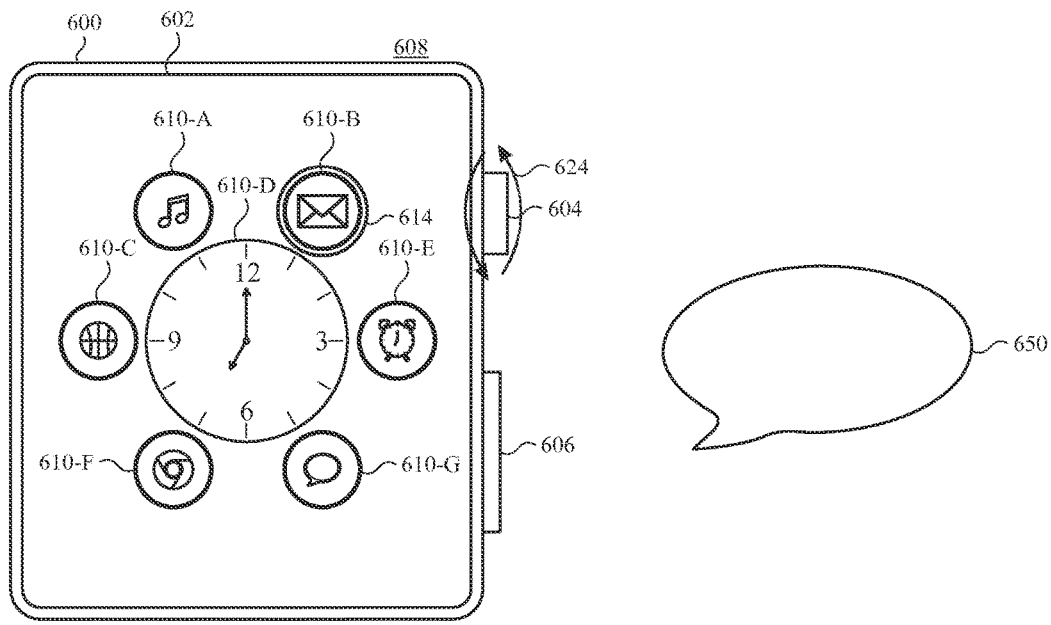

FIG. 6K depicts a user input for navigating backward through pre-selected and/or highlighted options and/or user interface objects in a rotary navigation screenreader mode. In the depicted example, the input is rotation 624, which is a rotation in a first rotational direction of rotatable input mechanism 604. The first rotational direction, in the depicted example, is a rotation about the axis extending from left to right, along the page, through the center of rotatable input mechanism 604. The rotation is a counter-clockwise rotation when viewed from the right side of the device, such that the side of rotatable input mechanism 604 that is facing the same direction as display 602 on device 600 is moved downward as mechanism 604 is rotated in the first rotational direction.

Figure 6L:
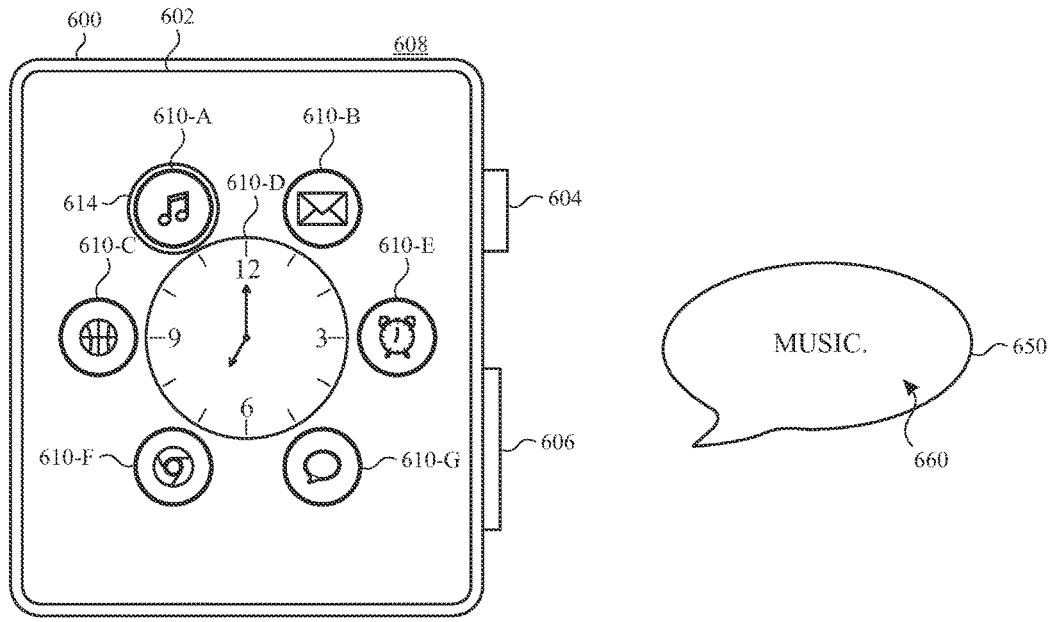

FIG. 6L depicts navigation in a rotary navigation mode in response to the user input detected in FIG. 6K. In FIG. 6L, visual highlight 614 has moved from user interface object 610-B back to user interface object 610-A in response to rotation 624. In the depicted example, rotation 624 has caused device 600 to move visual highlight 614 backward by one option, from user interface object 610-B to user interface object 610-A. In this way, the user interface appears similar to the user interface described above with reference to FIG. 6F. Concurrently with visual highlight 614 changing positions in FIG. 6L, device 600 produces, through audio output part 608, audio output 660 comprising the speech output "Music." Audio output 660, like audio output 654 described above with reference to FIG. 6F, indicates that visual highlight 614 has moved backward to user interface object 610-B, which corresponds to a music application of device 600.

Figure 6M:
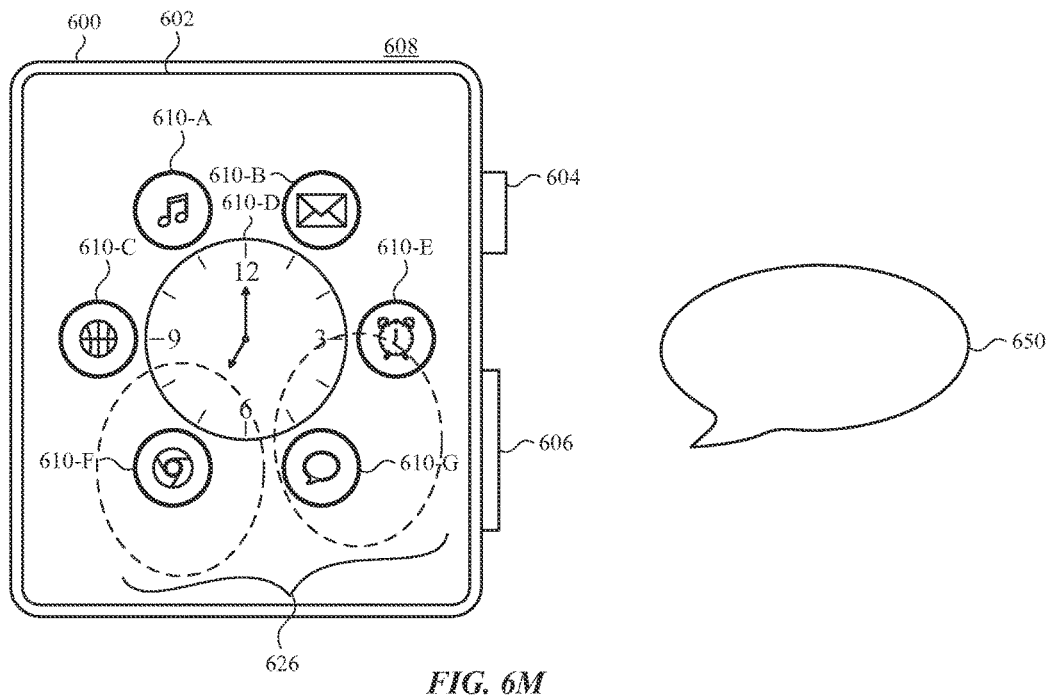

FIG. 6M depicts a user input for deactivating a rotary navigation mode. In some embodiments, an input for deactivating rotary navigation mode can optionally be the same input or of the same input type used to activate rotary navigation mode, such that the input can optionally toggle the mode on and off. In some embodiments, when a predefined activation/deactivation input is detected, activation of the rotary navigation mode is toggled, such that it is activated if it is currently deactivated, and deactivated if it is currently activated. In some embodiments, this toggling effect is only available when screenreader mode is activated (while in others it is always available). In the example shown in FIG. 6M, the input for deactivating rotary navigation mode is two-finger triple-tap 626, which can optionally be substantially similar or identical to two-finger triple-tap 620 described above with reference to FIG. 6M. In other embodiments, the input for deactivating rotary navigation mode can optionally comprise any other touch input, such as any other multi-touch input and/or any other multiple-tap input. In other embodiments, the input can optionally comprise actuation of a hardware control, voice control, or any other suitable input means. In some embodiments, the advantages of using a two-finger triple-tap gesture (or any other multi-touch and/or multi-tap gesture) to deactivate rotary navigation mode can optionally be the same or similar to those described above with reference to FIG. 6G. Furthermore, tap gesture 626 can optionally be location-independent, as described above with reference to FIG. 6G, and such a location-independent technique may have the same or similar advantages as described with reference thereto.

Figure 6N:
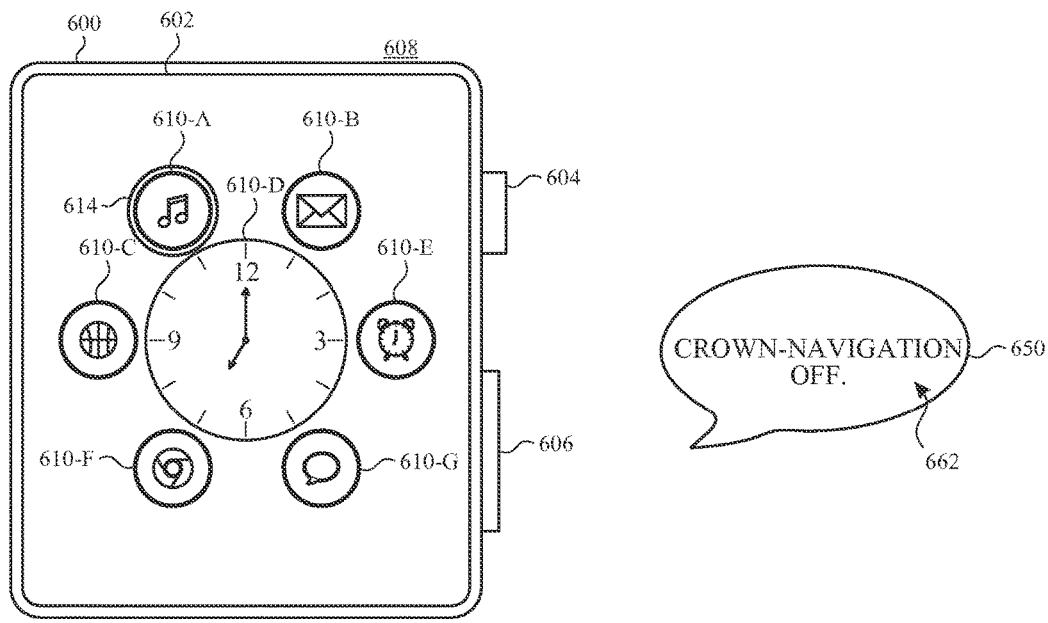

FIG. 6N depicts deactivation of a rotary navigation mode in response to the detection of user input tap 626 depicted in FIG. 6M. Concurrently with the deactivation of rotary navigation mode, device 600 produces, through audio output part 608, audio output 662 comprising the speech output "Crown-navigation off." Audio output 656 indicates that rotary input mode (e.g., crown navigation) has been deactivated, and can optionally also indicate or re-indicate a user interface object that is currently selected (e.g., music icon user interface object 610-A).

Figure 6O:
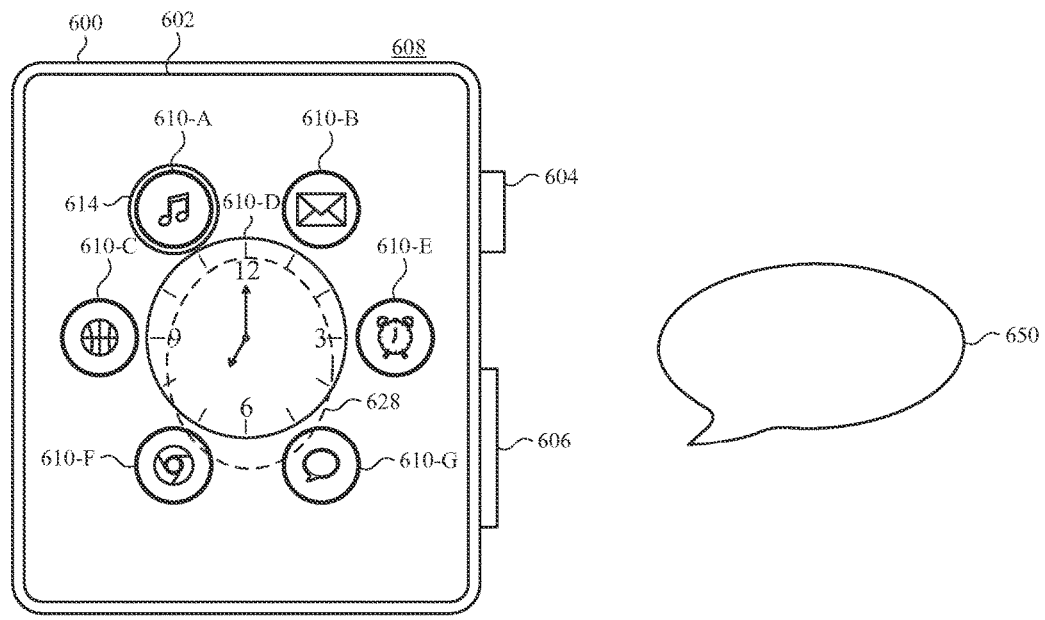

FIG. 6O depicts a user input for navigating to a specific user interface object in screenreader mode. In the depicted example, the input is contact 628, which is a touch contact detected on display 602. In some embodiments, the input can optionally be a single-finger contact or a multi-finger contact and can optionally comprise one or more successive contacts maintained for various amounts of time. Contact 628 is detected, in the embodiment depicted, at a location on display 602 corresponding to the displayed location of user interface object 610-D. In some embodiments, the location of the input for navigating to a specific user interface object is the location of the specific user interface object to which the user wishes to navigate.

Figure 6P:
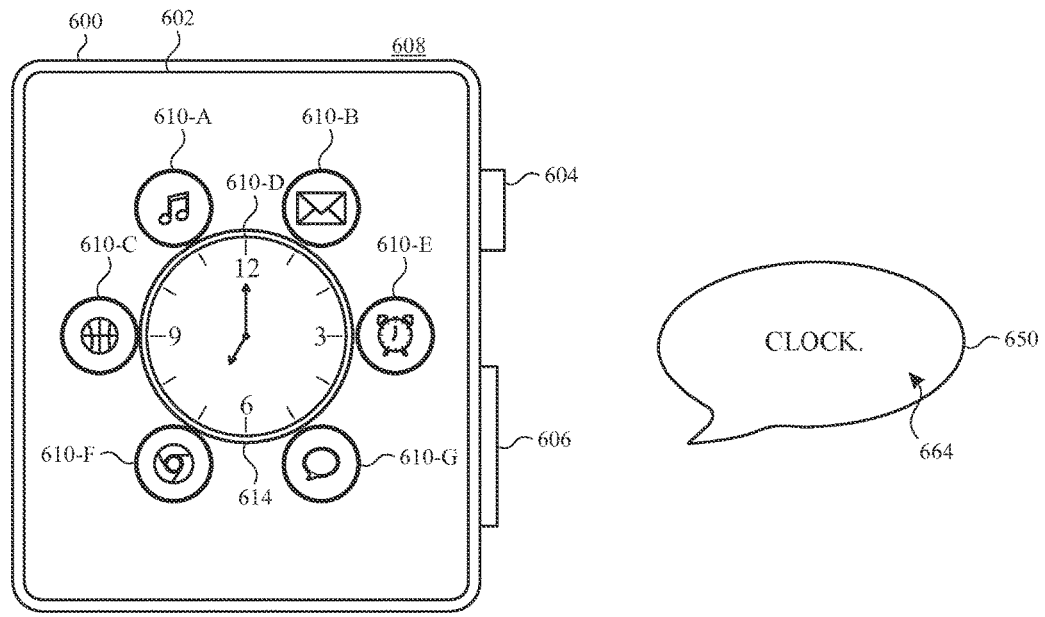

FIG. 6P depicts navigation in a screenreader mode in response to the user input detected in FIG. 6O. In FIG. 6P, visual highlight 614 has moved from user interface object 610-A to user interface object 610-D in response to contact 628. In the depicted example, contact 628 has caused device 600 to move visual highlight 614 directly to the user interface object associated with the location at which contact 628 was detected, without regard for the ordered progression. In the depicted example, highlight 614 has changed size to take on the size and shape of user interface 610-D. Concurrently with visual highlight 614 changing positions in FIG. 6P, device 600 produces, through audio output part 608, audio output 664 comprising the speech output "Clock." Audio output 664 indicates that visual highlight 614 has moved to user interface object 610-D, which corresponds to a clock application of device 600.

Figure 6Q:
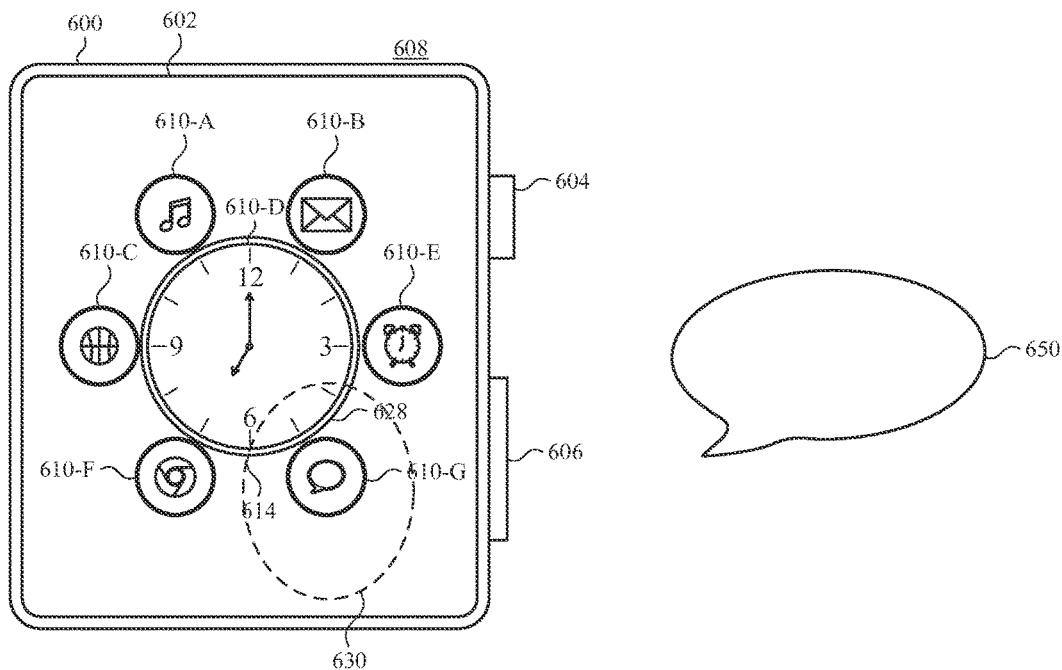

FIG. 6Q depicts a user input for selecting an option. That is, FIG. 6Q depicts a user input for activating a function associated with a displayed or undisplayed option, such as a user interface object or a contextual action (explained in additional detail below). In some embodiments, device 600 is configured such that, upon detection of an input for selecting an option, an option is selected. In some embodiments, user inputs for selecting an option are location-independent such that the option selected need not correspond to a location of the input. In some embodiments, the user input for selecting an option is a touch gesture comprising one or more points of contact and/or one or more instances of contact lasting for various periods of time. In the depicted embodiment, the user input is a location-independent double-tap gesture 630. Gesture 630 is detected by device 600 at a location corresponding substantially to user interface object 610-G. However, in the embodiment shown, the selection gesture could be detected at any other location on display 602 or could be detected through detection means other than display 602, and the effect of the location-independent selection gesture would be unchanged.

Figure 6R:
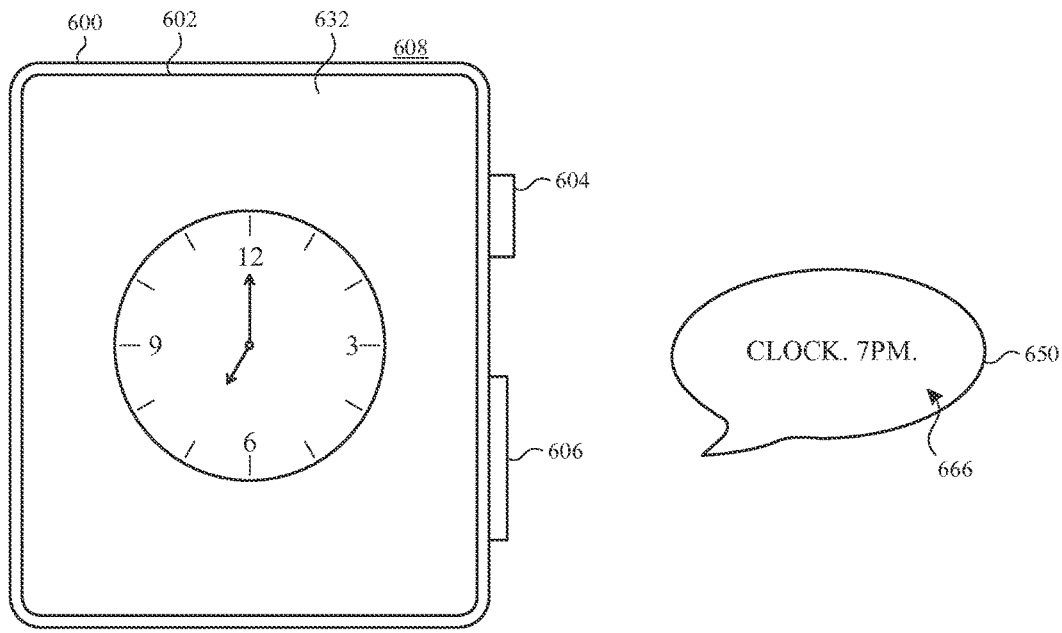

FIG. 6R depicts activation of an option in response to the user input detected in FIG. 6Q. In FIG. 6R, in response to detecting gesture 630, device 600 activates the function associated with the user interface object that is currently highlighted and the option that was most recently spoken by the voiceover function. In the depicted example, the most-recently voiced-over option is visually highlighted user interface object 610-D. In some other embodiments, the most-recently voiced-over option can optionally be an undisplayed option such as a contextual action (explained in additional detail below). In response to detecting gesture 630, device 600 has activated the function corresponding to user interface object 610-D in FIG. 6Q. That function is launching a clock application and displaying clock interface 632, which is displayed on display 602 in FIG. 6Q. Concurrently with launching the clock application and displaying clock interface 632 in FIG. 6R, device 600 produces, through audio output part 608, audio output 666 comprising the speech output "Clock. 7 PM." Audio output 666 indicates that a clock application has been launched and also indicates the current time.

Figure 6S:
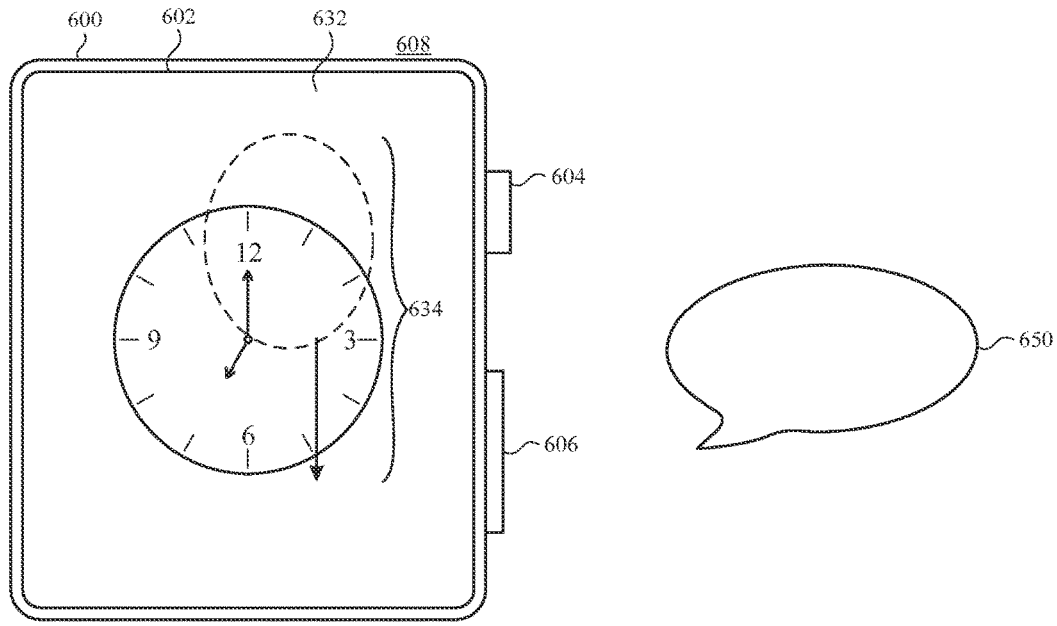

FIG. 6S depicts a user input for pre-selecting contextual actions in screenreader mode. In some embodiments, contextual actions are a series of options that are predefined with respect to an operating system, an application, a user interface, a user interface object, or any other contextual environment of an electronic device. Contextual actions, for example, can optionally include the selection of other user interface screens, altering device settings, altering application settings, performing an application function, or altering screenreader settings. The contextual actions associated with a particular state—that is, the contextual actions that will be available to a user at a given time—can optionally be arranged into an ordered progression or a list. A user can optionally scroll through the ordered progression or list of contextual actions, pre-selecting each contextual action one at a time. Upon pre-selection of a contextual action, the name or another indication of the contextual action can optionally be output through the voiceover function by audio output part 608. Upon detecting an input predetermined to pre-select a contextual action, a first contextual action in the list of contextual action can optionally be selected. In some embodiments, the first action is predetermined. In some embodiments, the first action is determined based on a characteristic of the input detected, such as location, type, or direction. In some embodiments, the first action is determined by device 600 based on contextual information available to the device. In some embodiments, a gesture in a first direction pre-selects a next contextual action in the ordered progression, while a gesture in a second direction pre-selects a previous contextual action in the ordered progression.

Upon pre-selecting a contextual action, in some embodiments, auditory output associated with the contextual action is produced. Upon pre-selecting a contextual action, in some embodiments, an indication of the contextual action or of contextual actions in general is displayed on display 602. In some embodiments, no visual indication of a pre-selected contextual action is displayed.

In some embodiments, the user input for pre-selecting a contextual action is a touch gesture. In some embodiments, the user input for pre-selecting a contextual action can optionally be any other suitable gesture or input through a hardware mechanism. In the depicted example, the user input for pre-selecting a contextual action is downward swipe gesture 634. In some embodiments, such a downward swipe input is an input for navigating forward through an ordered progression of contextual actions in screenreader mode. In some embodiments, swipe gesture 634 can optionally be detected at any location on display 602, such that it need not correspond to any displayed user interface object or displayed visual highlight. In some embodiments, swipe 634 can optionally be detected at any location on display 602 subject only to the qualification that the gesture must be recognized as a swipe gesture by touch-sensitive display 602. Location-independent gestures are particularly advantageous in screenreader applications because blind and low-vision users may have difficulty performing gestures that require a precise location.

Figure 6T:
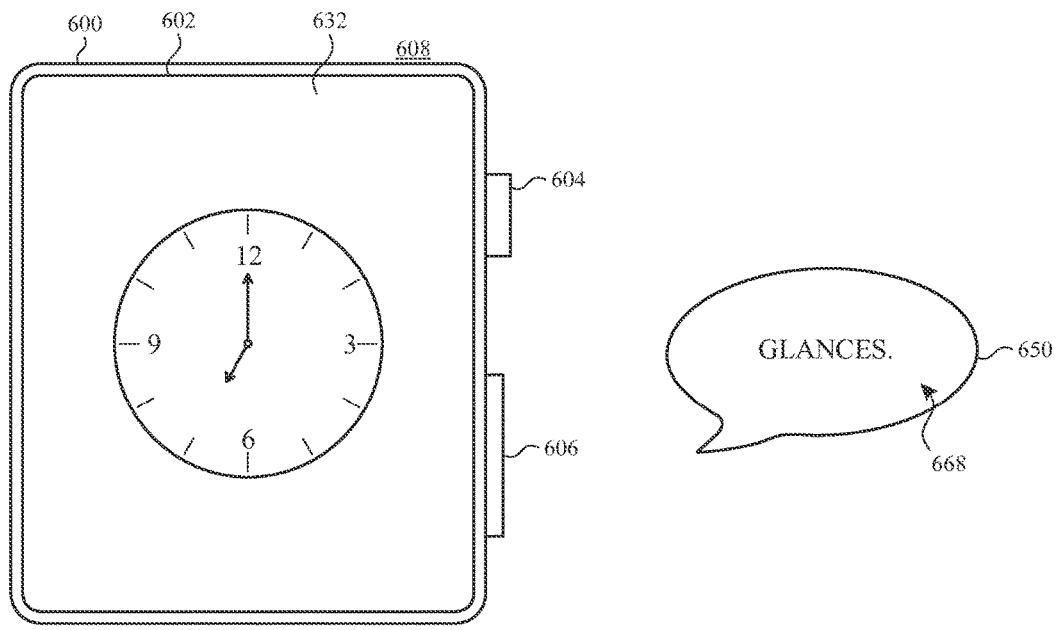

FIG. 6T depicts pre-selection of a contextual action in response to the user input detected in FIG. 6S. In FIG. 6T, a contextual action for activation of a "glances" application and launching of a glances interface is pre-selected. In the depicted example, glances is the first contextual action in an ordered progression of contextual actions. The contextual action is pre-selected without displaying any indication on display 602 that the contextual action is pre-selected (although in other embodiments a suitable visual indication can optionally be displayed). Not displaying any visual indication of a pre-selected contextual action may be advantageous for devices with small screens because there is a limited amount of space on the screen. Rather than displaying any indication of the pre-selected contextual action, device 600 produces, through audio output part 608, audio output 668 comprising the speech output, "Glances." Audio output 668 indicates that a contextual action for launching the glances application and interface has been pre-selected.

Figure 6U:
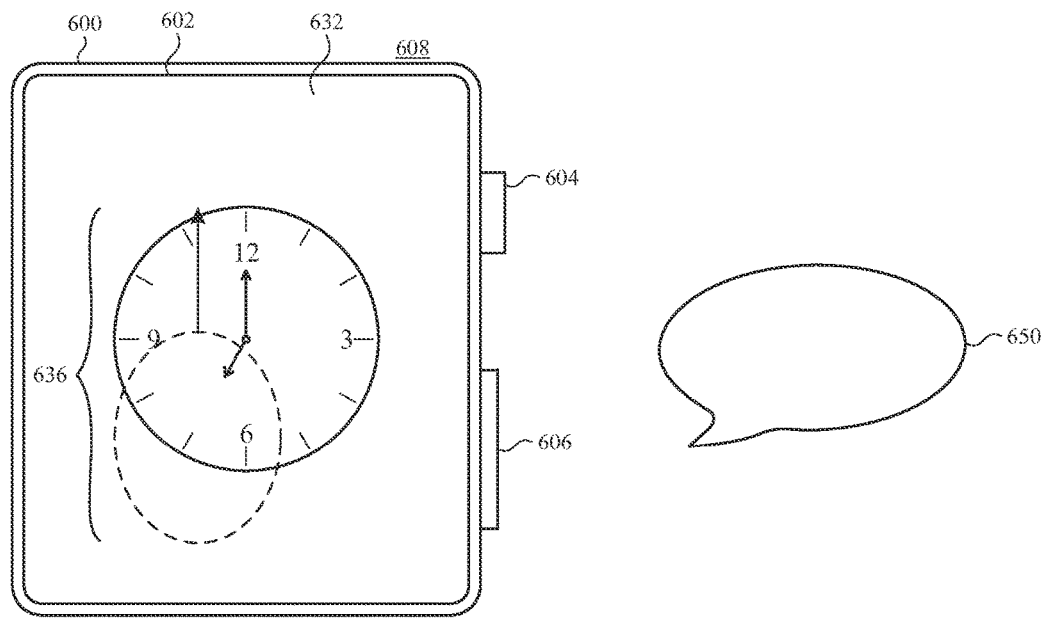

FIG. 6U depicts a user input for pre-selecting contextual actions in screenreader mode. In the depicted example, the user input for pre-selecting a contextual action is upward swipe gesture 636. In some embodiments, such an upward swipe input is an input for navigating backward through an ordered progression of contextual actions in screenreader mode. In some embodiments, swipe gesture 636 can optionally be detected at any location on display 602, such that it need not correspond to any displayed user interface object or displayed visual highlight. In some embodiments, swipe 636 can optionally be detected at any location on display 602 subject only to the qualification that the gesture must be recognized as a swipe gesture by touch-sensitive display 602. Location-independent gestures are particularly advantageous in screenreader applications because blind and low-vision users may have difficulty performing gestures that require a precise location.

Figure 6V:
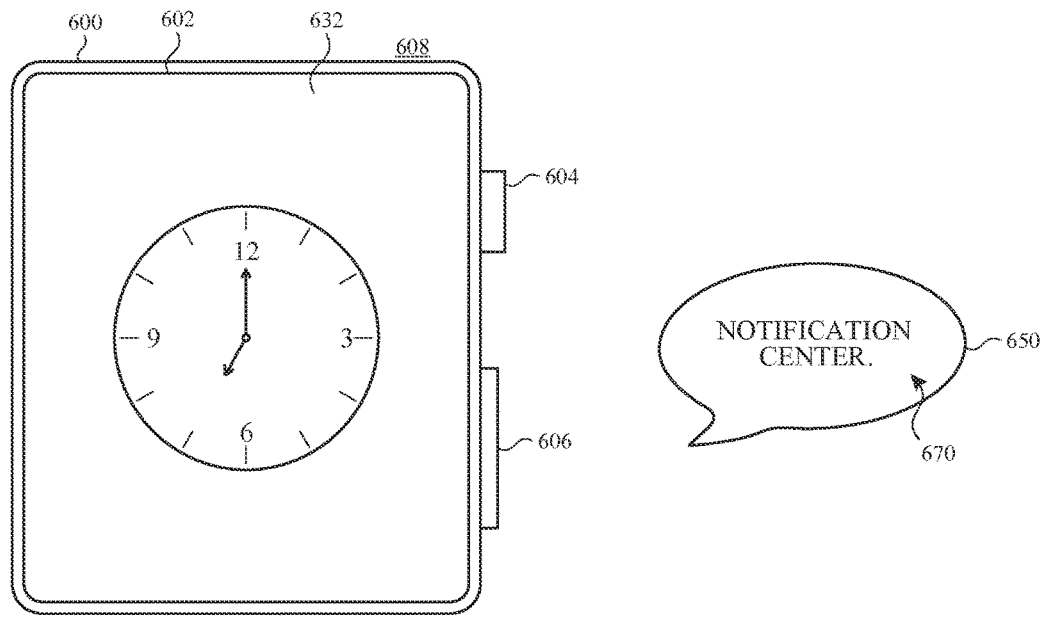
Figure 6W:
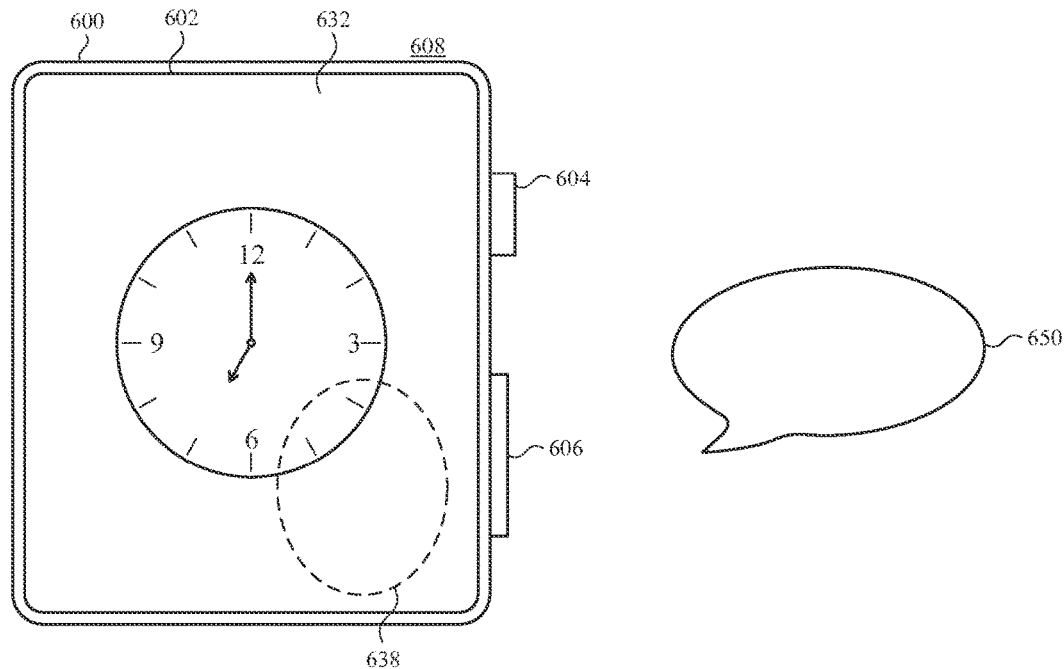

FIG. 6V depicts pre-selection of a contextual action in response to the user input detected in FIG. 6U. In FIG. 6V, a contextual action for activation of a "Notification Center" application and launching of a notification center interface is pre-selected. In the depicted example, notification center is the contextual action preceding glances in an ordered progression of contextual actions. The contextual action is pre-selected without displaying any indication on display 602 that the contextual action is pre-selected (although in other embodiments a suitable visual indication can optionally be displayed). Not displaying any visual indication of a pre-selected contextual action may be advantageous for devices with small screens because there is a limited amount of space on the screen. Rather than displaying any indication of the pre-selected contextual action, device 600 produces, through audio output part 608, audio output 670 comprising the speech output, "Notification Center." Audio output 670 indicates that a contextual action for launching the notification center application and interface has been pre-selected.

FIG. 6W depicts a user input for selecting an option, similar to the user input described above with respect to FIG. 6Q. In the depicted embodiment, the user input is a location-independent double-tap gesture 638. Gesture 638 is detected by device 600 at a location corresponding to clock interface 632. However, in the embodiment shown, the selection gesture could be detected at any other location on display 602 or could be detected through detection means other than display 602, and the effect of the location-independent selection gesture would be unchanged.

Figure 6X:
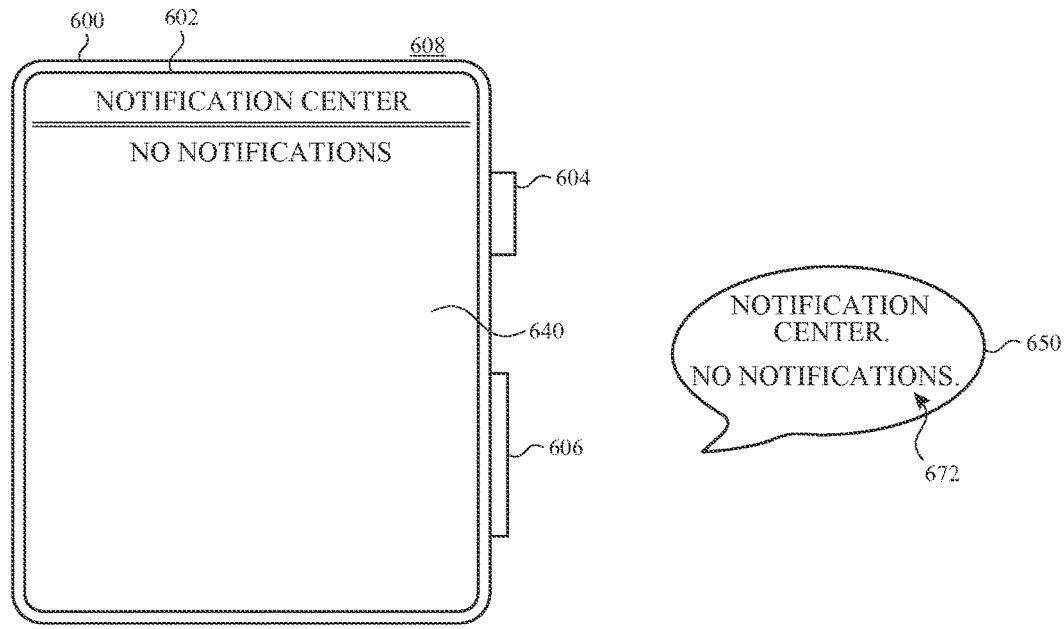

FIG. 6X depicts activation of an option in response to the user input detected in FIG. 6W. In FIG. 6X, in response to detecting gesture 638, device 600 activates the function associated with the option that was most recently spoken by the voiceover function. In the depicted example, the most recently voiced-over option is an undisplayed contextual action for launching the notification center application/interface. In some embodiments, the device can optionally activate such a most recently voiced-over undisplayed option even if another option is currently visually highlighted on the screen. In some other embodiments, pre-selection of an undisplayed contextual action causes the device to hide any visual highlight displayed on the screen in order to avoid user confusion. In response to detecting gesture 638, device 600 has activated the function corresponding to the notification center contextual action. That function is launching a notification center application and displaying notification center interface 640, which is displayed on display 602 in FIG. 6X. Concurrently with launching the notification center application and displaying notification center interface 640 in FIG. 6X, device 600 produces, through audio output part 608, audio output 672 comprising the speech output "Notification Center. No notifications." Audio output 672 indicates that a notification center application has been launched, and also indicates the presence or absence of notifications.

Figure 6Y:
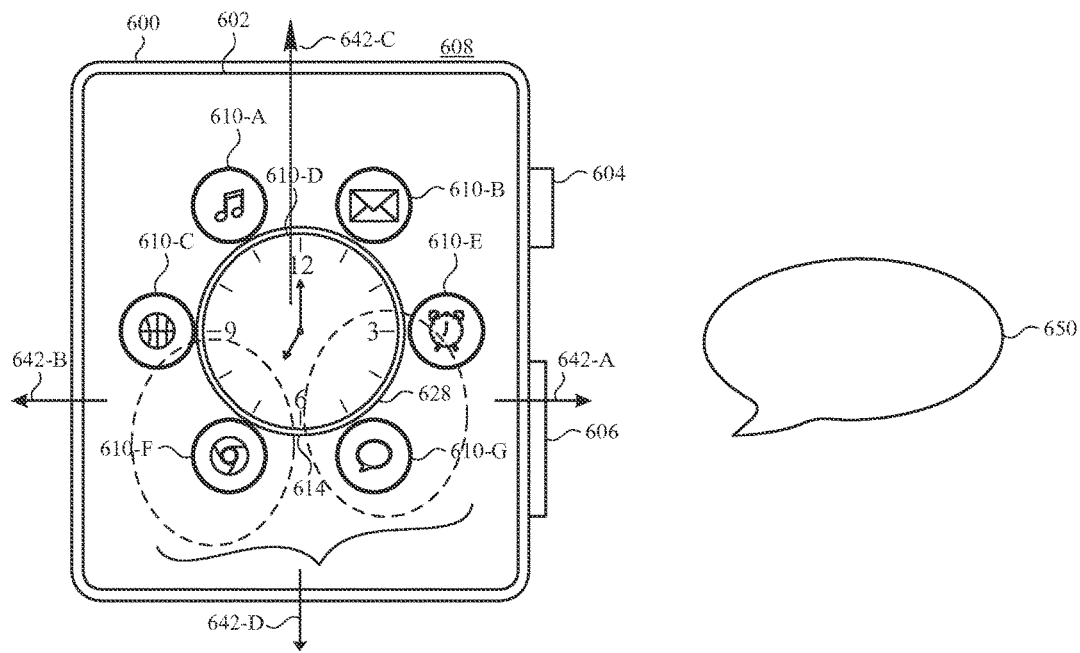

FIG. 6Y depicts a user interface for changing user interfaces, such as for scrolling a user interface or paging between different pages/screens. In the depicted example, the user input for changing user interfaces is upward two-finger swipe gesture 624, which can optionally be a rightward (642-A), leftward (642-B), upward (642-C), or downward (642-D) swipe gesture. In some other embodiments, such an input for changing user interfaces can optionally be any other suitable gesture, including gestures comprising a different number of contacts. In some embodiments, two-finger gestures may be more advantageous than gestures comprising more than two fingers (or other points of contact), because a small touch-screen or a small touch-sensitive surface may be ineffective at simultaneously detecting three points of contact, or users may find it cumbersome, uncomfortable, or inconvenient to attempt to use three-finger gestures on a small touch-screen or a small touch-sensitive surface. In some embodiments, a swipe input such as swipe 642 is an input for paging or scrolling in the corresponding direction. In some embodiments, swipe gesture 642 can optionally be detected at any location on display 602, such that it need not correspond to any displayed user interface object or displayed visual highlight. In some embodiments, swipe 642 can optionally be detected at any location on display 602 subject only to the qualification that the gesture must be recognized as a swipe gesture by touch-sensitive display 602. Location-independent gestures are particularly advantageous in screenreader applications because blind and low-vision users may have difficulty performing gestures that require a precise location.

Figure 6Z:
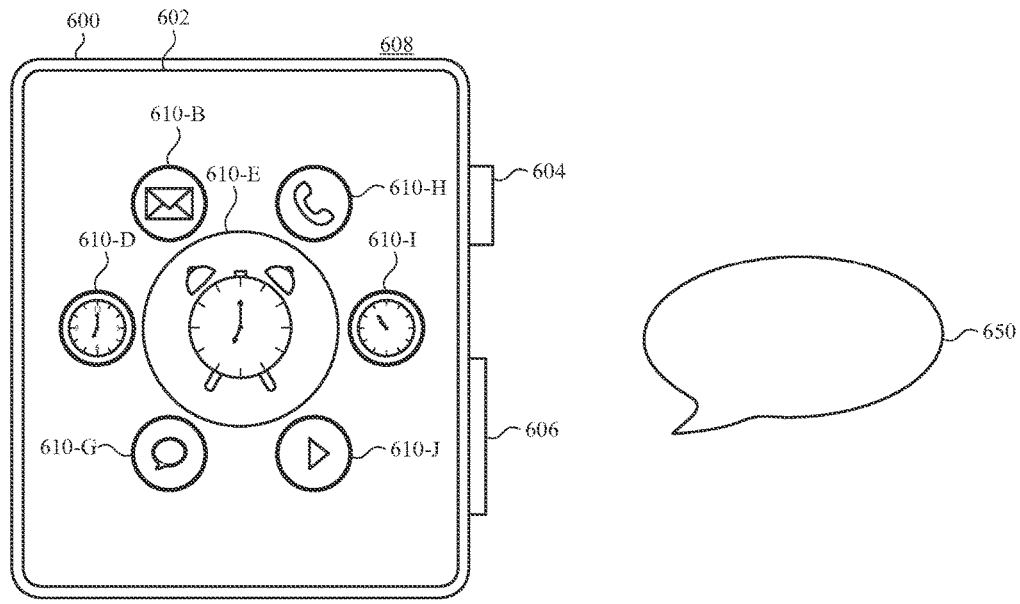
Figure 6A:
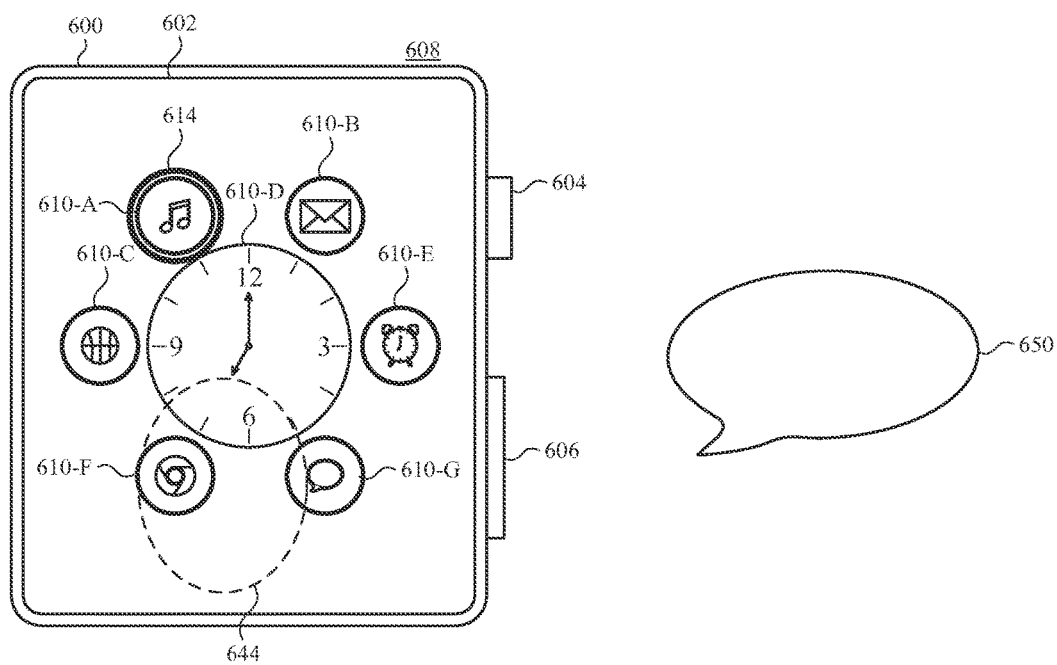
Figure 6C:
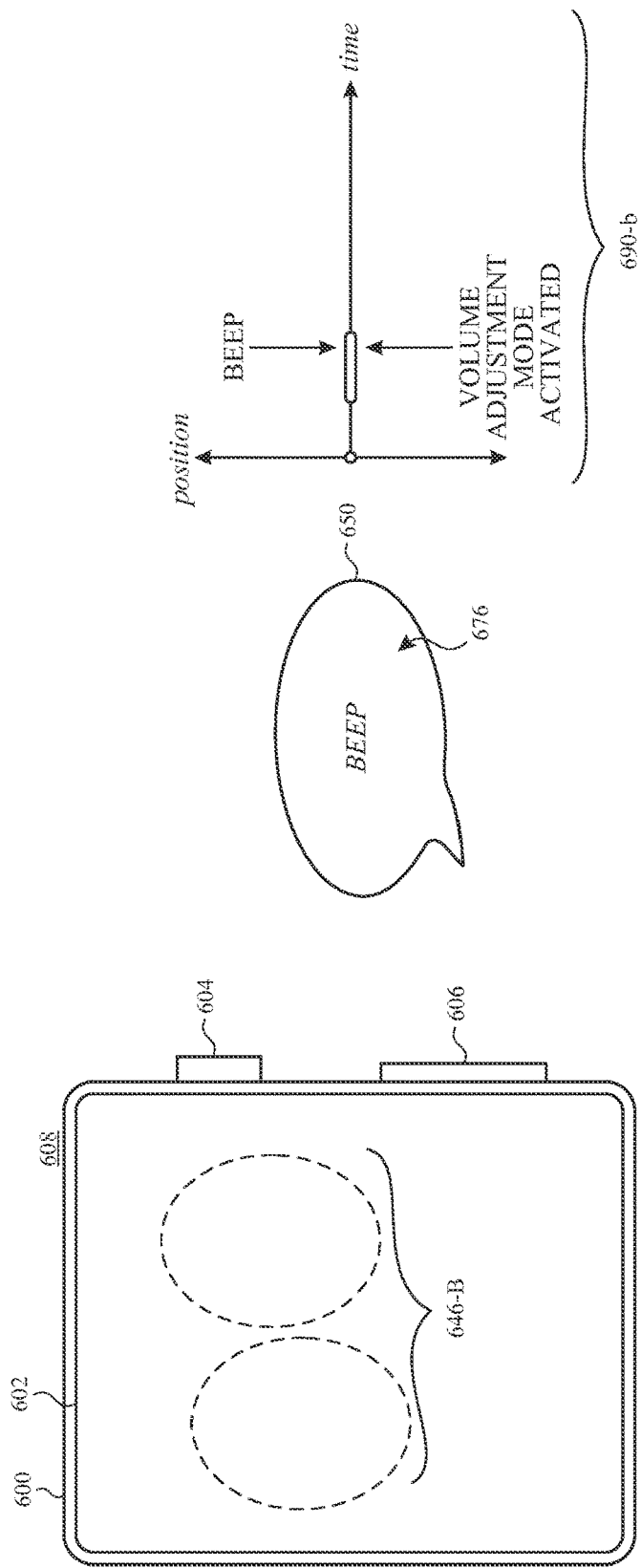
Figure 6D:
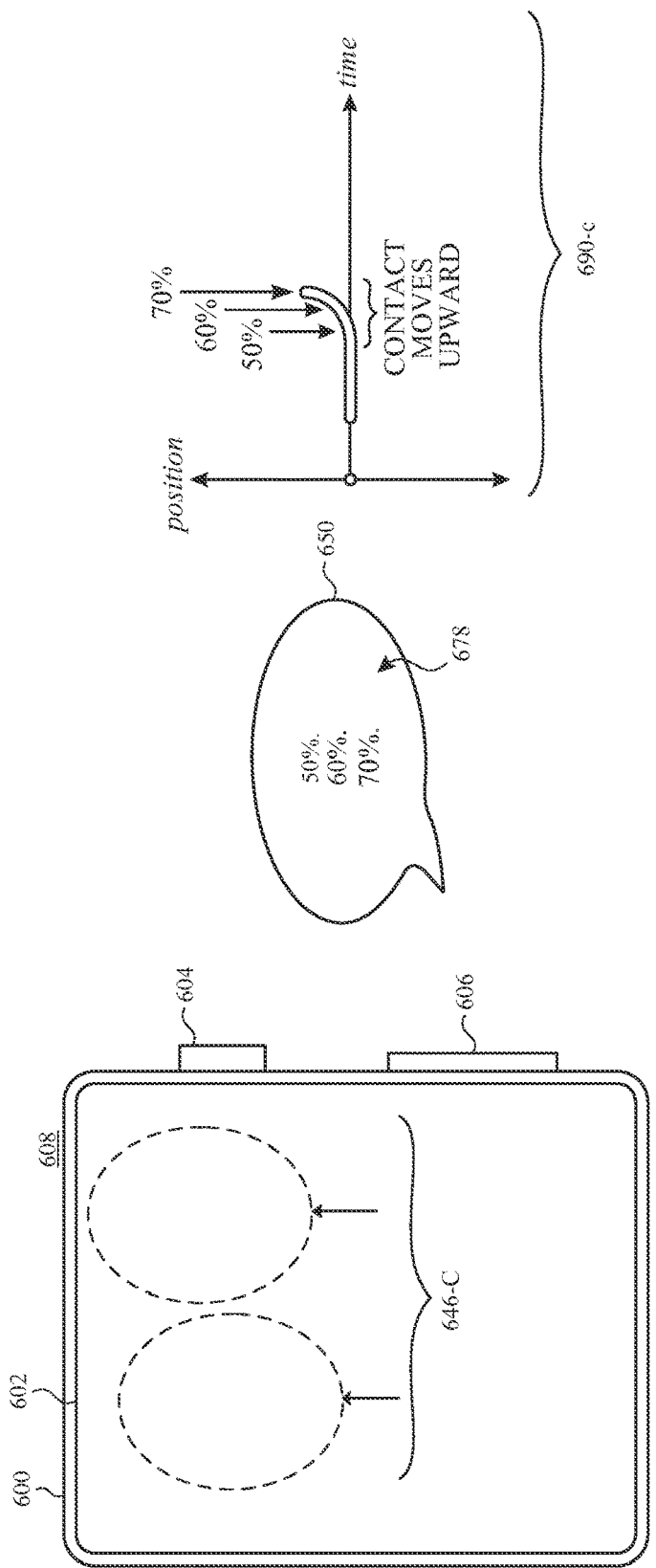
Figure 6E:
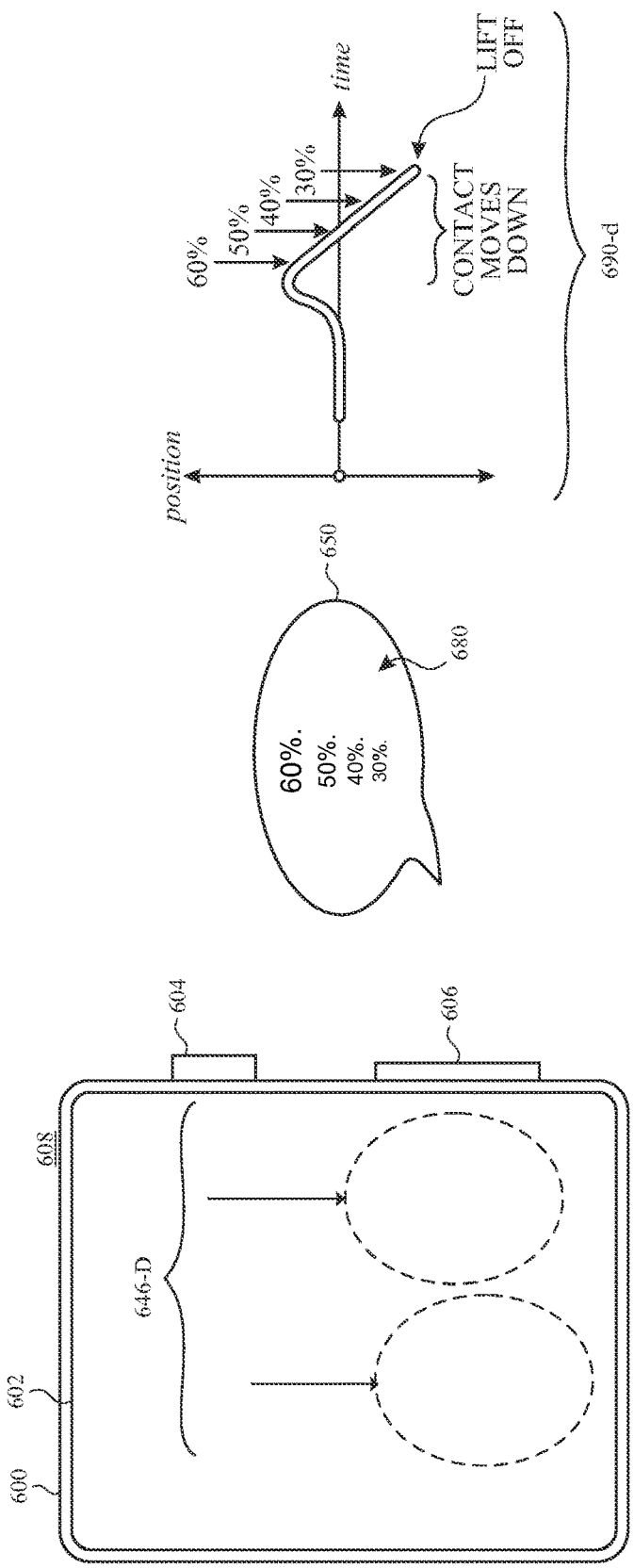

FIG. 6Z depicts changing user interfaces in response to the input detected in FIG. 6Y. FIG. 6Z depicts scrolling and/or paging the user interface displayed on display 602 to the left. In response to detecting swipe 642-B, the user interface objects displayed in FIG. 6Y can optionally be translated to the left. An animation of such translation can optionally be displayed. In some embodiments, certain user interface objects are translated or otherwise moved off the edge or removed from the user interface, and other new user interface objects are translated or moved onto or added to the user interface. In the depicted example, the seven user interface objects 610-A through 610-G in FIG. 6Y have been translated to the left, and leftmost user interface objects 610-A, 610-C, and 610-F have been moved off of display 602 to the left. New user interface objects 610-H through 610-J have been moved onto display 602 from the right. User interface objects 610-D and 610-E have changed size during the translation/paging/scrolling, because user interface object 610-D is no longer in the focal center of display 602 (and is now displayed at a smaller size in FIG. 6Z), while user interface object 610-E is now in the focal center of display 602 (and is now displayed at a larger size in FIG. 6Z). In some embodiments, paging/scrolling/translating/changing of user interfaces causes a new user interface object to be visually highlighted, voiced-over, and/or pre-selected in screenreader mode. In other embodiments, paging/scrolling/translating/changing of user interfaces does not cause any new user interface object to be visually highlighted, voiced-over, and/or pre-selected in screenreader mode.

FIG. 6AA depicts the detection of an input for activating a function of device 600. As will be explained in greater detail below, contact 644 can optionally constitute an input for activating a function of device 600. Contact 644 can optionally have a characteristic intensity that is above or below a predefined threshold. The characteristic intensity of contact 644 can optionally be detected by an intensity sensor such as intensity sensor 165 of device 600. In some embodiments, contact 644 can optionally be detected at any location on display 602, such that it need not correspond to any displayed user interface object or displayed visual highlight. In some embodiments, regardless of location, contact 644 activates a function corresponding to a visually highlighted user interface object, a most-recently voiced-over contextual action, or any other pre-selected option in screenreader mode. Location-independent gestures are particularly advantageous in screenreader applications because blind and low-vision users may have difficulty performing gestures that require a precise location.

Attention is now directed to embodiments for adjusting a volume setting of an electronic device. FIGS. 6BB-6EE depict some embodiments of techniques for adjusting a volume setting.

Each of FIGS. 6BB-6EE depicts an exemplary device 600 that can optionally embody the techniques described herein. In some embodiments, device 600 is device 100, 300, and/or 500 (FIGS. 1, 3, and 5). In some embodiments, device 600 is the same device 600 as depicted in FIGS. 6A-6AA. Device 600 has display 602, which is touch screen 112 (FIG. 1A), display 340 (FIG. 3A), and/or touch screen 504 in some embodiments. In some embodiments, display 602 is a pressure-sensitive display. In some embodiments, device 600 comprises a touch-sensitive surface and no display, or a touch-sensitive surface that is separate from a display. In some embodiments, device 600 comprises rotatable input mechanism 604, input mechanism 606, and audio output part 608, as described above with reference to FIG. 6A.

Each of FIGS. 6BB-6EE also depicts voice bubble 650, which is an abstraction depicting the auditory output associated with the depicted stage in the volume adjustment technique. Voice bubble 650 should be understood to represent one example of an audio output that can optionally be produced at a moment in time by device 600, such as through audio output part 608. The audio output, such as speech or tones, depicted in voice bubble 650 in FIGS. 6BB-6EE can optionally be produced by device 600 in response to the detection of a user input depicted in the same figure. (Please note that, in FIGS. 6A-6AA, voice bubble 650 generally depicted audio output produced in response to the input depicted in the previous figure, while in FIGS. 6BB-6EE, voice bubble 650 generally depicts auditory output associated with the ongoing input depicted in the current figure.)

Each of FIGS. 6BB-6EE also depicts graph 690, which is an abstraction depicting the position of a contact over time. The vertical axis of graph 690 depicts the position of a contact along a predefined axis, and the horizontal axis of graph 690 depicts time. Detection of a contact (including, in some embodiments, a multi-touch contact) is depicted by the thick white (outlined) line on the graphs. In FIGS. 6BB-6EE, graphs 690-*a* through 690-*d* show the development of the detected gestures and/or contacts over time in FIGS. 6BB-6EE. The graphs 690-*a* through 690-*d* are annotated with written explanations that will be explained with respect to each individual graph.

FIG. 6BB depicts a user input for activating a volume adjustment mode. The user input comprises contact(s) 646, as represented by contact(s) 646-A, which, in some embodiments, comprises all or part of a two-finger tap-and-a-half gesture. In some embodiments, contact(s) 646-A can optionally constitute a predefined gesture. A tap-and-a-half gesture, in some embodiments, is a gesture comprising a tap contact followed by a press contact. In some embodiments, device 600 determines that a tap-and-a-half gesture has been performed when it detects, through touch-sensitive display 602, (a) a first contact at a first location at a first time, (b) liftoff of the first contact, within a first predefined period of time of the first time, and within a first predefined distance of the first location, (c) a second contact, within a second predefined distance of the first contact and/or the liftoff of the first contact, and within a second predefined period of time after the first time or after liftoff, (d) the second contact being maintained, within a third predefined distance of the first contact and/or the liftoff of the first contact and/or the initial location of the second contact, for longer than a fourth predefined period of time. In some embodiments, a tap-and-a-half gesture can optionally be understood as a double-tap gesture, where the second tap is held in place. Graph 690-*a* depicts the device detecting contacts constituting the beginning portion of a tap-and-a-half gesture, with a tap contact detected at a first location at a first time, and a substantially stationary press contact detected at a nearby location at a time shortly thereafter. (Note that, in embodiments supporting multi-touch gestures and multi-touch contact such as two-finger taps and two-finger presses, device 600 can optionally interpret two points of contact as being detected at a single location, such as an average or centroid location.)

FIG. 6CC depicts the continuation of the user input for activating a volume adjustment mode from FIG. 6BB, and depicts the activation of volume adjustment mode. In FIG. 6CC, contact(s) 646 are maintained, as represented by contact(s) 646-B such that the press contact constituting a developing tap-and-a-half gesture is maintained in the same location for additional time, and the total time for which the press contact has been maintained exceeds the predefined threshold time for maintaining the press contact required to perform a tap-and-a-half gesture. In response to the length of the press contact exceeding the predefined threshold amount of time, volume adjustment mode is activated. To indicate that volume adjustment mode has been activated, device 600 produces auditory output 676, which is an alert tone associated with volume adjustment mode. In some other embodiments, device 600 produces auditory output speaking the current volume level, such as a numerical setting indication. In some embodiments, auditory output 676 is produced at the current volume level. As shown in graph 690-*b*, the tone of auditory output 676 is produced at substantially the same point in time that volume adjustment mode is activated.

FIG. 6DD depicts movement of contact(s) 646 to the position represented by contact(s) 646-C, and the adjustment of a volume setting in response to said movement. In FIG. 6DD, contact(s) 646 has been moved upward on display 602 from the previous location as represented by contact(s) 646-B in FIG. 6CC. The movement of contact(s) 646 can optionally have a displacement, a speed, and a velocity. The movement of contact(s) 646-C can optionally have a component in a predefined direction, and the movement can optionally have a magnitude of displacement, speed, and/or velocity in the predefined direction, as measured from the initial location of contact(s) 646 or as dynamically measured over various periods of time. In response to the movement of contact(s) 646 in FIG. 6DD, device 600 adjusts a volume setting of device 600. The volume setting is adjusted in accordance with the component of movement in the predefined direction, which in the depicted example is a vertical direction with respect to display 602. In the depicted example, the volume setting is adjusted in accordance with the total displacement in the predefined direction of contact(s) 646 from their initial position. In accordance with the movement of contact(s) 646 upward to the position represented by contact(s) 646-C, the volume setting is set to 50%, to 60%, and then to 70%.

As the volume is being adjusted, device 600 produces auditory output 678, through audio output part 608, indicating the volume setting to which the volume is adjusted. In the example shown, auditory output 678 speaks the new volume level as the new volume level is set: "50%. 60%. 70%." Each new volume level is spoken as device 600 sets the volume to predetermined volume settings. In some embodiments, every volume change is spoken. In some embodiments, only predetermined volume settings (such as multiples of 10%) are spoken. In some embodiments, a final volume setting is spoken upon volume setting mode being deactivated. In the example shown, each new volume setting is output at the volume corresponding to the new volume setting, such that 60% is spoken more loudly than "50%," and "70%" is spoken more loudly than "60%" and "50%." As shown in graph 960-*c*, the new volume settings are output by device 600 as the position of contact(s) 646 moves upward.

FIG. 6EE depicts contact(s) 646 to the position represented by contact(s) 646-D, and depicts the adjustment of a volume setting in response to said movement. In FIG. 6EE, contact(s) 646 has been moved downward on display 602 from the previous location as represented by contact(s) 646-C in FIG. 6DD. The movement of contact(s) 646 can optionally have a displacement, a speed, and a velocity. The movement of contact(s) 646-C can optionally have a component in a predefined direction, and the movement can optionally have a magnitude of displacement, speed, and/or velocity in the predefined direction, as measured from the initial location of contact(s) 646 or as dynamically measured over various periods of time. In response to the movement of contact(s) 646 in FIG. 6EE, device 600 adjusts a volume setting of device 600. The volume setting is adjusted in accordance with the component of movement in the predefined direction, which in the depicted example is a vertical direction with respect to display 602. In the depicted example, the volume setting is adjusted in accordance with the total displacement in the predefined direction of contact(s) 646 from their initial position. In accordance with the movement of contact(s) 646 downward to the position represented by contact(s) 646-D, the volume setting is set to 60%, to 50%, to 40%, and then to 30%.

As the volume is being adjusted, device 600 produces auditory output 680, through audio output part 608, indicating the volume setting to which the volume is adjusted. In the example shown, auditory output 678 speaks the new volume level as the new volume level is set: "60%. 50%. 40%. 30%." Each new volume level is spoken as device 600 sets the volume to predetermined volume settings. In the example shown, each new volume setting is output at the volume corresponding to the new volume setting, such that "60%" is spoken most loudly, and "30%" is spoken most quietly. As shown in graph 960-d, the new volume settings are output by device 600 as the position of contact(s) 646 moves downward.

FIG. 6EE further depicts liftoff of contact(s) 646, and depicts volume adjustment mode being deactivated. At the final location of contact(s) 646, as represented by contact(s) 646-D, device 600 detects liftoff of the contacts. Liftoff is also indicated in graph 690-d. In response to detecting liftoff of contact(s) 646, which has been maintained continuously since the beginning of the press contact of the tap-and-a-half gesture in FIG. 6BB, volume adjustment mode is deactivated. In some embodiments, a tone or other audio output indicating the deactivation of volume adjustment mode is produced by device 600 in response to detecting liftoff of contact(s) 646.

FIGS. 7A-7G are flow diagrams illustrating a method for navigating in a screenreader mode using an electronic device in accordance with some embodiments. Method 700 is performed at a device (e.g., 100, 300, 500) with a display. Some operations in method 700 can optionally be combined, the order of some operations can optionally be changed, and some operations can optionally be omitted.

As described below, method 700 provides an intuitive way to access, configure, and navigate a screenreader mode. The method reduces the cognitive burden on a user for accessing, configuring, and navigating a screenreader mode, thereby creating a more efficient human-machine interface. For battery-operated computing devices, enabling a user to access, configure, and navigate a screenreader mode faster and more efficiently conserves power and increases the time between battery charges.

Figure 7A:
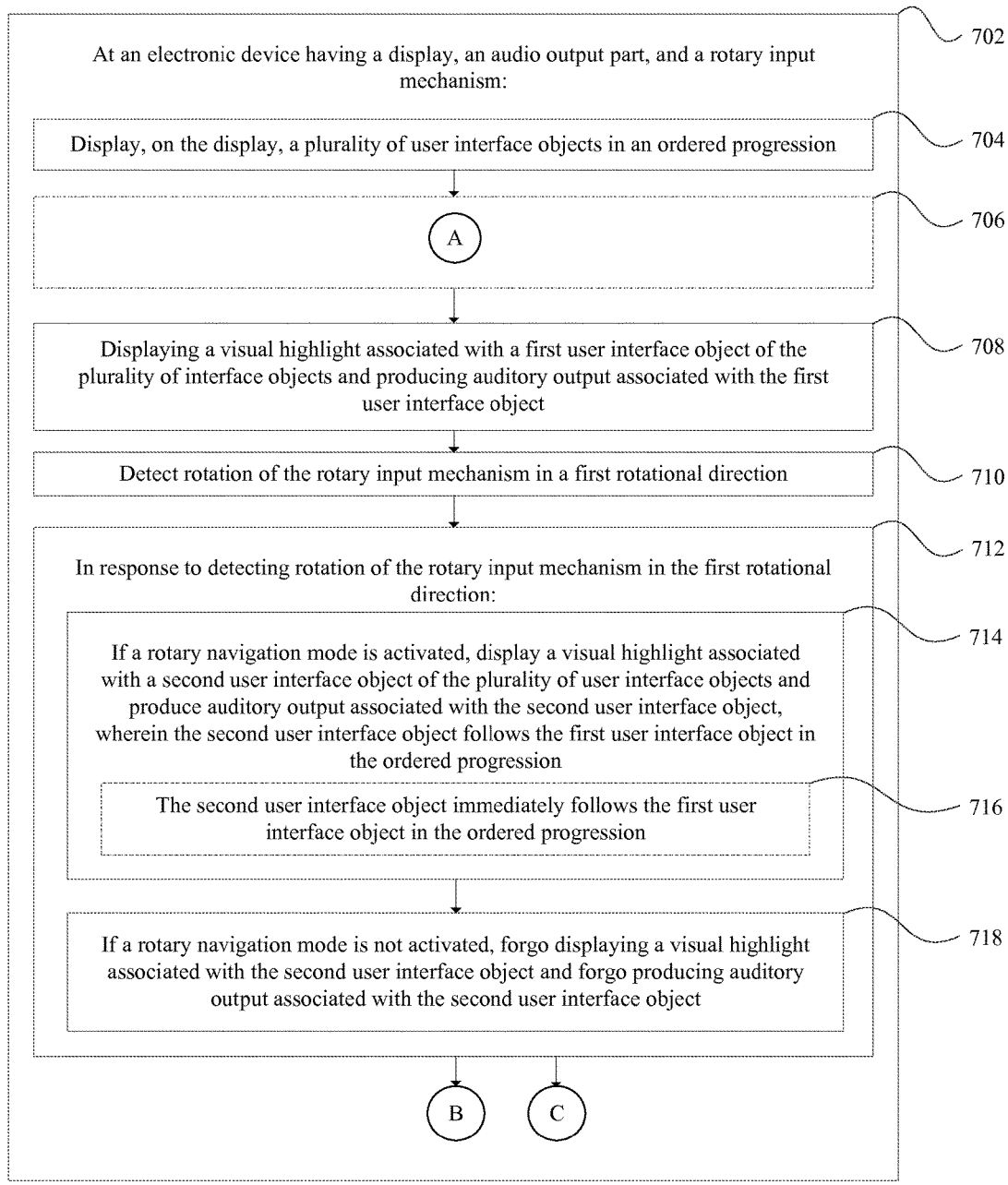
FIGS. 7A-7G are flow diagrams illustrating methods of navigating a screenreader user interface in accordance with some embodiments.
Figure 7B:
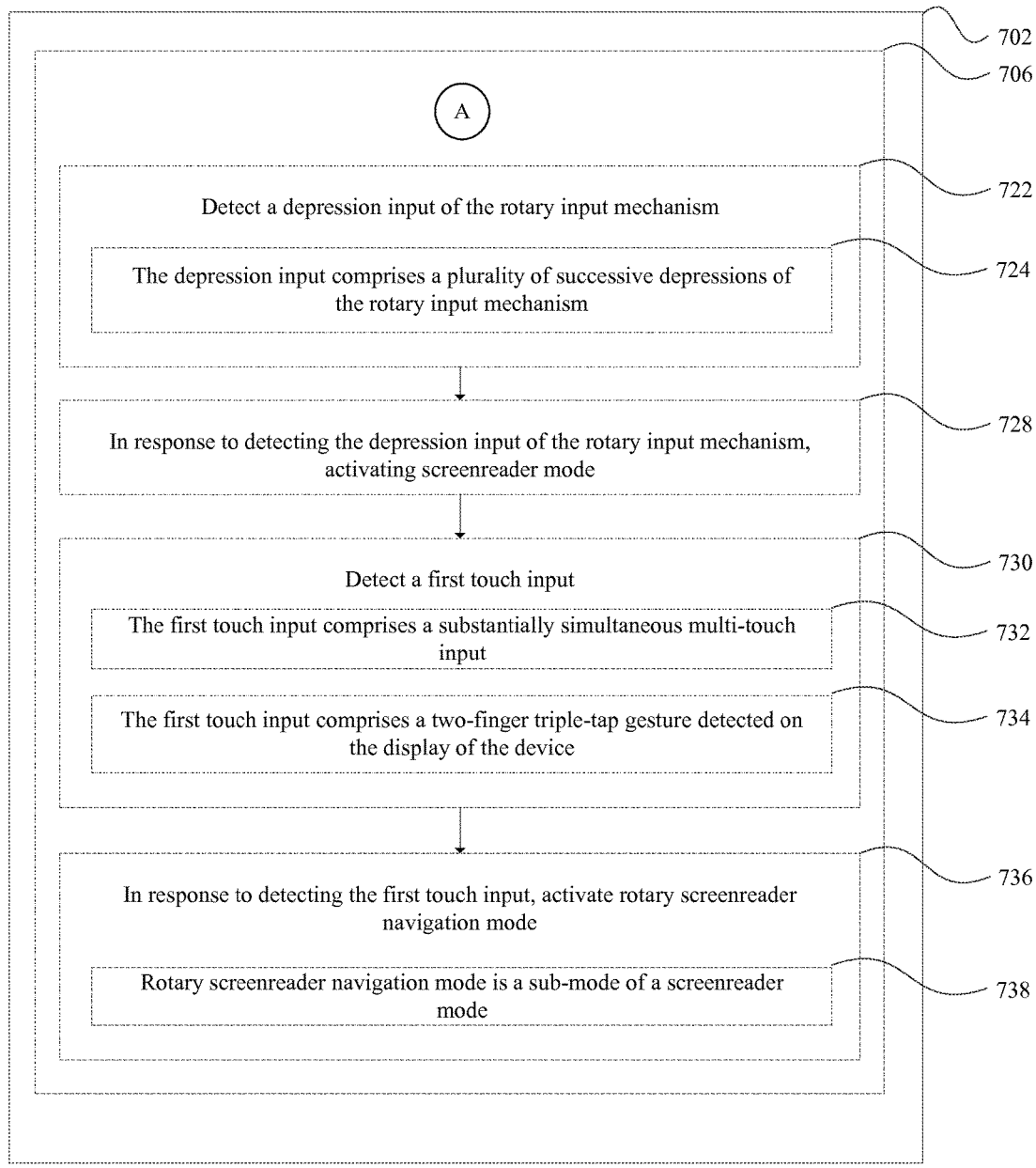

In FIG. 7A, at block 702, method 700 is performed at an electronic device having a display, an audio output part, and a rotary input mechanism. An exemplary device is device 600 of FIG. 6A, which has display 602, audio output part 608, and rotary input mechanism 604.

At block 704, the device displays, on the display, a plurality of user interface objects in an ordered progression. User interface objects can optionally be any element displayed as part of a user interface, such as a page, window, screen, title, image, video, text, icon, button, affordance, widget, or any other displayed element. An ordered progression can optionally be any logical sequential order assigned to user interface objects. A device displaying user interface objects can optionally assign one or more of a displayed plurality of user interface objects to one or more ordered progressions. In the case of multiple ordered progressions, the multiple ordered progressions can optionally contain common user interface objects (e.g., objects appearing in more than one ordered progression). In some embodiments, the position of user interface objects in an ordered progression is determined in accordance with the displayed position of a user interface object, such that the ordered progression proceeds logically across a display in an intuitive pattern, such as from left to right or from top to bottom. In some embodiments, an ordered progression proceeds in a pattern that simulates reading, proceeding along a first line from left to right, and then proceeding along a next (e.g., lower) line from left to right. An exemplary plurality of user interface objects are user interface objects 610-A through 610-F in FIG. 6A. In some embodiments, user interface objects 610-A through 610-F are assigned to an ordered progression starting with 610-A and proceeding alphabetically through 610-F.

Optionally, at block 706, the method 722-738 are performed. Attention is now directed to steps 722-738 in FIG. 7B.

Optionally, at block 722, the device detects a depression input of the rotary input mechanism. A depression input of a rotary input mechanism can optionally be any depression detected by the device when the rotary input mechanism is depressed, such as being depressed as a button. In some embodiments, the rotary input mechanism is depressed linearly, substantially along its axis of rotation, toward the body/housing of the device. A depression input of a rotary input mechanism can optionally comprise one or more depressions of the rotary input mechanism, the one or more depressions lasting for any period of time, and being separated from one another in time by any period(s) of time. An exemplary depression input of a rotary input mechanism is input 612 in FIG. 6A, which in some embodiments is a linear triple-press input. That is, input 612 in some embodiments comprises three presses of rotary input mechanism 604, each occurring within a predefined time period of one or both of the other two presses.

In some embodiments, using a triple-press of a rotary input mechanism to activate screenreader mode is advantageous because the multiple successive presses make it so that the input is unlikely to be entered by accident. It may be considered advantageous that an input for activating or configuring a screenreader mode is particularly difficult to accidently enter, because activation or configuration of a screenreader mode can optionally alter the basic control functions of a device, such as altering what controls or gestures are used to make selections of options. For this reason, users may find it difficult to deactivate screenreader modes if they accidentally activate them, so efforts should be taken to ensure that such modes are not accidentally activated. Using a hardware mechanism such as rotatable input mechanism 604 to activate screenreader mode may be advantageous because it allows for users who are blind or have low-vision to activate screenreader mode without having to navigate displayed menus or input touch inputs to any precise location on a touch-sensitive surface. That is, blind or low-vision users may easily locate rotatable input mechanism 604 by tactile means and activate screenreader mode without having to see any displayed interfaces or enter any touch inputs.

Optionally, at block 724, the depression input comprises a plurality of successive depressions of the rotary input mechanism. In some embodiments, the device is configured to recognize predefined inputs, and some such predefined inputs are depression inputs comprising a plurality of successive depressions of the rotary input mechanism. In some embodiments, if the rotary input mechanism is only depressed once, then the depression will not register as the predefined depression input. Only if the predefined plurality of successive depressions of the rotary input mechanism are detected will the device, in some embodiments, register the predefined depression input. In some embodiments, the depression input is predefined to further require a predefined number of depressions, that the depressions last for predefined lengths of time, and that the depressions be separated in time by predefined lengths of time. An exemplary depression input comprising a plurality of successive depressions of a rotary input mechanism is input 612, which in some embodiments is a triple-press input.

Optionally, at block 728, in response to detecting the depression input of the rotary input mechanism, the device activates screenreader mode. In some embodiments, a screenreader mode is a mode of the device in which options are read aloud to the user; that is, an audio output part such as an integrated speaker, audio data port, or other communication interface is configured to output an audio indication to provide information to the user about an option that may be selected, an action that may be executed, the current interface displayed on the screen, or other information about the interface. In this way, the device in screenreader mode can optionally be said to "read" the screen aloud to the user. The device can optionally read aloud a name, word, explanation, or other audio cue associated with any element of a user interface, such as the name of an interface, the content of an interface, objects displayed in an interface, or options available for selection in the interface.

In some embodiments, a user can optionally navigate through a plurality of options that may be selected, and the device will read aloud each separate option as the user navigates. When the user hears the name of an option that he wishes to select, the user can optionally select the option by delivering an input to the device. In this way, in some embodiments, the user can optionally determine what options are available on a particular user interface or screen by listening to the names of the available options and the use can optionally do so before entering any input that will select one of the options. Blind and low-vision users may efficiently navigate complex user interfaces in this manner while minimizing accidental or incorrect inputs and maximizing speed and accuracy.

In some embodiments, screenreader mode can optionally be activated and deactivated in accordance with certain user inputs. In some embodiments, activation of the screenreader mode alters a gesture set for controlling the device, such that a single gesture or a single input detected at the same time in the same interface at the same location causes the device to perform different functions in accordance with whether or not screenreader mode is activated. In some embodiments, screenreader mode supports multiple control modes, such that a user can optionally configure the gesture set for controlling screenreader mode by activating and deactivating control sub-modes of screenreader mode. In some embodiments, screenreader functionalities can optionally be persistent, without regard for whether a screenreader mode is activated.

In some embodiments, upon activation of screenreader mode, a device automatically pre-selects an option, visually highlights a displayed option, and/or produces auditory output associated with a displayed or undisplayed option. For example, a device can optionally automatically visually highlight a first user interface object on a current user interface and can optionally produce auditory output indicating the user interface, one or more user interface objects, or one or more available options. In some embodiments, the device produces auditory output indicating that screenreader mode has been activated.

An exemplary activation of screenreader mode is depicted in FIG. 6B, in which device 600 displays visual highlight 614 and produces auditory output indicating the activation of screenreader mode and the pre-selection of user interface object 610-A.

In some embodiments, the same input that activates screenreader mode deactivates screenreader mode, such that it can optionally be toggled on and off by repeating the same input.

Optionally, at block 730, the device detects a first touch input. In some embodiments, the first touch input is any touch input and/or any predefined touch gesture detected on a touch-sensitive surface or a touch-screen. A touch input can optionally comprise one or more contacts detected by a touch-sensitive surface or a touch-screen, the one or more contacts lasting for any length of time and being separated from one another in time by any length(s) of time. A touch-input can optionally be a single-touch input (comprising one point of contact at a time) or a multi-touch input (comprising multiple simultaneous points of contact with the same touch-sensitive surface). An exemplary touch input is input 612 in FIG. 6A, which in some embodiments is a two-finger triple-tap input. That is, input 612 in some embodiments comprises three successive two-finger taps of display 602, each occurring within a predefined time period of one or both of the other two taps.

Optionally, at block 732, the first touch input comprises a substantially simultaneous multi-touch input. In some embodiments, touch inputs comprise more than one separate point of contact detected substantially simultaneously by the same touch-sensitive surface or by discrete touch-sensitive surfaces. Multi-touch inputs can optionally include pinching and depinching gestures, multi-point rotating gestures, multi-point swipe or flick or drag gestures, multi-point press gestures, and/or multi-point tap gestures. An exemplary multi-touch input is two-finger triple-tap 620, which comprises three successive taps, each tap comprising a substantially simultaneous tap by two fingers.

Optionally, at block 734, the first touch input comprises a two-finger triple-tap gesture detected on the display of the device. In some embodiments, touch inputs are detected on the display of the device, which can optionally be a touch-sensitive display. In some embodiments, the first touch input is a two-finger triple tap gesture detected on the display of the device. An exemplary two-finger triple-tap gesture detected on the display of the device is two-finger triple-tap 620 in FIG. 6G, which is detected on display 602 of device 600. In some embodiments, using a two-finger triple-tap input to activate rotary navigation mode may be advantageous because the multiple fingers (or other contact points) and multiple successive taps make it so that the gesture is unlikely to be entered by accident. It may be considered advantageous that an input for activating or configuring a screenreader mode or a screenreader sub-mode (such as rotary navigation mode) is particularly difficult to accidently enter, because activation or configuration of a screenreader mode or sub-mode can optionally alter the basic control functions of a device, such as altering what controls or gestures are used to make selections of options. For this reason, users may find it difficult to deactivate screenreader modes or sub-modes if they accidentally activate them, so efforts should be taken to ensure that such modes are not accidentally activated.

In some embodiments, the user inputs for activating or deactivating rotary navigation mode are location-independent, such that the gesture need not correspond to a particular location or a particular displayed object. Location-independent gestures are particularly advantageous in screenreader applications because blind and low-vision users may have difficulty performing gestures that require a precise location.

Optionally, at block 736, in response to detecting the first touch input, the device activates rotary screenreader navigation mode.

In some embodiments, rotary navigation mode allows for navigation in screenreader mode (e.g., movement of a visual highlight from one displayed user interface object to another) to be carried out through interaction with a rotary input mechanism. Rotary navigation mode can optionally cause a native function of a rotary input mechanism (e.g., scrolling, zooming, etc.) to be suppressed or forgone in favor of a screenreader navigation function. Rotary navigation function, in some embodiments, allows for multiple input techniques for navigating in screenreader mode by allowing for navigation either by a touch input or by rotation of a rotary input mechanism. In some embodiments, touch inputs can optionally be utilized to navigate by one displayed user interface object at a time, while rotary inputs can optionally offer additional flexibility. In some embodiments, a shorter or slower rotation of a rotary input mechanism can optionally cause navigation by one user interface object, while a faster or longer rotation of a rotary input mechanism can optionally cause navigation by more than one user interface object. In some embodiments, predefined distance/angle and/or speed thresholds can optionally be defined, or such thresholds can optionally be dynamically defined, to determine a number of user interface objects by which to navigate in response to a rotation of a rotary input mechanism. In some embodiments, the rate of navigation or the number of user interface objects by which a visual highlight is moved or an option is advanced can optionally be directly proportional to an angle, distance, or speed of rotation of a rotary input mechanism, while in other embodiments, the rate of navigation or number of options navigated can optionally have a non-linear relationship to the rate or distance/angle of rotation (e.g., a very fast rotation can optionally cause navigation all the way to a final option with less total rotation angle than would be required to navigate to the last option one at a time in response to a slower rotation).

In some embodiments, upon activation of rotary navigation mode, a device automatically pre-selects an option, visually highlights a displayed option, and/or produces auditory output associated with a displayed or undisplayed option. For example, a device can optionally automatically visually highlight a first user interface object on a current user interface, and can optionally produce auditory output indicating the user interface, one or more user interface objects, or one or more available options. In some embodiments, the device produces auditory output indicating that screenreader mode has been activated.

An exemplary activation of rotary navigation mode is depicted in FIG. 6H, in which device 600 displays visual highlight 614 and produces auditory output indicating the activation of rotary navigation mode and the pre-selection of user interface object 610-A.

In some embodiments, the same input that activates rotary navigation mode deactivates rotary navigation mode, such that it can optionally be toggled on and off by repeating the same input.

Optionally, at block 738, rotary screenreader navigation mode is a sub-mode of a screenreader mode. In some embodiments, rotary navigation mode is a sub-mode of screenreader mode, such that rotary navigation mode can optionally be activated and deactivated while screenreader mode is activated. In some embodiments, deactivation of screenreader mode can optionally automatically deactivate rotary navigation mode. In some embodiments, the activation or deactivation of rotary navigation mode can optionally be stored such that it is persistent within screenreader mode; a device can optionally thus store an indication as to whether rotary navigation mode is activated or deactivated, such that it can be automatically activated or deactivated upon a subsequent reactivation of screenreader mode. In some embodiments, if a user enters an input for activating rotary navigation mode when screenreader mode is not activated, the input has no effect; in some other embodiments, screenreader mode is automatically responsively activated, and rotary navigation mode is responsively activated.

Attention is now directed back to FIG. 7A, to method step 708, which follows optional method steps 710 and 722-738.

At block 710, the device displays a visual highlight associated with a first user interface object of the plurality of interface objects and produces auditory output associated with the first user interface object. In some embodiments, displayed visual highlights correspond to all or part of an audio output that is concurrently produced or provided, or that is produced or provided at a time corresponding to the beginning of the display of the visual highlight. A visual highlight can optionally be any visual element displayed, such as a color, symbol, shape, brightness, animation, or other displayed element, and can optionally be associated with any user interface object.

In some embodiments, displaying visual highlights representing pre-selection of user interface objects and producing auditory outputs associated with pre-selected options are central functions of screenreader techniques. In some embodiments, a visual highlight and/or an audio output indicate the pre-selection of a user interface object or other displayed or undisplayed option. That is, in some embodiments, the production of audio output and/or display of a visual highlight indicate a user interface object that will be activated or a function that will be selected in response to the detection of a selection input.

In some embodiments, a visual highlight is displayed and corresponding auditory output is produced in response to activation of screenreader mode. An exemplary visual highlight associated with a first user interface object and auditory output associated with the first user interface object are visual highlight 614 and auditory output 651, both of which correspond to user interface object 610-A and are displayed in response to the activation of screenreader mode.

Optionally, at block 710, the device detects rotation of the rotary input mechanism in a first rotational direction. In some embodiments, the rotary input mechanism has one or more axes of rotation and is rotatable in one or more rotational directions. In some embodiments, the rotary input mechanism is rotatable in rotational directions that are opposite one another. In some embodiments, the device is configured to detect rotation of rotary input mechanism in one or more predefined directions. An exemplary rotation of the rotary input mechanism in a first rotational direction is rotation 622 in FIG. 6I, which is a rotation of rotary input mechanism 604 in a clockwise direction as viewed from the right edge of the device.

At block 712, the device performs method steps 714, 718, and optionally 716 in response to detecting rotation of the rotary input mechanism in the first rotational direction. For example, steps 714-718 are performed, in some embodiments, in response to the detection, at block 710, of rotation 622 in FIG. 6I.

At block 714, if a rotary navigation mode is activated, the device displays a visual highlight associated with a second user interface object of the plurality of user interface objects and produces auditory output associated with the second user interface object, wherein the second user interface object follows the first user interface object in the ordered progression. In some embodiments, upon detecting rotation of the rotary input mechanism in the first rotational direction, the device determines whether rotary navigation mode is activated. If the device determines that rotary navigation mode is activated, then the device causes a visual highlight to be displayed that is associated with a next user interface object in the ordered progression of user interface objects, and causes auditory output associated with the second user interface object to be produced. In some embodiments, the next user interface object is an object to the right of or below the current user interface object.

In some embodiments, the rotational direction for navigating forward through user interface objects in the ordered progression can optionally be either rotational direction about the axis of rotation depicted. In some embodiments, the rotational direction can optionally be fixed by the device, or can optionally be manually set by the user. In some embodiments, the designation of which rotational direction corresponds to forward navigation can optionally be informed by conventions of the operation of conventional watch crowns (such as which rotational direction usually corresponds to setting time forward).

An exemplary second user interface object following a first user interface object in an ordered progression is user interface object 610-B in FIG. 6J, which is highlighted with visual highlight 614 in FIG. 6J in response to rotation 622 in FIG. 6I. User interface object 610-B follows user interface object 610-A in the ordered progression discussed above with reference to block 704. In FIG. 6J, the device, having determined that rotary navigation mode is activated, responds to rotation 622 in FIG. 6I by moving visual highlight 614 to user interface object 610-B, and by producing auditory output 658, which corresponds to user interface object 610-B.

Optionally, at block 716, the second user interface object immediately follows the first user interface object in the ordered progression. In some embodiments, the second user interface object immediately follows the first user interface object in the ordered progression, such that the first and second user interface objects are in immediately adjacent positions in the ordered progression. Exemplary immediately adjacent user interface objects are user interface objects 610-A and 610-B of FIG. 6J, which do not have any other user interface objects between them in the ordered progression discussed above with reference to block 704.

In some other embodiments, the second user interface object does not immediately follow the first user interface object in the ordered progression, such that the second user interface object can optionally be located several positions subsequent to the first user interface object in the ordered progression. In some embodiments, in response to a rotation of the rotary input mechanism that satisfies predefined criteria, such as speed criteria or angular displacement criteria, the device responds by pre-selecting a user interface object that is several positions removed from the previously pre-selected user interface object. For example, if the rotary input mechanism is rotated above a predefined speed threshold, the visual highlight can optionally navigate/progress forward by several user interface objects instead of only by one. In some embodiments, the number of user interface objects by which the visual highlight progresses can optionally be proportional, such as directly proportional, to a rotational displacement or to a speed of the rotation detected. Thus, the visual highlight can optionally jump several positions ahead in the ordered progression, and the auditory output produced can optionally correspond to a user interface object several positions ahead of the first user interface object in the ordered progression.

At block 718, if a rotary navigation mode is not activated, the device forgoes displaying a visual highlight associated with the second user interface object and forgoes producing auditory output associated with the second user interface object. In some embodiments, upon detecting a rotation of the rotary input mechanism, the device determines whether rotary navigation mode is activated. If the device determines that rotary navigation mode is not activated, then, in some embodiments, the device causes a native function of the rotary input mechanism, such as a persistent function or an interface-specific contextual function, to be performed. For example, the device can optionally zoom content or scroll content in response to and in accordance with the rotation of the rotary input mechanism, rather than moving the visual highlight in screenreader mode and rather than producing auditory output associated with screenreader mode.

Figure 7C:
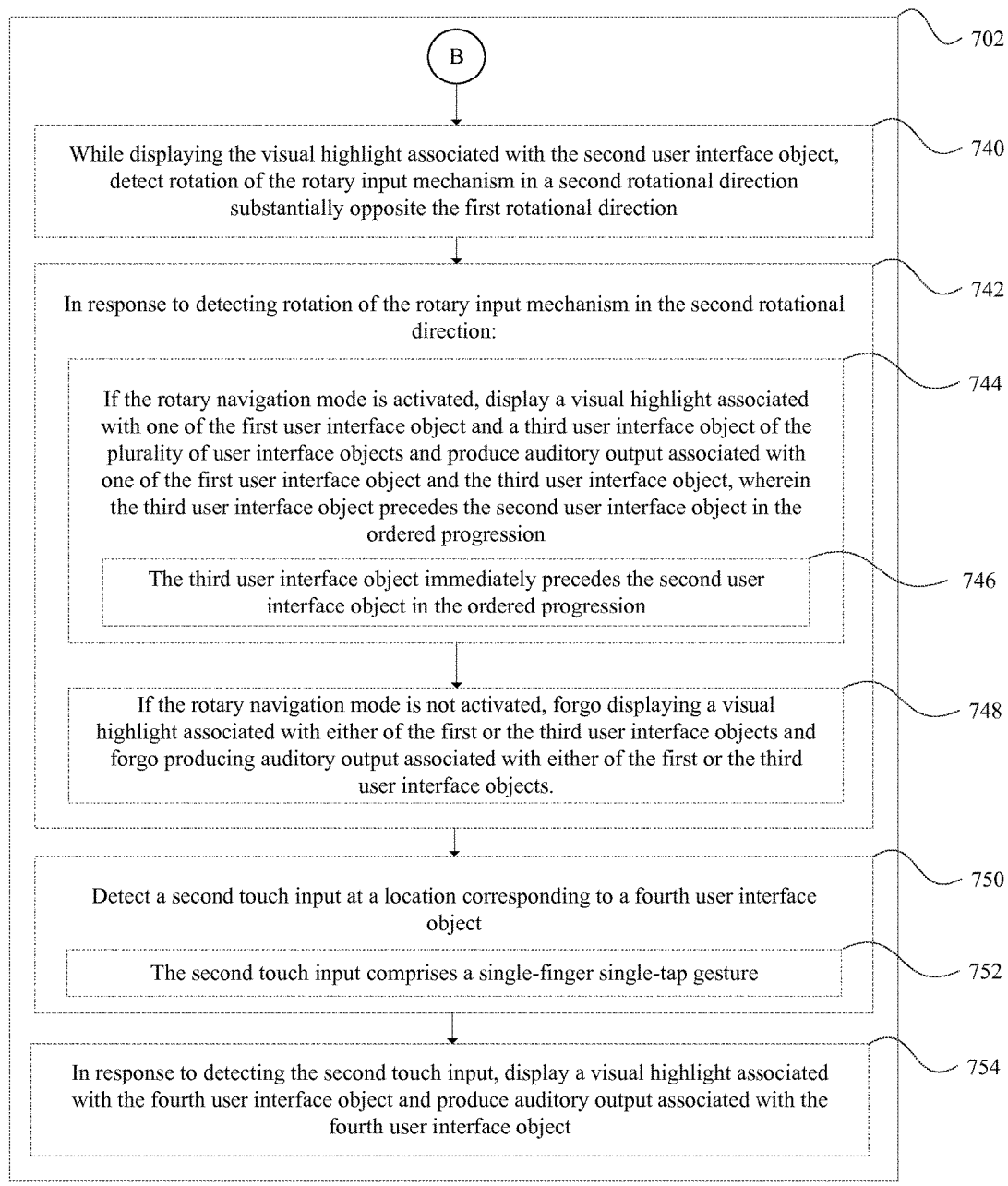

In FIG. 7C, optionally, at block 740, which can optionally follow from block 712 and 718, while displaying the visual highlight associated with the second user interface object, the device detects rotation of the rotary input mechanism in a second rotational direction substantially opposite the first rotational direction. An exemplary rotation of the rotary input mechanism in a second rotational direction substantially opposite the first rotational direction is rotation 624 in FIG. 6K, which is a rotation of rotary input mechanism 604 in a counter-clockwise direction as viewed from the right edge of the device.

Optionally, at block 742, the device optionally performs method steps 744-748 in response to detecting rotation of the rotary input mechanism in the second rotational direction. For example, steps 744-748 are performed, in some embodiments, in response to the detection, at block 710, of rotation 624 in FIG. 6K.

Optionally, at block 744, if the rotary navigation mode is activated, the device displays a visual highlight associated with one of the first user interface object and a third user interface object of the plurality of user interface objects and produces auditory output associated with one of the first user interface object and the third user interface object, wherein the third user interface object precedes the second user interface object in the ordered progression. As described above with reference to blocks 712-718, in some embodiments, the device determines whether rotary navigation mode is active, and, if it is, navigates the visual highlight in accordance with the detected rotation. As described above with reference to blocks 712-718, in some embodiments, the detected rotation causes the device to move the visual highlight by one step in the ordered progression, while, in some embodiments, the detected rotation causes the device to move the visual highlight by multiple steps in the ordered progression. Accordingly, in some embodiments, when the second user interface object is visually highlighted and the rotation in the second rotational direction is detected, the visual highlight can optionally be moved back to either the first user interface object or a third user interface object. While both the first and the third user interface objects precede the second user interface object in the ordered progression, which of the first and third objects is pre-selected can optionally depend on a characteristic (such as speed or rotational displacement) of the second rotation, as such a characteristic can optionally determine the number of steps moved backward, and thus whether the third or first user interface object is highlighted. In some embodiments, a user interface object preceding a current user interface object in an ordered progression is to the left of or above the current user interface object.

In some embodiments, the rotational direction for navigating backward through user interface objects in the ordered progression can optionally be either rotational direction about the axis of rotation depicted. In some embodiments, the rotational direction can optionally be fixed by the device, or can optionally be manually set by the user. In some embodiments, the designation of which rotational direction corresponds to backward navigation can optionally be informed by conventions of the operation of conventional watch crowns (such as which rotational direction usually corresponds to setting time backward).

For example, in FIG. 6L, in response to rotation 624 in FIG. 6K, first user interface object 610-A is again highlighted with visual highlight 614, and auditory output 660, which corresponds to user interface object 610-A, is output by device 600. User interface object 610-A precedes user interface object 610-B in the ordered progression discussed above with reference to block 704.

Optionally, at block 746, the third user interface object immediately precedes the second user interface object in the ordered progression. Exemplary immediately adjacent user interface objects are user interface objects 610-B and 610-A of FIG. 6L, which do not have any other user interface objects between them in the ordered progression discussed above with reference to block 704. As discussed above with respect to block 716, in some other embodiments, the third user interface object does not immediately precede the second user interface object, such as when the rotary input mechanism is rotated quickly or through a large angular displacement, causing the visual highlight to move backward through the ordered progression by several user interface objects.

Optionally, at block 748, if the rotary navigation mode is not activated, the device forgoes displaying a visual highlight associated with either of the first or the third user interface objects and forgoes producing auditory output associated with either of the first or the third user interface objects. In some embodiments, upon detecting a rotation of the rotary input mechanism, the device determines whether rotary navigation mode is activated. If the device determines that rotary navigation mode is not activated, then, in some embodiments, the device causes a native function of the rotary input mechanism, such as a persistent function or an interface-specific contextual function, to be performed. For example, the device can optionally zoom content or scroll content in response to and in accordance with the rotation of the rotary input mechanism, rather than moving the visual highlight in screenreader mode and rather than producing auditory output associated with screenreader mode.

Optionally, at block 750, the device detects a second touch input at a location corresponding to a fourth user interface object. In some embodiments, the second touch input is any single-touch or multi-touch contact or gesture. In some embodiments, the second touch input is detected on a touch sensitive-surface or a touch-screen at a location corresponding to a fourth user interface object. In some embodiments, the second touch input is detected on a touch screen at the location at which the fourth user interface object is currently displayed. In some embodiments, the fourth user interface object is any user interface object that is not currently pre-selected or visually highlighted. An exemplary second touch input at a location corresponding to a fourth user interface object is contact 628 in FIG. 6O, which is a single-touch single-tap gesture detected on display 602 at the location at which user interface object 610-D is currently displayed.

Optionally, at block 752, the second touch input comprises a single-finger single-tap gesture. In some embodiments, a single-finger gesture can optionally refer to any single-contact gesture, such as one performed by a stylus. In some embodiments, a multi-finger gesture can optionally refer to any multi-contact gesture, such as one performed by a stylus. An exemplary single-finger single-tap gesture is contact 628 in FIG. 6O.

Optionally, at block 754, in response to detecting the second touch input, the device displays a visual highlight associated with the fourth user interface object and produces auditory output associated with the fourth user interface object. In some embodiments, in response to detecting a contact or predetermined gesture type at a location corresponding to a user interface object, the device in screen-reader mode causes the specified user interface object to be visually highlighted, and causes auditory output associated with the specified user interface object to be produced. Thus, in some embodiments, tapping a displayed user interface object causes the user interface object to be pre-selected and highlighted, without regard for the ordered progression of the displayed plurality of user interface objects. In some embodiments, a visual highlight can optionally move directly to the user interface object associated with the location of a contact. In some embodiments, an animation can optionally be displayed, such as a fade animation, a translation animation, and/or an animation in which the visual highlight progresses sequentially through the ordered progression to the destination user interface object. In some embodiments, an animation can optionally show a visual highlight changing size or shape, or changing appearance in any other way.

An exemplary response to detecting a second touch input at a location corresponding to a fourth user interface object is depicted in FIG. 6P, in which visual highlight 614 is moved directly to user interface object 610-D from user interface object 610-A, in accordance with the contact detected at the location of user interface object 610-D in FIG. 6O, and without regard for the position of either user interface object 610-A or user interface object 610-D in an ordered progression. In addition to visual highlight 614 moving to user interface object 610-D, auditory output 664 corresponding to user interface object 610-D is produced in FIG. 6P in response to tap 628 in FIG. 6O.

Figure 7D:
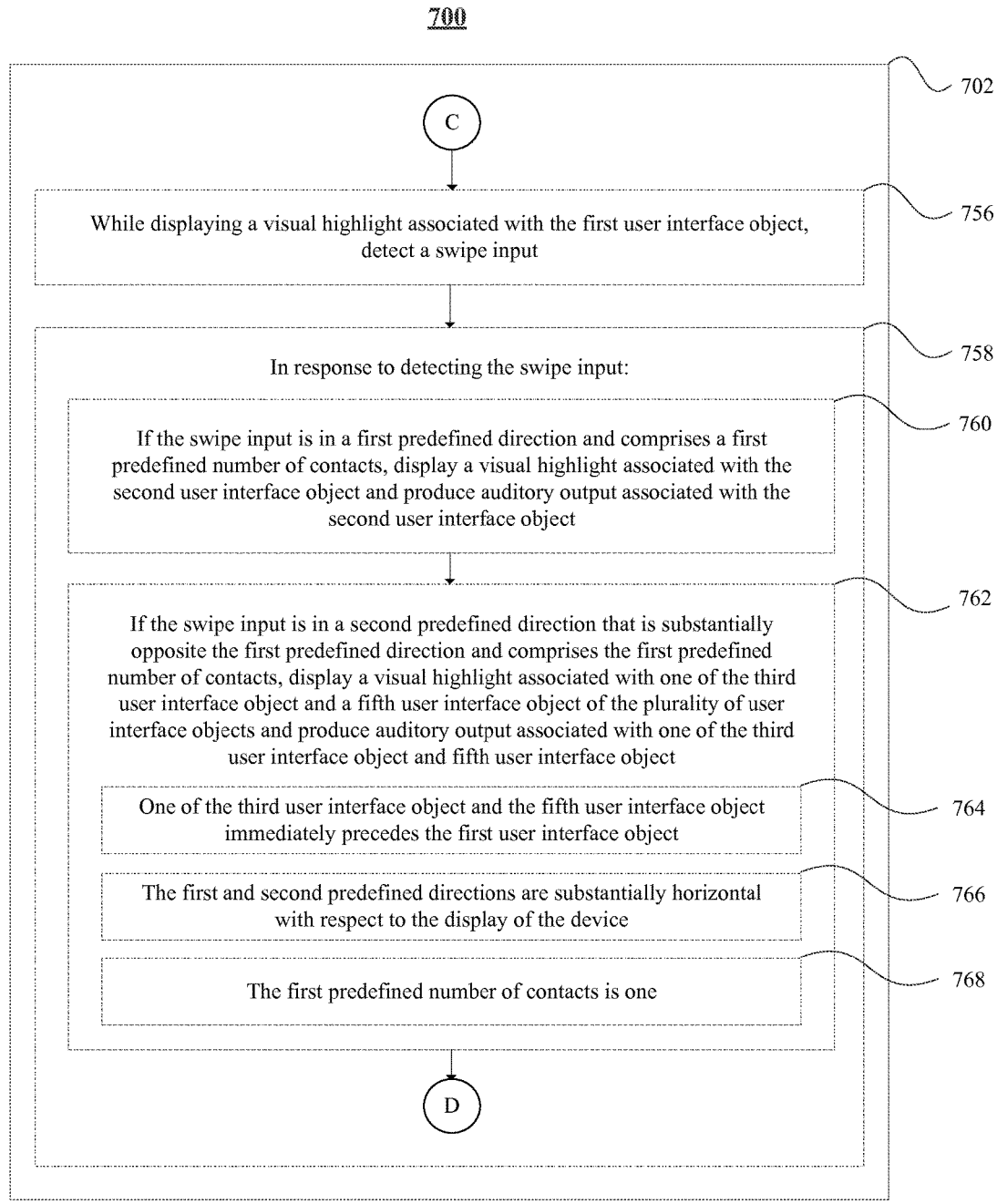

In FIG. 7D, optionally, at block 756, which can optionally follow from block 712 and 718, while displaying a visual highlight associated with the first user interface object, the device detects a swipe input. A swipe input can optionally be any swipe, flick, or drag gesture detected on a touch-sensitive surface or a touch-sensitive display. A swipe input can optionally comprise a single-contact swipe and/or a multi-contact swipe. A swipe input can optionally comprise motion in one or more directions. A swipe input can optionally have a displacement, a speed, and a velocity, and it can optionally have a displacement, a speed and/or a velocity in one or more predefined directions, as measured from the beginning of the swipe contact or as measured dynamically at various time periods while the swipe input is ongoing. Exemplary swipe inputs detected while displaying a visual highlight associated with the first user interface object are swipe 616 in FIG. 6C and swipe 642 in FIG. 6Y.

Optionally, at block 758, the device optionally performs method steps 760-782 in response to detecting the swipe input. For example, steps 760-782 are performed, in some embodiments, in response to the detection, at block 756, of swipe 616 in FIG. 6C. In some other embodiments, for example, steps 760-782 are performed, in some embodiments, in response to the detection, at block 756, of swipe 642 in FIG. 6Y.

Optionally, at block 760, if the swipe input is in a first predefined direction and comprises a first predefined number of contacts, the device displays a visual highlight associated with the second user interface object and produces auditory output associated with the second user interface object. In some embodiments, upon detecting a swipe while in screenreader mode, the device determines whether the swipe comprises a first predefined number of contacts. In some embodiments, upon detecting a swipe while in screenreader mode, the device determines whether the swipe is in a first predefined direction. In some embodiments, if the swipe is in a first predefined direction and comprises a first predefined number of contacts, then the device causes the screenreader visual highlight to navigate forward through the ordered progression by one user interface object. In some embodiments, the first predefined direction is substantially rightward, as defined with respect to a touch-sensitive surface or a touch-sensitive display. In some embodiments, the first predefined number of contacts is one.

For example, in some embodiments, a single-finger rightward swipe causes the visual highlight to progress forward by one user interface object, while a single-finger leftward swipe causes the visual highlight to move backward by one user interface object. In some embodiments, swipes detected in screenreader mode can optionally have the same effect as some rotations of the rotary input mechanism detected in screenreader mode, as discussed above with reference to blocks 712-718 and 740-748, in that they can optionally cause the visual highlight of an immediately-next or immediately-previous user interface object and the production of auditory output associated therewith.

An exemplary swipe gesture in a first predefined direction comprising a first predefined number of contacts is swipe 616 in FIG. 6C, and an exemplary second user interface object is user interface object 610-B in FIG. 6D. Swipe 616 is a rightward, single-finger swipe. In response to detecting swipe 616 in FIG. 6C, device 600 moves visual highlight 614 from first user interface object 610-A to second user interface object 610-B, and produces auditory output 652, as shown in FIG. 6D.

Optionally, at block 762, if the swipe input is in a second predefined direction that is substantially opposite the first predefined direction and comprises the first predefined number of contacts, the device displays a visual highlight associated with one of the third user interface object and a fifth user interface object of the plurality of user interface objects and produces auditory output associated with one of the third user interface object and fifth user interface object.

In some embodiments, upon detecting a swipe while in screenreader mode, the device determines whether the swipe comprises a first predefined number of contacts. In some embodiments, upon detecting a swipe while in screenreader mode, the device determines whether the swipe is in a second predefined direction that is substantially opposite the first predefined direction. In some embodiments, if the swipe is in a second predefined direction and comprises a first predefined number of contacts, then the device causes the screenreader visual highlight to navigate backward through the ordered progression by one user interface object. In some embodiments, the second predefined direction is substantially leftward, as defined with respect to a touch-sensitive surface or a touch-sensitive display. In some embodiments, the first predefined number of contacts is one.

For example, in some embodiments, a single-finger rightward swipe causes the visual highlight to progress forward by one user interface object, while a single-finger leftward swipe causes the visual highlight to move backward by one user interface object. In some embodiments, swipes detected in screenreader mode can optionally have the same effect as some rotations of the rotary input mechanism detected in screenreader mode, as discussed above with reference to blocks 712-718 and 740-748, in that they can optionally cause the visual highlight of an immediately-next or immediately-previous user interface object and the production of auditory output associated therewith.

In some embodiments, the user interface object that is immediately previous to the first user interface object in the ordered progression is the third user interface object discussed above with respect to block 744. In some other embodiments, the user interface object that is immediately previous to the first user interface object in the ordered progression is a fifth user interface object that is different from the third user interface object. This variability is due to the fact that, in some embodiments, the rotations described above cause movement of the visual highlight by one position in the ordered progression, while in other embodiments, the rotations described above cause movement of the visual highlight by more than one position in the ordered progression.

In some embodiments, if user interface object 610-A was visually highlighted and pre-selected when the device 600 of FIG. 6C detected a single-finger leftward swipe (not pictured), the device would respond in some embodiments by moving visual highlight 614 backward by one position in the ordered progression. In some embodiments, if there was no previous user interface object in the ordered progression displayed on display 602, device 600 would page the user interface to display additional user interface objects. In some embodiments, device 600 would "loop" to the other end of the ordered progression and move the visual highlight to the last user interface object in the ordered progression. In some embodiments, device 600 would not loop, but would instead produce an indication, such as an auditory output tone, indicating that an end of the ordered progression has been reached.

In the example depicted in FIGS. 6E and 6F, device 600 responds to the detection of single-finger leftward swipe 618 by moving visual highlight 614 from user interface object 610-B to user interface object 610-A and producing auditory output 654 associated with user interface object 610-A. This example embodies detection of a swipe having a first number of predefined contacts and moving in a second predefined direction, and responsively visually highlighting a user interface object and producing auditory output associated therewith.

Optionally, at block 764, one of the third user interface object and the fifth user interface object immediately precedes the first user interface object. An example of a user interface object immediately preceding another user interface object is user interface object 610-A immediately preceding user interface object 610-B in FIG. 6E in the ordered progression explained above with reference to block 704. In some embodiments, user interface object 610-G could be considered to immediately precede user interface object 610-A in FIG. 6E in the ordered progression explained above with reference to block 704, as the ordered progression can optionally "loop" continuously around from the last object in the progression forward to the first, and from the first object in the progression backward to the last.

Optionally, at block 766, the first and second predefined directions are substantially horizontal with respect to the display of the device. An example of the first and second directions being substantially horizontal with respect to the display of the device is depicted in FIGS. 6C and 6E, in which the first and second predefined directions are substantially rightward and substantially leftward with respect to display 602.

Optionally, at block 768, the first predefined number of contacts is one. An example of the first predefined number of contacts being one is depicted in FIGS. 6C and 6E, in which swipes 616 and 618 are single-contact swipes.

Figure 7E:
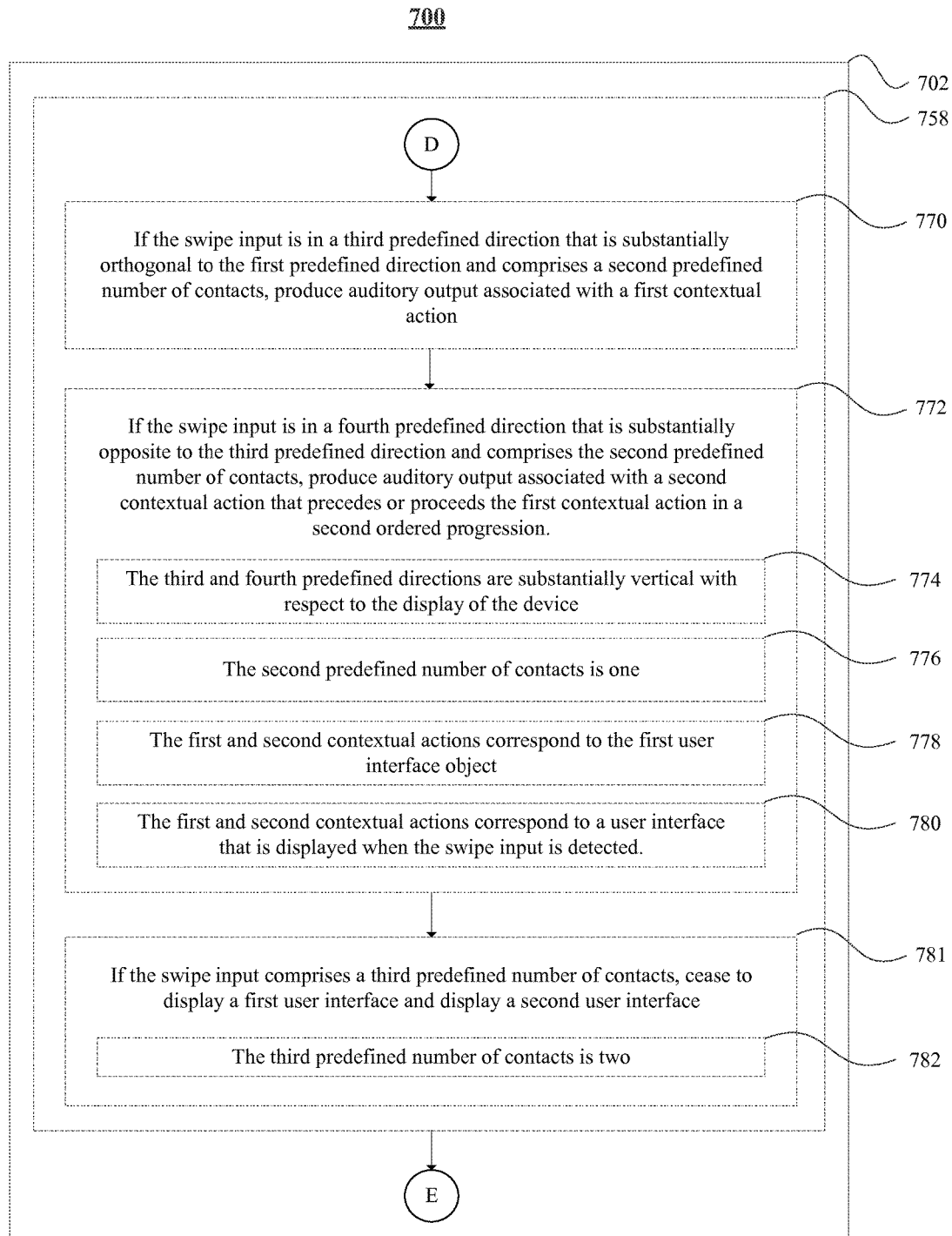

In FIG. 7E, optionally, at block 770, which can optionally follow from blocks 762 and 768, if the swipe input is in a third predefined direction that is substantially orthogonal to the first predefined direction and comprises a second predefined number of contacts, the device produces auditory output associated with a first contextual action. In some embodiments, upon detecting a swipe while in screenreader mode, the device determines whether the swipe comprises a first predefined number of contacts. In some embodiments, upon detecting a swipe while in screenreader mode, the device determines whether the swipe is in a third predefined direction that is substantially orthogonal to the first and/or second direction. In some embodiments, if the swipe is in a third predefined direction and comprises a first predefined number of contacts, then the device pre-selects a contextual action and causes auditory output to be produced indicating the pre-selected contextual action. In some embodiments, the first predefined direction is substantially downward, as defined with respect to a touch-sensitive surface or a touch-sensitive display. In some embodiments, the first predefined number of contacts is one. Thus, in some embodiments, upward and downward single-finger swipes while in screenreader mode cause the device to pre-select available contextual actions.

In some embodiments, contextual actions are a series of options that are predefined with respect to an operating system, an application, a user interface, a user interface object, or any other contextual environment of an electronic device. Contextual actions, for example, can optionally include the selection of other user interface screens, altering device settings, altering application settings, performing an application function, or altering screenreader settings. The contextual actions associated with a particular state—that is, the contextual actions that will be available to a user at a given time—can optionally be arranged into an ordered progression or a list. A user can optionally scroll/cycle/navigate through the ordered progression or list of contextual actions, pre-selecting each contextual action one at a time. Upon pre-selection of a contextual action, the name or another indication of the contextual action can optionally be provided by auditory output. Upon detecting an input pre-determined to pre-select a contextual action, a first contextual action in the list of contextual action can optionally be selected. In some embodiments, the first action is predetermined. In some embodiments, the first action is determined based on a characteristic of the input detected, such as location, type, or direction. In some embodiments, the first action is determined based on contextual information available to the device. In some embodiments, a gesture in a first direction pre-selects a next contextual action in the ordered progression, while a gesture in a second direction pre-selects a previous contextual action in the ordered progression.

Upon pre-selecting a contextual action, in some embodiments, auditory output associated with the contextual action is produced. Upon pre-selecting a contextual action, in some embodiments, an indication of the contextual action or of contextual actions in general is displayed on display 602. In some embodiments, no visual indication of a pre-selected contextual action is displayed.

Exemplary detection of a swipe and responsive production of auditory output associated with a first contextual action is depicted in FIGS. 6S and 6T, which show single-finger upward swipe 634 in FIG. 6S, and the device responding by producing auditory output 668, associated with a contextual action, in FIG. 6T. In FIG. 6T, no indication of the pre-selection of the contextual action is displayed.

Optionally, at block 772, if the swipe input is in a fourth predefined direction that is substantially opposite to the third predefined direction and comprises the second predefined number of contacts, the device produces auditory output associated with a second contextual action that precedes or follows the first contextual action in a second ordered progression. In some embodiments, upon detecting a swipe while in screenreader mode, the device determines whether the swipe comprises a first predefined number of contacts. In some embodiments, upon detecting a swipe while in screenreader mode, the device determines whether the swipe is in a third predefined direction. In some embodiments, if the swipe is in a third predefined direction and comprises a first predefined number of contacts, then the device pre-selects a contextual action and causes auditory output to be produced indicating the pre-selected contextual action. In some embodiments, the first predefined direction is substantially downward, as defined with respect to a touch-sensitive surface or a touch-sensitive display. In some embodiments, the first predefined number of contacts is one. Thus, in some embodiments, upward and downward single-finger swipes while in screenreader mode cause the device to pre-select available contextual actions from an ordered progression of contextual actions. An ordered progression of contextual actions, in some embodiments, does not contain overlapping common elements with an ordered progression of user interface objects. In some embodiments, a common ordered progression can optionally contain both contextual actions and user interface objects.

In some embodiments, when a contextual action is already pre-selected and the device detects an input configured to pre-select a contextual action, the device pre-selects a next contextual action in the ordered progression or a previous contextual action in the ordered progression with respect to the contextual action that is already pre-selected. Whether a next or previous contextual action is selected can optionally depend on the direction of the swipe detected, or on any other characteristic of the received input. In some embodiments, if no contextual action is selected upon the detection of a vertical single-finger swipe in either the upward or downward direction, the same first contextual action can optionally be pre-selected; in some other embodiments, a different first contextual action can optionally be selected depending on the direction of the swipe.

Exemplary detection of a swipe and responsive production of auditory output associated with a second contextual action is depicted in FIGS. 6U and 6V, which show single-finger upward swipe 636 in FIG. 6U, and the device responding by producing auditory output 670, associated with a contextual action, in FIG. 6V. In FIG. 6V, no indication of the pre-selection of the contextual action is displayed. The "notification center" contextual action precedes or follows the "glances" contextual action in an ordered progression of contextual actions.

Optionally, at block 774, the third and fourth predefined directions are substantially vertical with respect to the display of the device. An example of the third and fourth directions being substantially vertical with respect to the display of the device is depicted in FIGS. 6S and 6U, in which the first and second predefined directions are substantially downward and substantially upward with respect to display 602.

Optionally, at block 776, the second predefined number of contacts is one. In some embodiments, the second predefined number of contacts is the same as the first predefined number of contacts. In some embodiments, the second predefined number of contacts is different from the first predefined number of contacts. An example of the first predefined number of contacts being one is depicted in FIGS. 6S and 6U, in which swipes 634 and 636 are single-contact swipes.

Optionally, at block 778, the first and second contextual actions correspond to the first user interface object. Optionally, at block 780, the first and second contextual actions correspond to a user interface that is displayed when the swipe input is detected. In some embodiments, contextual actions available to a user can optionally be defined with respect to a user interface currently displayed to the user. In some embodiments, contextual actions available to a user can optionally be defined with respect to a user interface object that is pre-selected or visually highlighted at the time that the contextual action pre-selection input is detected.

Optionally, at block 781, if the swipe input comprises a third predefined number of contacts, the device ceases to display a first user interface and displays a second user interface. In some embodiments, upon detecting a swipe while in screenreader mode, the device determines whether the swipe comprises a third predefined number of contacts. In some embodiments, if the swipe is in a third predefined direction and comprises a third predefined number of contacts, then the device scrolls, pans, translates, or pages the user interface(s) displayed. In some embodiments, the third predefined number of contacts is two. Thus, in some embodiments, two-finger swipes in any direction while in screenreader mode cause the device to scroll, pan, translate, or page the user interface(s) displayed.

An exemplary detection of a swipe comprising a third predefined number of contacts, and the device responsively ceasing to display a first user interface and displaying a second user interface, is depicted in FIGS. 6Y and 6Z. In FIG. 6Y, device 600 detects two-finger swipe 642, and in FIG. 6Z, responsive to swipe 642-B, device 600 ceases to display the user interface displayed in FIG. 6Y and displays the user interface displayed in 6Z by translating a plurality of displayed user interface objects.

Optionally, at FIG. 782, the third predefined number of contacts is two. In some small-screen embodiments, two may be a beneficial number of predefined contacts because more contacts than two may be difficult or cumbersome to apply on a small screen, or a small screen may not be able to reliably detect more than two contacts at once. An example of the third predefined number of contacts being one is depicted in FIG. 6Y, in which swipe 642 is a two-finger swipe gesture.

Figure 7F:
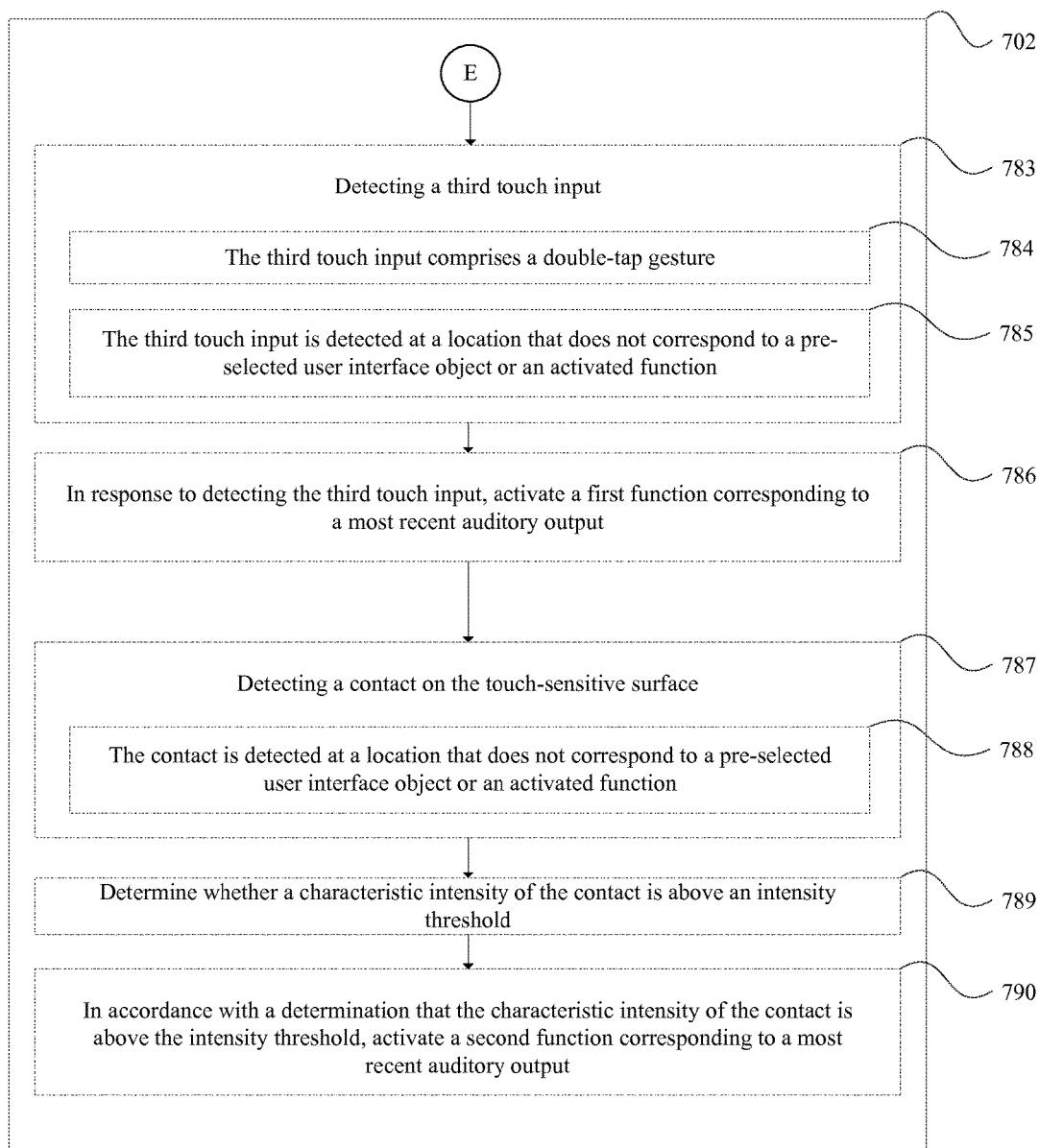

In FIG. 7F, optionally, at block 783, which can optionally follow blocks 782, 781, and 758, the device detects a third touch input. In some embodiments, the third touch input is a selection gesture. In some embodiments, the third touch input is any touch input and/or any predefined touch gesture detected on a touch-sensitive surface or a touch-screen. A touch input can optionally comprise one or more contacts detected by a touch-sensitive surface or a touch-screen, the one or more contacts lasting for any length of time and being separated from one another in time by any length(s) of time. A touch-input can optionally be a single-touch input (comprising one point of contact at a time) or a multi-touch input (comprising multiple simultaneous points of contact with the same touch-sensitive surface). An exemplary third touch input is gesture 630 in FIG. 6Q, which in some embodiments is a double-tap input. That is, gesture 630 in some embodiments comprises two taps of display 602, each occurring within a predefined time period of the other tap.

Optionally, at block 784, the third touch input comprises a double-tap gesture. An exemplary double tap gesture is gesture 630 in FIG. 6Q, which is a single-contact double-tap gesture detected on display 602.

Optionally, at block 785, the third touch input is detected at a location that does not correspond to a pre-selected user interface object or an activated function. In some embodiments, the device is configured such that, upon detection of an input for selecting an option, a pre-selected option is selected. In some embodiments, user inputs for selecting an option are location-independent, such that the option selected need not correspond to a location of the input. Location-independent gestures are particularly advantageous in screenreader applications because blind and low-vision users may have difficulty performing gestures that require a precise location.

An exemplary location-independent selection gesture is gesture 630 in FIG. 6Q, which is a single-contact double-tap gesture applied to display 602 at a location substantially corresponding to user interface object 610-G, but that is nevertheless used to select a function associated with user interface object 610-D, because user interface object 610-D is pre-selected. Gesture 630 could be detected at any other location on display 602, or could be detected through detection means other than display 602, and the effect of gesture 630 would be unchanged in some embodiments.

Optionally, at block 786, in response to detecting the third touch input, the device activates a first function corresponding to a most recent auditory output. In some embodiments, upon detecting a selection gesture, the device selects a function associated with whatever option is pre-selected in screenreader mode. In some embodiments, the option that is pre-selected is the option that was most recently voiced-over to the user. For example, if a user has just navigated the visual highlight to a new user interface object, and the device has produced an auditory output associated with the pre-selected user interface object, then, in some embodiments, detection of a selection gesture will cause the device to activate a function associated with the pre-selected user interface object. If a user has just input a gesture for pre-selection of a contextual action, and the device has produced an auditory output associated with the pre-selected contextual action, then, in some embodiments, detection of a selection gesture will cause the device to activate a function associated with the pre-selected contextual action.

In some embodiments, auditory output indicating the action performed is produced.

An exemplary activation of a first function corresponding to a most recent auditory output, responsive to detecting a third touch input, is depicted in FIG. 6R, in which clock interface 632 has been launched in response to the detection of gesture 630 in FIG. 6Q. Launching a clock application and clock interface 632 is the function associated with user interface object 610-D, and selection gesture 630 in FIG. 6Q caused device 600 to activate that function after user interface object 610-D was pre-selected in FIG. 6P, with auditory output 664 associated with object 610-D being produced in FIG. 6P.

Optionally, at block 787, the device detects a contact on the touch-sensitive surface. In some embodiments, the contact is a hard-press selection gesture. An exemplary contact detected on the touch-sensitive surface is contact 644 in FIG. 6AA.

Optionally, at block 788, the contact is detected at a location that does not correspond to a pre-selected user interface object or an activated function. In some embodiments, the device is configured such that, upon detection of an input for selecting an option, a pre-selected option is selected. In some embodiments, user inputs for selecting an option are location-independent, such that the option selected need not correspond to a location of the input. Location-independent gestures and contacts are particularly advantageous in screenreader applications because blind and low-vision users may have difficulty performing gestures that require a precise location. An exemplary location-independent contact is contact 644 in FIG. 6AA, which is detected at a location corresponding substantially to user interface object 610-F, but which (as detailed below) will cause activation of a function corresponding to user interface object 610-A.

Optionally, at block 789, the device determines whether a characteristic intensity of the contact is above an intensity threshold. In some embodiments, the device determines a characteristic intensity of contacts detected, such as by sensing the characteristic intensity with an intensity sensor such as intensity sensor 165. After determining the characteristic intensity of the contact, the device determines whether the characteristic intensity is above or below a predefined threshold intensity. In some embodiments, if the characteristic intensity is not above a predefined intensity threshold, then the contact is treated as an ordinary touch contact, such as an ordinary touch contact detected by a touch-sensitive surface. In some embodiments, if the characteristic intensity is above a predefined intensity threshold, then the contact is recognized as a "hard press," which can optionally cause the device to perform a different function than if the contact were treated as an ordinary touch contact.

Optionally, at block 790, in accordance with a determination that the characteristic intensity of the contact is above the intensity threshold, the device activates a second function corresponding to a most recent auditory output. Thus in some embodiments, when the device detects an ordinary single touch contact on the display, the device performs a screenreader navigation gesture such as moving the visual highlight to a specified user interface object, as explained above with reference to blocks 750-754. In some embodiments, when the device detects a "hard press" contact with a characteristic intensity above a predefined intensity threshold, the device activates a function corresponding to a most-recently pre-selected (or most-recently visually highlighted, or most-recently indicated by auditory output) user interface object or displayed or undisplayed option. In this way, in some embodiments, a hard-press acts like a location-independent selection gesture, much like the location-independent selection gesture described above with reference to blocks 783-786, except that hard presses can optionally activate a different and/or independent set of functions than ordinary double-tap selection gestures.

In some embodiments, auditory output indicating the action performed is produced.

In some embodiments, the function activated in response to determining that the characteristic intensity is above a predefined threshold includes calling up a sub-menu. If a sub-menu is called up, then a pre-selection of the device can optionally be automatically changed to pre-select an option available in the sub-menu. Furthermore, a visual highlight can optionally be displayed associated with an option in the sub-menu, and corresponding auditory output can optionally be produced. In some embodiments, auditory output produced can optionally indicate both that a sub-menu has been activated (including the name of the sub-menu) and an option from the sub-menu that is available for selection.

Figure 7G:
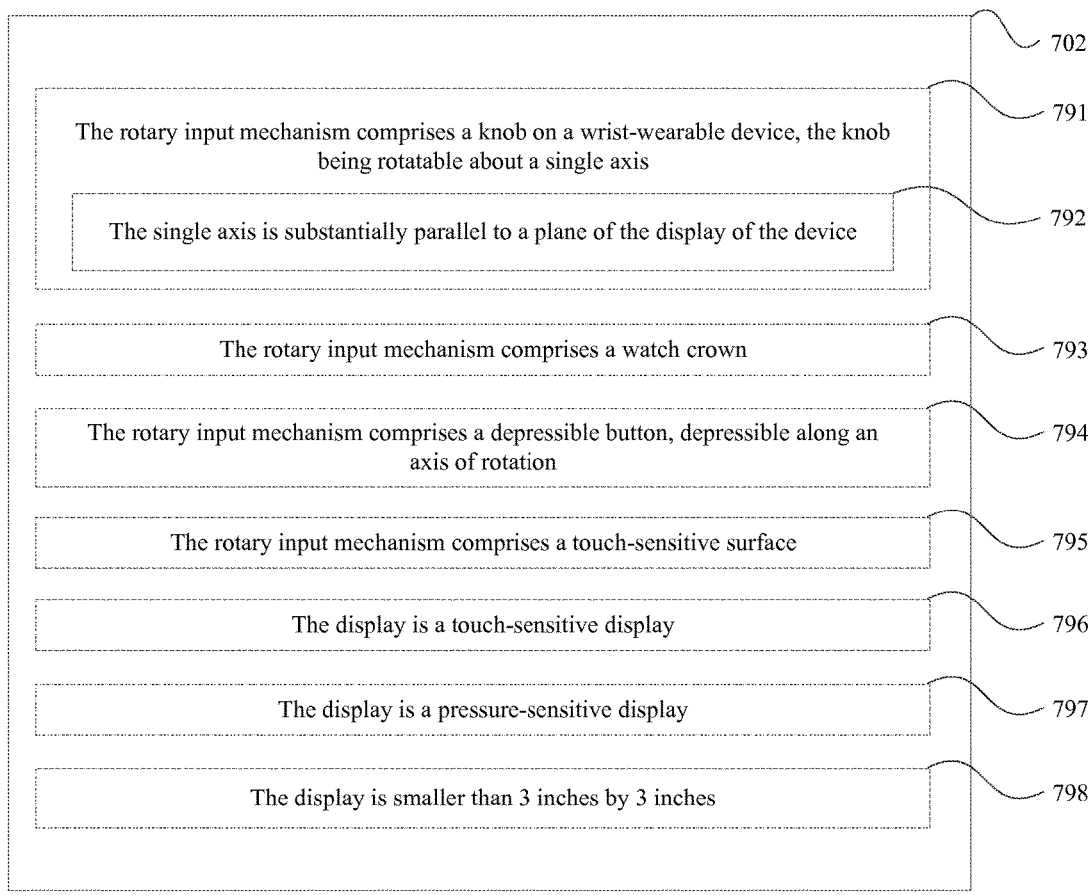

In FIG. 7G, optionally, at block 791, the rotary input mechanism comprises a knob on a wrist-wearable device, the knob being rotatable about a single axis. In some embodiments, the device is configured to be worn on a wrist, such as being attached by a strap. In some embodiments, the rotary input mechanism is a knob disposed on such a device, such as disposed on a side edge of the device. In some embodiments, the edge on which the rotary input mechanism is disposed is determined in accordance with which wrist the device is configured to be worn on, such that a user can optionally conveniently access the rotary input mechanism with the opposite hand from the wrist on which the device is worn. In some embodiments, the knob is rotatable about a single axis. An exemplary rotary input mechanism comprising a knob on a wrist-wearable device, the knob being rotatable about a single axis is rotary input mechanism 604 of FIG. 6A, which in some embodiments is disposed on a wrist-wearable device and is rotatable about a single axis of rotation.

Optionally, at block 792, the single axis is substantially parallel to a plane of the display of the device. In some embodiments, the axis is substantially contained in the plane of the display of the device. An exemplary rotary input mechanism whose axis of rotation is substantially parallel with the plane of the display of the device is rotary input mechanism 604 of FIG. 6A, whose axis of rotation runs parallel with the surface of the paper on which the illustration is drawn, which is parallel to a plane of the display 602 of the device.

Optionally, at block 793, the rotary input mechanism comprises a watch crown. In some embodiments, the rotary input mechanism functions as a watch crown in that it can optionally be used to control and configure a wrist-wearable watch. An exemplary rotary input mechanism comprising a watch crown is rotary input mechanism 604 of FIG. 6A.

Optionally, at block 794, the rotary input mechanism comprises a depressible button, depressible along an axis of rotation. An exemplary rotary input mechanism comprising a depressible button depressible along an axis of rotation is rotary input mechanism 604 of FIG. 6A, which is linearly depressible to the left along the axis of rotation.

Optionally, at block 795, the rotary input mechanism comprises a touch-sensitive surface. In some embodiments, the rotary input mechanism comprises a capacitive surface. In some embodiments, the rotary input mechanism comprises a touch-sensitive surface separate from the display of the device, such as touch-sensitive surface 451.

Optionally, at block 796, the display is a touch-sensitive display. Exemplary touch-sensitive displays include touch-sensitive displays 112, 504, and 602.

Optionally, at block 797, the display is a pressure-sensitive display. In some embodiments, the display can optionally be configured to detect and measure the intensity of contacts applied to the surface of the display, such as by intensity sensor 165.

Optionally, at block 798, the display is smaller than 3 inches by 3 inches. In some embodiments, the display is small enough to be comfortably and conveniently housed in the body of a wrist-wearable device. In some embodiments the gestures, contact, and selection techniques explained above are particularly advantageous when applied to devices having screens smaller than 3 inches by 3 inches in some embodiments, or having a dimension in one direction of smaller than 3 inches, 2 inches, or 1 inch. In some embodiments, controls and gestures for such devices must be designed to avoid occlusion of the limited screen space, allow for easy selection of small user interface objects, and allow for comfortable and convenient application of the required gestures to a small touch-sensitive display. In some embodiments, the display comprises more than 90% of a face of the device, or more than 95% or more than 99% of a face of the device.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein.

Note that details of the processes described above with respect to method 700 (e.g., FIG. 7) are also applicable in an analogous manner to the methods described below with respect to method 800 (e.g., FIG. 8). For example, method 800 can optionally include one or more of the characteristics of the various methods described above with reference to method 700. For example, the devices, gestures, and auditory output described above with respect to method 700 can optionally share one or more of the characteristics of the devices, gestures, and auditory output described below with respect to method 800. Moreover, the techniques described below with respect to method 800 for adjusting a volume setting can optionally be used to adjust a volume setting of a screenreader mode or of a rotary navigation screenreader mode as described above with respect to method 700. For brevity, these details are not repeated below.

Figure 8A:
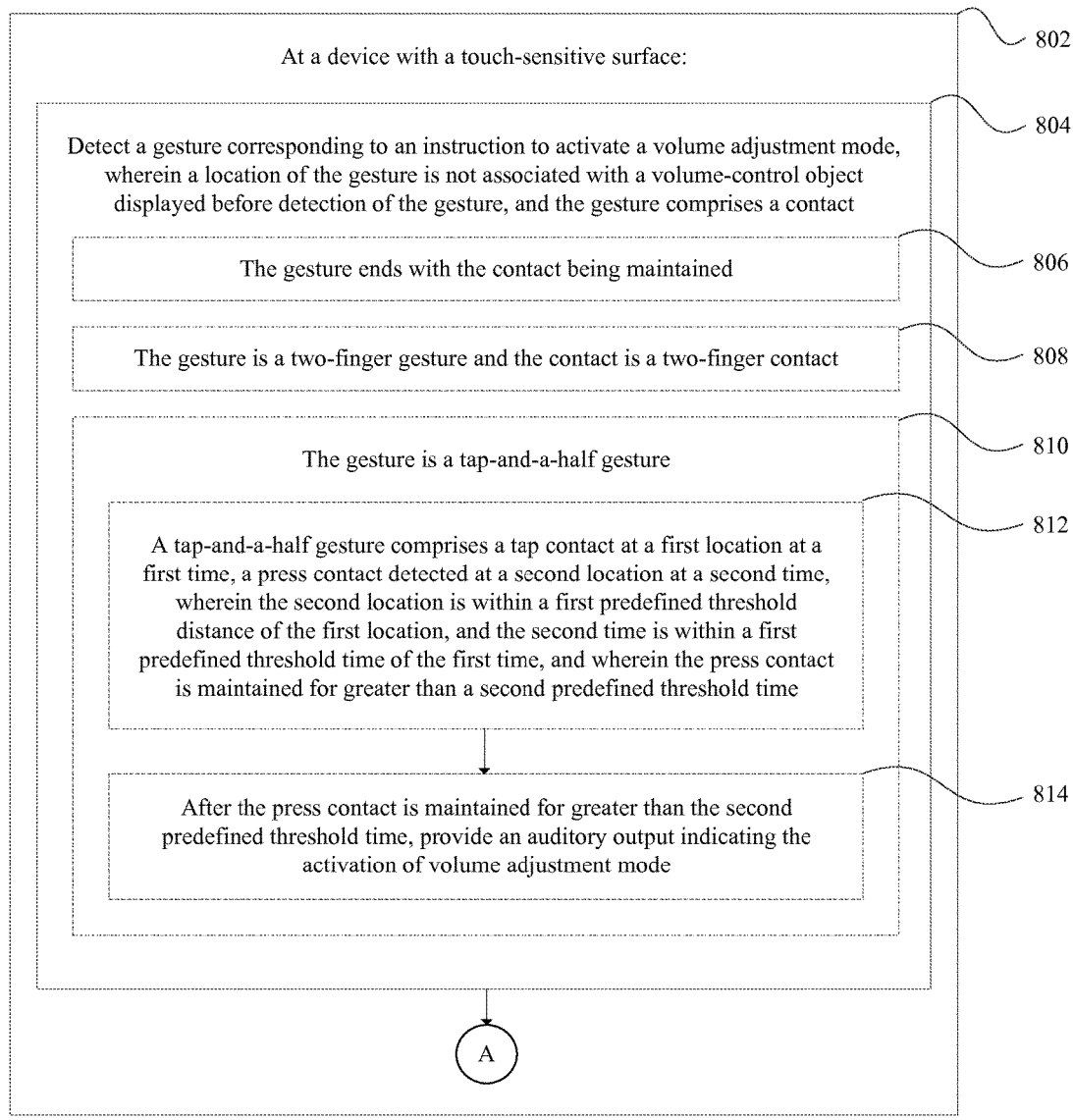
FIGS. 8A-8B are flow diagrams illustrating methods of adjusting volume in accordance with some embodiments.
Figure 8B:
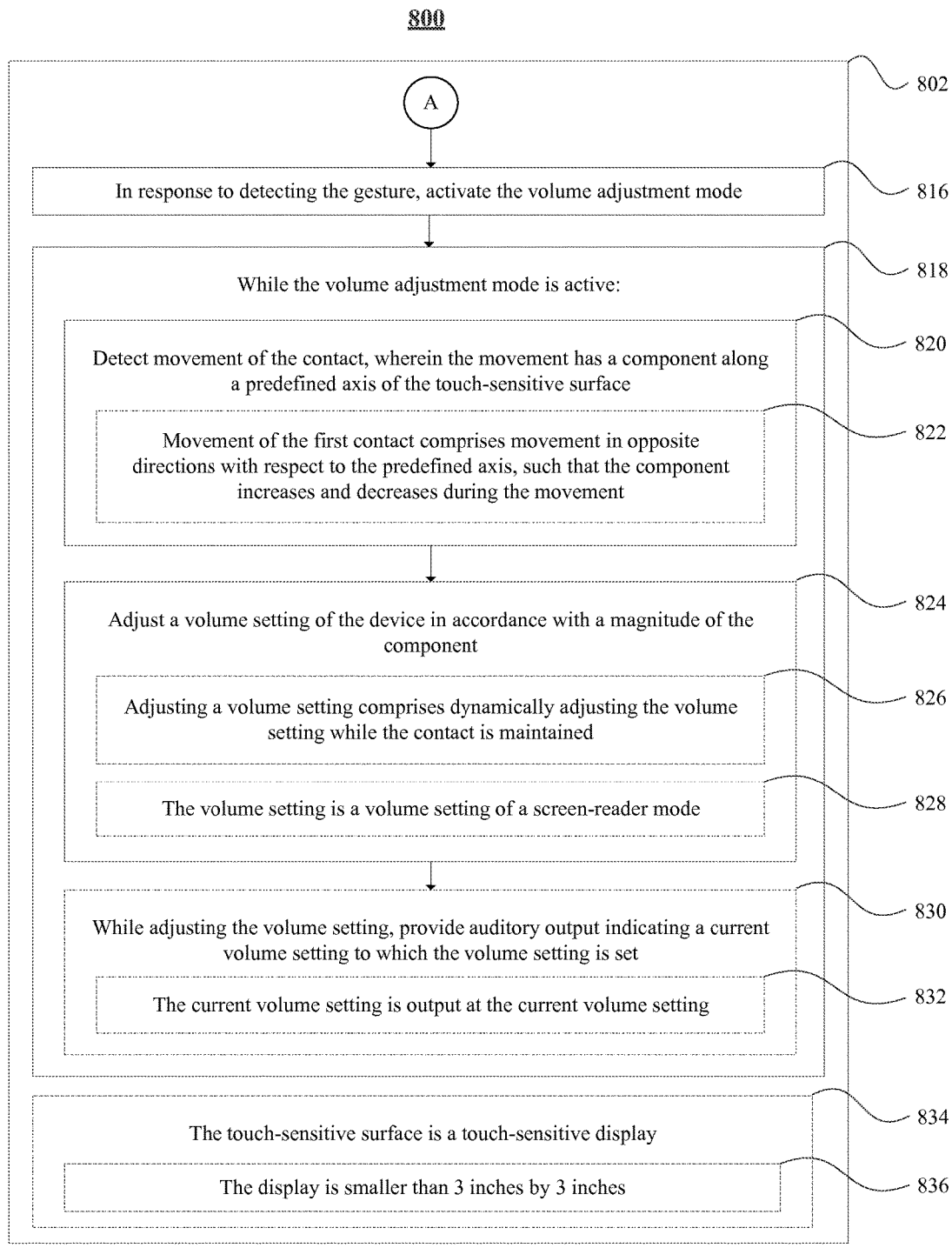

FIGS. 8A-8B are flow diagrams illustrating a method for adjusting a volume setting using an electronic device in accordance with some embodiments. Method 800 is performed at a device (e.g., 100, 300, 500) with a display. Some operations in method 800 can optionally be combined, the order of some operations can optionally be changed, and some operations can optionally be omitted.

As described below, method 800 provides an intuitive way to adjust a volume setting. The method reduces the cognitive burden on a user for adjusting a volume setting, thereby creating a more efficient human-machine interface. For battery-operated computing devices, enabling a user to adjust a volume setting faster and more efficiently conserves power and increases the time between battery charges.

In FIG. 8A, at block 802, method 800 is performed at an electronic device having a touch-sensitive surface. An exemplary device is device 600 of FIG. 6BB, which has touch-sensitive display 602.

At block 804, the device detects a gesture corresponding to an instruction to activate a volume adjustment mode, wherein a location of the gesture is not associated with a volume-control object displayed before detection of the gesture, and the gesture comprises a contact.

In some embodiments, the device is configured to recognize various inputs and input patterns, including gestures. In some embodiments, gestures are touch gestures performed on the touch-sensitive display, such that gestures comprise one or more contacts. Some gestures comprise multiple simultaneous contacts and/or multiple successive contacts. The device can optionally be configured to associate various inputs and gestures with actions or tasks that can optionally be activated or undertaken by the device, such that, upon recognizing a certain gesture, a certain associated task is performed. In some embodiments, one or more gestures correspond to a volume adjustment mode. For example, the device can optionally be configured such that, upon recognition of a volume control gesture, volume adjustment mode is activated.

Some gestures are associated with displayed visual objects, while others are not. For example, some functions require that a gesture be performed at a location corresponding to a displayed affordance, such as at the same location on a touch screen as the displayed affordance. For example, an application can optionally be activated by performing a tap gesture on a displayed icon for the application on a touch-screen. In some embodiments of the disclosed technique, a location of the volume adjustment mode activation gesture is not associated with a volume-control object displayed before detection of the gesture. That is, in some embodiments, no object associated with volume is displayed before the volume adjustment mode activation gesture is detected. In some embodiments, a displayed object associated with volume is displayed before the volume adjustment mode activation gesture is detected, but the device will recognize the volume adjustment mode activation gesture and take the same action without regard for whether the gesture is detected at a location corresponding to the displayed object. In this way, in some embodiments, the volume adjustment mode activation gesture can optionally be said to be location independent, such that the location of the gesture does not change the responsive action carried out by the device. In some embodiments, a volume control object can optionally be displayed after the detection of the volume adjustment mode activation gesture, including being displayed at the location at which the gesture is detected.

An exemplary gesture corresponding to an instruction to activate a volume adjustment mode, wherein a location of the gesture is not associated with a volume-control object displayed before detection of the gesture, and wherein the gesture comprises a contact, is tap-and-a-half gesture depicted in FIGS. 6BB and 6CC. The depicted tap-and-a-half gesture comprises contact(s) 646, which are illustrated by contact(s) 646-A in FIG. 6BB and contact(s) 646-B in FIG. 6CC. The depicted tap-and-a-half gesture, as described above with reference to FIGS. 6BB and 6CC, and as will be described below in greater detail, is detected on display 602 at a location not associated with a displayed volume-control object. The depicted tap-and-a-half gesture is a two-finger tap-and-a-half gesture, such that it comprises two successive multi-touch contacts: a two-finger tap followed by a two-finger substantially stationary press detected at substantially the same location.

Optionally, at block 806, the gesture ends with the contact being maintained. In some embodiments, the volume adjustment mode activation gesture comprises a contact that is maintained as the gesture ends. For example, a press gesture (e.g., a press-and-hold gesture) comprises a contact that is maintained up through the time that the device recognizes that the gesture has been performed. If liftoff occurs before the device recognizes that such a gesture has occurred (e.g., before a predefined gesture time threshold has been met), then the device will not recognize the gesture. An exemplary gesture ending with a contact being maintained is depicted in FIG. 6CC, which shows the completion of the tap-and-a-half gesture started in FIG. 6BB. In FIG. 6CC, contact(s)

646-B is maintained up through the completion of the tap-and-a-half gesture, which is recognized as having been successfully completed by device 600 at the point indicated on graph 690-b by the "volume adjustment mode activated" and the "beep" annotations. As shown in graph 690-b, the press contact following the tap contact is maintained without liftoff through the time that the device recognizes the gesture as complete.

Optionally, at block 808, the gesture is a two-finger gesture and the contact is a two-finger contact. In some embodiments, a two-finger gesture or contact includes a two-contact gesture or a two-contact contact, such as performed by a stylus. In some embodiments, the gesture requires a predetermined number of points of contact. In some embodiments, two-finger gestures may be advantageous, because gestures requiring more than two fingers or more than two points of contact may be difficult, cumbersome, or uncomfortable to apply to a small touch-screen or a small touch-sensitive surface, and small touch-sensitive surfaces may be unable to efficiently and reliably detect gestures performed with more than two points of contact. In some embodiments, the device detects the presence of two distinct points of contact, but interprets the two points of contact, for some purposes of interpreting gestures, as a single point of contact. For example, the device can optionally calculate an average position or a midpoint of the points of contact to determine a "location" of a two-point or multi-point contact or gesture.

Optionally, at block 810, the gesture is a tap-and-a-half gesture. As described above and as will be explained below, a tap-and-a-half gesture can optionally comprise a tap contact (including a multi-touch tap contact) followed by a press contact (including a multi-point press contact) at substantially the same location as the tap contact. The tap-and-a-half gesture can optionally, in some embodiments, be understood as similar to a double-tap gesture, with the difference that the second contact is maintained (e.g., held down).

Optionally, at block 812, a tap-and-a-half gesture comprises a tap contact at a first location at a first time, a press contact detected at a second location at a second time, wherein the second location is within a first predefined threshold distance of the first location, and the second time is within a first predefined threshold time of the first time, and wherein the press contact is maintained for greater than a second predefined threshold time.

As explained above with reference to FIGS. 6BB-6EE, in some embodiments, a tap-and-a-half gesture comprises:

(a) a first contact detected at a first location at a first time, (b) liftoff of the first contact, detected within a first predefined length of time of the first time, and detected within a first predefined distance of the first location, (c) a second contact, detected within a second predefined distance of the first contact and/or the location of liftoff of the first contact, and detected within a second predefined length of time after the first time or after the time of liftoff of the first contact, (d) the second contact being maintained, within a third predefined distance of the first contact and/or the liftoff position of the first contact and/or the initial position of the second contact, for longer than a fourth predefined period of time.

An exemplary tap-and-a-half gesture is depicted by graph 690-B in FIG. 6CC. At the intersection of the graph's x and y axes, a tap first contact is detected, and liftoff of that contact is detected. The thickness of the white (outlined) line along the y axis represents that some movement or variation of the position of the tap contact (and the subsequent press contact) can optionally be permissible, so long as the movement does not exceed predefined thresholds. Following the tap contact located near the intersection of the axes, a press contact begins at a later point in time. The press contact is detected at substantially the same location as the tap contact was detected, and the press contact is detected as being maintained at substantially the same position, without liftoff occurring. When the press contact has been maintained for a predefined period of time, as defined with respect to the beginning of the press contact and/or the earlier tap contact, the device recognizes the tap-and-a-half gesture as being completed, as represented by the "volume adjustment mode activated" and the "beep" annotations in graph 690-b.

Optionally, at block 814, after the press contact is maintained for greater than the second predefined threshold time, the device provides an auditory output indicating the activation of volume adjustment mode. For example, after the device detects that the volume adjustment mode gesture has been completed, the device produces or provides signal for producing an auditory indication that volume adjustment mode has been activated. In some embodiments, the auditory output is a tone. In some embodiments, the auditory output is a spoken indication, such as "volume adjustment mode activated," or "volume: 50%," or simply "50%." In some embodiments, the auditory output is produced at a current volume setting of the device. In some embodiments, the auditory output is produced at the current volume setting that the volume adjustment mode has enabled adjusting. In some embodiments, the auditory output is produced at a different current volume setting than the one that the volume adjustment mode has enabled adjusting.

An exemplary auditory output indicating the activation of volume adjustment mode is auditory output 676 in FIG. 6CC, which is produced by device 600 through audio output part 608 at the point in time indicated in graph 690-b.

In FIG. 8B, at block 816, in response to detecting the gesture, the device activates the volume adjustment mode. In some embodiments, volume adjustment mode is any mode or device state in which volume can be adjusted. For example, in some embodiments, volume adjustment mode is a mode in which volume controls or indicators are visually displayed to a user or are output to a user through auditory output. In some embodiments, volume adjustment mode is a mode in which predetermined types of inputs or gestures are configured to adjust volume, rather than performing another function that such inputs or gestures can optionally perform when volume adjustment mode is not activated. In some embodiments, volume adjustment mode comprises displaying a user interface or a user interface object.

In some embodiments, volume adjustment mode is persistent once activated, and must be manually deactivated. In some embodiments, volume adjustment mode automatically deactivates after a predetermined amount of time from its activation, or after a predetermined amount of time of inactivity of the user. In some embodiments, volume adjustment mode automatically deactivates after a user adjusts a volume setting, such as after a user changes a volume setting once or after a gesture for changing a volume setting lifts off.

An exemplary volume adjustment mode activation is depicted in FIG. 6CC, where audio output 676 indicates that volume adjustment mode has been activated. In FIGS. 6DD and 6EE, operation of an exemplary volume adjustment mode, as will be explained in greater detail below, is depicted.

At block 818, the device performs steps 820 and 824, and optionally performs steps 822 and 826-832, all while the volume adjustment mode is active. For example, the steps can optionally be performed while the volume adjustment mode activated in FIG. 6CC is active.

At block 820, the device detects movement of the contact, wherein the movement has a component along a predefined axis of the touch-sensitive surface. In some embodiments, volume is controlled in volume adjustment mode according to movement of a detected contact. In some embodiments, the detected contact that is moved is a contact that constituted or partially constituted the volume adjustment mode activation gesture. For example, a volume adjustment mode activation gesture is performed, and the gesture comprises a contact that is maintained as the gesture ends. Following the gesture ending, the contact is maintained, and is thereafter moved, such as being slid along a touch-sensitive surface, without breaking contact, in one or more directions.

In some embodiments, the device has predefined axes, such that movement of a contact in predefined directions in volume adjustment mode will adjust the volume. For example, a predefined axis can optionally be a vertical axis of a touch-sensitive surface, and the device can optionally detect a movement having a component of movement in the vertical direction on the touch-sensitive surface. In some embodiments, if the detected movement has a component of movement in a direction other than along the predefined axis, that other component of movement can optionally be ignored entirely, can optionally perform a different function unrelated to volume control, can optionally cause additional volume control functions to be undertaken, or can optionally augment or modify any volume adjustment performed in accordance with the component of movement along the predefined axis.

An exemplary movement of a contact, wherein the movement has a component along a predefined axis of the touch-sensitive surface, is the movement of contact(s) 646 depicted in FIG. 6DD, in which contact(s) 646 are moved up from the position depicted by contact(s) 646-B in FIG. 6CC to the position depicted by contact(s) 646-C in FIG. 6DD. The movement depicted in FIG. 6DD can optionally have a component along any predefined axis in the plane of display 602, including a component along the vertical axis of display 602 (extending from the bottom of the figure to the top).

Optionally, at block 822, movement of the first contact comprises movement in substantially opposite directions with respect to the predefined axis, such that the component increases and decreases during the movement. In some embodiments, the contact can optionally be moved back and forth, such as moving up then down, or left then right, etc. Thus, in some embodiments, the movement of the contact and/or the changing of the component is not monotonic. An exemplary movement comprising movement in substantially opposite directions with respect to the predefined axis, such that the component increases and decreases during the movement, is the movement of contact(s) 646 depicted in FIGS. 6DD and 6EE. In FIG. 6DD, the movement is substantially upward, while in FIG. 6EE, the movement is substantially downward. Accordingly, the component of movement of the overall movement of contact(s) 646 first increases and then decreases (and then increases in the opposite direction) during the time that the movement is detected and ongoing.

At block 824, the device adjusts a volume setting of the device in accordance with a magnitude of the component. In some embodiments, the volume setting is an overall volume setting, a ringer volume setting, a media volume setting, an application volume setting, a user interface volume setting, a peripheral device volume setting, and/or a screenreader mode volume setting. The device can optionally adjust a volume setting by storing a new volume setting in any suitable memory or storage, and then producing auditory output in accordance with the new volume setting. In some embodiments, the adjusted volume setting is displayed visually or is indicated by audio output, the audio output produced at one or more of a previous volume setting, an adjusted volume setting, or a volume setting unrelated to the volume setting being adjusted.

In some embodiments, the volume setting is adjusted in accordance with a magnitude of the component of movement of the contact by increasing the volume as the component increases in one direction, and decreasing the volume as the component increases in the other direction. In some embodiments, the volume adjustment is proportional to a magnitude of the component of movement, such that the further in one direction the contact is moved, the more volume is increased, and the further in the other direction the contact is moved, the more volume is decreased. In some embodiments, the volume adjustment is directly proportional to the magnitude, and in some embodiments it is indirectly proportional. In some embodiments, scaling factors can optionally be applied to the volume adjustment or the volume adjustment rate.

In some embodiments, volume is adjusted in accordance with the offset distance from the point at which the contact was located when the volume adjustment mode activation gesture was completed. For example, when the contact moves past a predefined distance threshold from that location in one direction, the volume can optionally be increased to a predefined setting, and when the contact moves back inside that threshold, the volume is decreased again to its previous setting.

In some embodiments, volume is adjusted in accordance to additional factors other than the magnitude of the component of movement. In some embodiments, volume is adjusted in accordance with a speed of the movement, such that a faster movement causes a greater volume adjustment than a slower movement. In some embodiments, volume is adjusted in accordance with variable scaling factors that are predetermined and/or controllable by the user, such that the relation of the volume adjustment to the magnitude, speed, acceleration, and/or position of the movement of the contact can optionally be scaled variably.

Exemplary adjustment of a volume setting of a device in accordance with a magnitude of a component of movement of a contact is depicted in FIGS. 6DD and 6EE, in which a volume setting of device 600 is adjusted in accordance with the movement of contact(s) 646 as represented by contact(s) 646-C and 646-D. In FIG. 6DD, as the contact(s) 646 is moved upward, the magnitude of the component of movement of contact(s) 646 along the vertical axis of display 602 increases, and the volume setting is increased accordingly to a 50% setting, a 60% setting, and a 70% setting, as shown by audio output 678 and graph 690-c. In the depicted example, the volume setting is increased to predefined volume settings (or by predefined volume adjustment increments) as the magnitude of the component of movement increases beyond predefined thresholds. Then, in FIG. 6EE, as the contact(s) 646 is moved downward, the magnitude of the component of movement of contact(s) 646 along the vertical axis of display 602 decreases, and the volume setting is decreased to a 60% setting and then to a 50% setting. In the example shown, the contact(s) 646 continues to move downward, such that its component of movement in the vertical direction becomes zero and then begins to increase in the negative/opposite direction. In response to this movement, the volume setting is further decreased (to a 40% setting and then to a 30% setting), such that it is lowered below the setting at which it was originally set before the volume adjustment mode activation gesture was detected.

Optionally, at block 826, adjusting a volume setting comprises dynamically adjusting the volume setting while the contact is maintained. In some embodiments, volume is dynamically adjusted while the contact is maintained, such as being adjusted in accordance with the position of the contact at predefined periods in time, or being adjusted in accordance with the position of the contact when the contact reaches predefined threshold locations or performs predefined gestures. In some other embodiments, volume is not adjusted dynamically while the contact is maintained, but is only adjusted upon liftoff of the contact. In some such embodiments, an indication of the level to which the volume will be adjusted can optionally be displayed or indicated while the contact is maintained, and the volume can optionally be adjusted to the displayed or indicated volume level when the contact is lifted off. Exemplary dynamic adjustment of a volume setting while the contact is maintained is depicted in FIGS. 6DD and 6EE, as explained above, wherein a volume setting is adjusted dynamically as contact(s) 646 is maintained.

Optionally, at block 828, the volume setting is a volume setting of a screenreader mode. In some embodiments, the volume setting is an overall volume setting, a ringer volume setting, a media volume setting, an application volume setting, a user interface volume setting, a peripheral device volume setting, and/or a screenreader mode volume setting. In some embodiments, adjusting one volume setting does not affect the other volume settings. In some embodiments, adjusting one volume setting affects some or all of the other volume settings.

In some embodiments, the volume adjustment techniques described herein are only available when a screenreader mode is activated. In some embodiments, when a screenreader mode is not activated, the volume adjustment mode activation gesture can optionally have no effect, or can optionally have a different effect unrelated to volume control.

Optionally, at block 830, while adjusting the volume setting, the device provides auditory output indicating a current volume setting to which the volume setting is set. In some embodiments, visual indications of a volume setting are displayed. In some embodiments, auditory output indicating a volume setting is produced. Auditory output can optionally be provided in any suitable manner, including by being output by audio output part 608. In some embodiments, indications are provided periodically in time when a volume adjustment mode is active, or as a volume setting is being adjusted. In some embodiments, indications are provided when the volume is set to a predefined setting, or the volume is adjusted by a predefined adjustment amount. Exemplary provision of auditory output indicating a current volume setting is depicted in FIGS. 6DD and 6EE, in which auditory outputs 678 and 680 dynamically indicate volume settings.

Optionally, at block 832, the current volume setting is output at the current volume setting. In some embodiments, the auditory output indicating the volume setting to which the volume is set is produced at a loudness corresponding to the new volume setting. For example, in FIGS. 6DD and 6EE, the various volume settings indicated in auditory outputs 678 and 680 are produced at varying loudnesses, with the loudness of each indicated volume setting corresponding to the indicated volume setting.

In some embodiments, while volume adjustment mode is activated, the device detects liftoff of the contact. In response to detecting liftoff of the contact, in some embodiments, the device deactivates volume adjustment mode. For example, as shown in FIG. 6EE, contact(s) 646 lifts off when it reaches the position represented by contact(s) 646-D. When liftoff occurs, volume adjustment mode is deactivated in some embodiments such that movement of contacts will not cause a volume setting to be adjusted unless and until volume adjustment mode is reactivated. In some embodiments, a visual indication is displayed or an auditory indication is provided indicating that volume adjustment mode has been deactivated, while in other embodiments no such indication is provided.

Optionally, at block 834, the touch-sensitive surface is a touch-sensitive display. Exemplary touch-sensitive displays include touch-sensitive displays 112, 504, and 602.

Optionally, at block 836, the display is smaller than 3 inches by 3 inches. In some embodiments, the display is small enough to be comfortably and conveniently housed in the body of a wrist-wearable device. In some embodiments, the gestures, contact, and volume adjustment techniques explained above are particularly advantageous when applied to devices having screens smaller than 3 inches by 3 inches in some embodiments, or having a dimension in one direction of smaller than 3 inches, 2 inches, or 1 inch. In some embodiments, controls and gestures for such devices must be designed to avoid occlusion of the limited screen space, allow for easy selection of small user interface objects, and allow for comfortable and convenient application of the required gestures to a small touch-sensitive display. In some embodiments, the display comprises more than 90% of a face of the device, or more than 95% or more than 99% of a face of the device.

It should be understood that the particular order in which the operations in FIG. 8 have been described is merely exemplary and is not intended to indicate that the described order is the only order in which the operations could be performed. One of ordinary skill in the art would recognize various ways to reorder the operations described herein.

Figure 9:
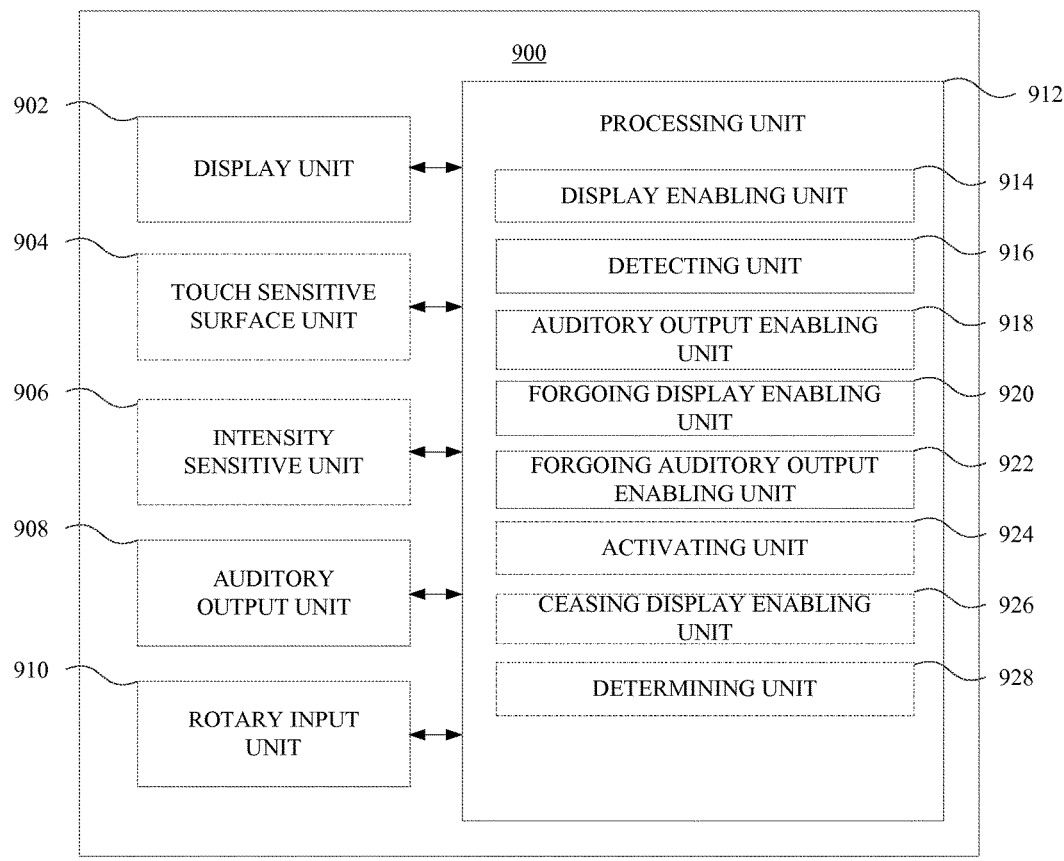
FIG. 9 is a functional block diagram of an electronic device in accordance with some embodiments.

In accordance with some embodiments, FIG. 9 shows an exemplary functional block diagram of an electronic device 900 configured in accordance with the principles of the various described embodiments. In accordance with some embodiments, the functional blocks of electronic device 900 are configured to perform the techniques described above. The functional blocks of the device 900 are, optionally, implemented by hardware, software, or a combination of hardware and software to carry out the principles of the various described examples. It is understood by persons of skill in the art that the functional blocks described in FIG. 9 are, optionally, combined or separated into sub-blocks to implement the principles of the various described examples. Therefore, the description herein optionally supports any possible combination or separation or further definition of the functional blocks described herein.

As shown in FIG. 9, an electronic device 900 includes a display unit 902 configured to display a graphic user interface, an auditory output unit 908 configured to output auditory signals, and a rotary input unit configured to detect rotational inputs. Optionally, device 900 also includes a touch-sensitive surface unit 904 configured to receive contacts, and an intensity sensitive surface unit configured to detect the intensity of contacts. Device 900 further includes processing unit 912 coupled to the display unit 902, the auditory output unit 908, the rotary input unit 910, and, optionally, the touch-sensitive surface unit 904 and the intensity sensitive surface unit 906. The processing unit 912 contains a display enabling unit 914, a detecting unit 916, an auditory output enabling unit 918, a forgoing display enabling unit 920, and a forgoing auditory output enabling unit 922. Optionally, the processing unit 912 further includes an activating unit 924, a ceasing display enabling unit 926, and a determining unit 928.

The processing unit 912 is configured to: enable displaying (e.g., with display enabling unit 914), on the display unit 902, a plurality of user interface objects in an ordered progression; enable displaying (e.g., with display enabling unit 914) a visual highlight associated with a first user interface object of the plurality of interface objects and enable producing (e.g., with auditory output enabling unit 918) auditory output associated with the first user interface object; detect (e.g., with detecting unit 916) rotation of the rotary input unit 910 in a first rotational direction; and in response to detecting rotation of the rotary input unit 910 in the first rotational direction: if a rotary navigation mode is activated, enable displaying (e.g., with display enabling unit 914) a visual highlight associated with a second user interface object of the plurality of user interface objects and enable producing auditory output (e.g., with auditory output enabling unit 922) associated with the second user interface object, wherein the second user interface object follows the first user interface object in the ordered progression, and if a rotary navigation mode is not activated, forgo enabling (e.g., with forgoing display enabling unit 920) displaying a visual highlight associated with the second user interface object and forgo enabling producing auditory output (e.g., with forgoing auditory output enabling unit 922) associated with the second user interface object.

In some embodiments, the processing unit 912 is further configured to: while enabling displaying the visual highlight associated with the second user interface object, detect (e.g., with detecting unit 916) rotation of the rotary input unit 910 in a second rotational direction substantially opposite the first rotational direction; in response to detecting rotation of the rotary input unit 910 in the second rotational direction: if the rotary navigation mode is activated, enable displaying (e.g., with display enabling unit 914) a visual highlight associated with one of the first user interface object and a third user interface object of the plurality of user interface objects and enable producing auditory output (e.g., with auditory output enabling unit 918) associated with one of the first user interface object and the third user interface object, wherein the third user interface object precedes the second user interface object in the ordered progression; and if the rotary navigation mode is not activated, forgo enabling displaying (e.g., with forgoing display enabling unit 920) a visual highlight associated with either of the first or the third user interface objects and forgo enabling producing auditory output (e.g., with forgoing auditory output enabling unit 922) associated with either of the first or the third user interface objects.

In some embodiments, the second user interface object immediately follows the first user interface object in the ordered progression.

In some embodiments third user interface object immediately precedes the second.

In some embodiments, the processing unit 912 is further configured to: detect (e.g., with detecting unit 914) a first touch input; and in response to detecting the first touch input, activate (e.g., with activating unit 924) the rotary screenreader navigation mode.

In some embodiments, the first touch input comprises a substantially simultaneous multi-touch input.

In some embodiments, the first touch input comprises a two-finger triple-tap gesture detected on the display unit 902 of the device.

In some embodiments, rotary screenreader navigation mode is a sub-mode of a screenreader mode.

In some embodiments, the processing unit 912 is further configured to: detect (e.g., with detecting unit 916) a depression input of the rotary input unit 910; in response to detecting the depression input of the rotary input unit 910, activate (e.g., with activating unit 924) screenreader mode.

In some embodiments, the depression input comprises a plurality of successive depressions of the rotary input unit 910.

In some embodiments, the processing unit 912 is further configured to: detect (e.g., with detecting unit 916) a second touch input at a location corresponding to a fourth user interface object, in response to detecting the second touch input, enable displaying (e.g., with display enabling unit 914) a visual highlight associated with the fourth user interface object and enable producing auditory output (e.g., with auditory output enabling unit 918) associated with the fourth user interface object.

In some embodiments, the second touch input comprises a single-finger single-tap gesture.

In some embodiments, the processing unit 912 is further configured to: while enabling displaying a visual highlight associated with the first user interface object, detect (e.g., with detecting unit 916) a swipe input; in response to detecting the swipe input: if the swipe input is in a first predefined direction and comprises a first predefined number of contacts, enable displaying (e.g., with display enabling unit 914) a visual highlight associated with the second user interface object and enable producing auditory output (e.g., with auditory output enabling unit 918) associated with the second user interface object; and if the swipe input is in a second predefined direction that is substantially opposite the first predefined direction and comprises the first predefined number of contacts, enable displaying (e.g., with display enabling unit 914) a visual highlight associated with one of the third user interface object and a fifth user interface object of the plurality of user interface objects and enable producing auditory output (e.g., with auditory output enabling unit 918) associated with one of the third user interface object and fifth user interface object, wherein one of the third user interface object and the fifth user interface object immediately precedes the first user interface object.

In some embodiments, the first and second predefined directions are substantially horizontal with respect to the display unit 902 of the device.

In some embodiments, the first predefined number of contacts is one.

In some embodiments, the processing unit 912 is further configured to: in response to detecting the swipe input: if the swipe input is in a third predefined direction that is substantially orthogonal to the first predefined direction and comprises a second predefined number of contacts, enable producing auditory output (e.g., with auditory output enabling unit 918) associated with a first contextual action; and if the swipe input is in a fourth predefined direction that is substantially opposite to the third predefined direction and comprises the second predefined number of contacts, enable producing auditory output (e.g., with auditory output enabling unit 918) associated with a second contextual action that precedes or follows the first contextual action in a second ordered progression.

In some embodiments, the third and fourth predefined directions are substantially vertical with respect to the display unit 902 of the device.

In some embodiments, the second predefined number of contacts is one.

In some embodiments, the first and second contextual actions correspond to the first user interface object.

In some embodiments, the first and second contextual actions correspond to a user interface that is displayed when the swipe input is detected.

In some embodiments, the processing unit 912 is further configured to: in response to detecting the swipe input, if the swipe input comprises a third predefined number of contacts, cease to enable displaying (e.g., with ceasing display enabling unit 926) a first user interface and enable displaying (e.g., with display enabling unit 914) a second user interface.

In some embodiments, the third predefined number of contacts is two.

In some embodiments, the processing unit 912 is further configured to: detect (e.g., with detecting unit 916) a third touch input; in response to detecting the third touch input, activate (e.g., with activating unit 924) a first function corresponding to a most recent auditory output.

In some embodiments, the third touch input comprises a double-tap gesture.

In some embodiments, the third touch input is detected at a location that does not correspond to a pre-selected user interface object or an activated function.

In some embodiments, the processing unit 912 is further configured to: detect (e.g., with detecting unit 916) a contact on the touch-sensitive surface; determine (e.g., with determining unit 928) whether a characteristic intensity of the contact is above an intensity threshold; and in accordance with a determination that the characteristic intensity of the contact is above the intensity threshold, activate (e.g., with activating unit 924) a second function corresponding to a most recent auditory output.

In some embodiments, the contact is detected at a location that does not correspond to a pre-selected user interface object or an activated function.

In some embodiments, the rotary input unit 910 comprises a knob on a wrist-wearable device, the knob being rotatable about a single axis.

In some embodiments, the single axis is substantially parallel to a plane of the display unit 902 of the device.

In some embodiments, the rotary input unit 910 comprises a watch crown.

In some embodiments, the rotary input unit 910 comprises a depressible button, depressible along an axis of rotation.

In some embodiments, the rotary input unit 910 comprises a touch-sensitive surface.

In some embodiments, the display unit 902 is a touch-sensitive display.

In some embodiments, the display unit 902 is a pressure-sensitive display.

In some embodiments, the display unit 902 is smaller than 3 inches by 3 inches.

The operations described above with reference to FIG. 7A-7AA are, optionally, implemented by components depicted in FIGS. 1A-1B or FIG. 9. For example, displaying operations 704 and 708, detecting operation 710, displaying and producing operation 714, and forgoing displaying and forgoing producing operation 718 can optionally be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 can optionally utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 10:
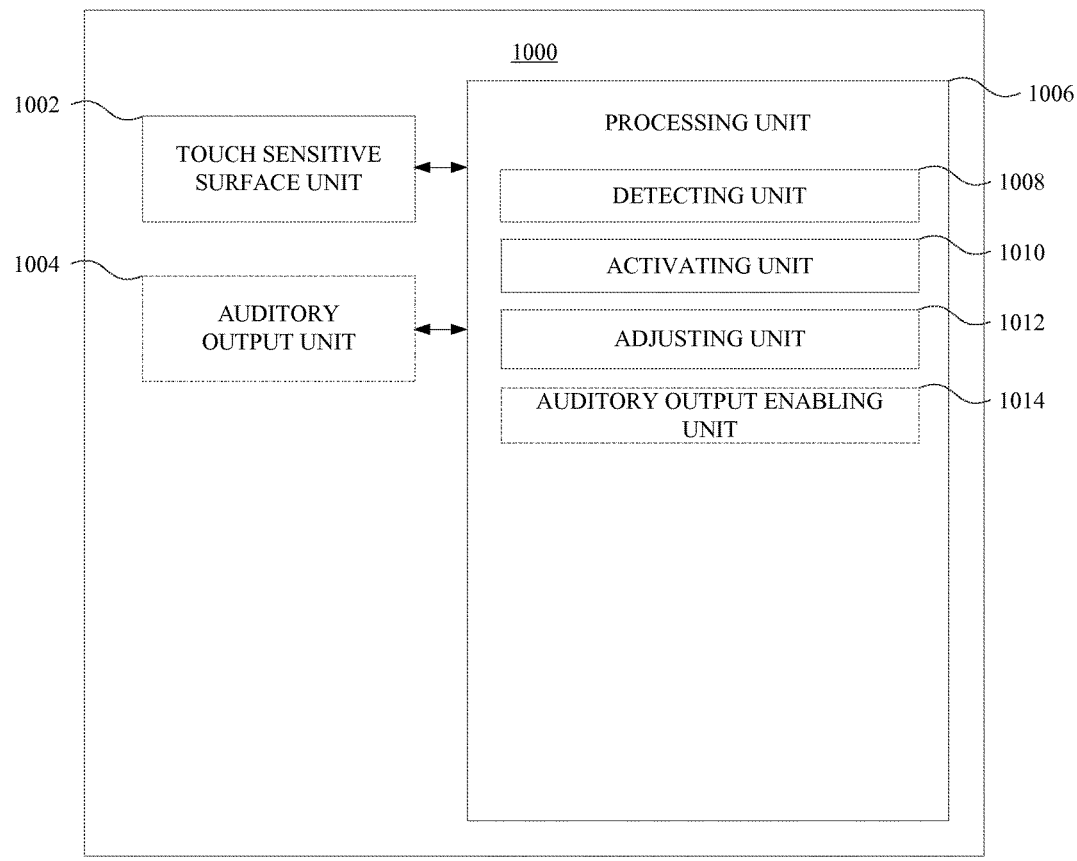
FIG. 10 is a functional block diagram of an electronic device in accordance with some embodiments.

In accordance with some embodiments, FIG. 10 shows an exemplary functional block diagram of an electronic device 1000 configured in accordance with the principles of the various described embodiments. In accordance with some embodiments, the functional blocks of electronic device 1000 are configured to perform the techniques described above. The functional blocks of the device 1000 are, optionally, implemented by hardware, software, or a combination of hardware and software to carry out the principles of the various described examples. It is understood by persons of skill in the art that the functional blocks described in FIG. 10 are, optionally, combined or separated into sub-blocks to implement the principles of the various described examples. Therefore, the description herein optionally supports any possible combination or separation or further definition of the functional blocks described herein.

As shown in FIG. 10, an electronic device 1000 includes a touch-sensitive surface unit 1002 configured to receive contacts, and, optionally, an auditory output unit 1004 configured to output auditory signals. Device 1000 also includes a processing unit 1006 coupled to the touch-sensitive surface unit 1002 and, optionally, to the auditory output unit 1004. The processing unit includes a detecting unit 1008, an activating unit 1010, an adjusting unit 1012, and, optionally, an auditory output enabling unit 1014.

The processing unit 1006 is configured to: detect (e.g., with detecting unit 1008) a gesture corresponding to an instruction to activate a volume adjustment mode, wherein a location of the gesture is not associated with a volume-control object displayed before detection of the gesture, and the gesture comprises a contact; in response to detecting the gesture, activate (e.g., with activating unit 1010) the volume adjustment mode; and while the volume adjustment mode is active: detect (e.g., with detecting unit 1008) movement of the contact, wherein the movement has a component along a predefined axis of the touch-sensitive surface; and adjust (e.g., with adjusting unit 1012) a volume setting of the device in accordance with a magnitude of the component.

In some embodiments, the gesture ends with the contact being maintained.

In some embodiments, the gesture is a two-finger gesture and the contact is a two-finger contact.

In some embodiments, the gesture is a tap-and-a-half gesture.

In some embodiments, a tap-and-a-half gesture comprises: a tap contact detected at a first location at a first time; and a press contact detected at a second location at a second time, wherein the second location is within a first predefined threshold distance of the first location, and the second time is within a first predefined threshold time of the first time, and wherein the press contact is maintained for greater than a second predefined threshold time.

In some embodiments, the processing unit 1006 is further configured to: after the press contact is maintained for greater than the second predefined threshold time, enable providing an auditory output (e.g., with auditory output enabling unit 1014) indicating the activation of volume adjustment mode.

In some embodiments, adjusting a volume setting comprises dynamically adjusting the volume setting while the contact is maintained.

In some embodiments, the movement of the first contact comprises movement in substantially opposite directions with respect to the predefined axis, such that the component increases and decreases during the movement.

In some embodiments, the processing unit 1006 is further configured to: while adjusting the volume setting, enable providing auditory output (e.g., with detecting unit 1014) indicating a current volume setting to which the volume setting is set.

In some embodiments, the current volume setting is output at the current volume setting.

In some embodiments, the volume setting is a volume setting of a screenreader mode.

In some embodiments, the touch-sensitive surface unit is a touch-sensitive display.

In some embodiments, the display is smaller than 3 inches by 3 inches.

The operations described above with reference to FIG. 8A-8B are, optionally, implemented by components depicted in FIGS. 1A-1B or FIG. 10. For example, detecting operation 804, activating operation 816, detecting operation 820, and adjusting operation 824 can optionally be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 can optionally utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium storing one or more programs comprising instructions, which when executed by an electronic device with a display, an audio output part, and a rotatable input mechanism, cause the electronic device to:
   display, on the display, a plurality of user interface objects in an ordered progression;
   display a visual highlight associated with a first user interface object of the plurality of user interface objects and produce auditory output associated with the first user interface object;
   while displaying the visual highlight, detect rotation of the rotatable input mechanism in a first rotational direction; and
   in response to detecting rotation of the rotatable input mechanism in the first rotational direction:
      in accordance with a determination that a rotary navigation mode is activated, display a visual highlight associated with a second user interface object of the plurality of user interface objects and produce auditory output associated with the second user interface object, wherein the second user interface object follows the first user interface object in the ordered progression, and wherein a rate of navigation or a quantity of traversed objects in the ordered progression to select the second user interface object has a non-linear relationship to the rate of rotation or angular displacement of the detected rotation of the rotatable input mechanism, and
      in accordance with a determination that the rotary navigation mode is not activated, maintain display of the visual highlight associated with the first user interface object without displaying a visual highlight associated with the second user interface object and without producing auditory output associated with the second user interface object.

2. The non-transitory computer-readable storage medium of claim 1, wherein the instructions further cause the electronic device to:
   while displaying the visual highlight associated with the second user interface object, detect rotation of the rotatable input mechanism in a second rotational direction substantially opposite the first rotational direction;
   in response to detecting rotation of the rotatable input mechanism in the second rotational direction:
      in accordance with the determination that the rotary navigation mode is activated, display a visual highlight associated with one of the first user interface object and a third user interface object of the plurality of user interface objects and produce auditory output associated with one of the first user interface object and the third user interface object, wherein the third user interface object precedes the second user interface object in the ordered progression; and
      in accordance with the determination that the rotary navigation mode is not activated, forgo displaying a visual highlight associated with either of the first or the third user interface objects and forgo producing auditory output associated with either of the first or the third user interface objects.

3. The non-transitory computer-readable storage medium of claim 2, wherein the second user interface object immediately follows the first user interface object in the ordered progression.

4. The non-transitory computer-readable storage medium of claim 3, wherein the third user interface object immediately precedes the second user interface object in the ordered progression.

5. The non-transitory computer-readable storage medium of claim 1,
wherein the instructions further cause the electronic device to:
detect a first touch input; and
in response to detecting the first touch input, activate the rotary navigation mode.

6. The non-transitory computer-readable storage medium of claim 1, wherein rotary navigation mode is a sub-mode of a screenreader mode.

7. The non-transitory computer-readable storage medium of claim 6, wherein the instructions further cause the electronic device to:
detect a depression input of the rotatable input mechanism;
in response to detecting the depression input of the rotatable input mechanism, activate the screenreader mode.

8. The non-transitory computer-readable storage medium of claim 3, wherein the instructions further cause the electronic device to:
while displaying a visual highlight associated with the first user interface object, detect a swipe input;
in response to detecting the swipe input:
if the swipe input is in a first predefined direction and comprises a first predefined number of contacts, display a visual highlight associated with the second user interface object and produce auditory output associated with the second user interface object; and
if the swipe input is in a second predefined direction that is substantially opposite the first predefined direction and comprises the first predefined number of contacts, display a visual highlight associated with one of the third user interface object and a fifth user interface object of the plurality of user interface objects and produce auditory output associated with one of the third user interface object and fifth user interface object, wherein one of the third user interface object and the fifth user interface object immediately precedes the first user interface object.

9. The non-transitory computer-readable storage medium of claim 8, wherein the first and second predefined directions are substantially horizontal with respect to the display of the electronic device.

10. The non-transitory computer-readable storage medium of claim 8, wherein the instructions further cause the electronic device to:
in response to detecting the swipe input:
if the swipe input is in a third predefined direction that is substantially orthogonal to the first predefined direction and comprises a second predefined number of contacts, produce auditory output associated with a first contextual action; and
if the swipe input is in a fourth predefined direction that is substantially opposite to the third predefined direction and comprises the second predefined number of contacts, produce auditory output associated with a second contextual action that precedes or follows the first contextual action in a second ordered progression.

11. The non-transitory computer-readable storage medium of claim 10, wherein the third and fourth predefined directions are substantially vertical with respect to the display of the electronic device.

12. The non-transitory computer-readable storage medium of claim 10, wherein the first and second contextual actions correspond to the first user interface object.

13. The non-transitory computer-readable storage medium of claim 10, wherein the first and second contextual actions correspond to a user interface that is displayed when the swipe input is detected.

14. The non-transitory computer-readable storage medium of claim 8, wherein the instructions further cause the electronic device to:
in response to detecting the swipe input, if the swipe input comprises a third predefined number of contacts, cease to display a first user interface and displaying a second user interface.

15. The non-transitory computer-readable storage medium of claim 1, wherein the instructions further cause the electronic device to:
detect a third touch input; and
in response to detecting the third touch input, activate a first function corresponding to a most recent auditory output.

16. The non-transitory computer-readable storage medium of claim 15, wherein the third touch input is detected at a location that does not correspond to a preselected user interface object or an activated function.

17. The non-transitory computer-readable storage medium of claim 1, wherein the rotatable input mechanism comprises a knob on a wrist-wearable device, the knob being rotatable about a single axis.

18. The non-transitory computer-readable storage medium of claim 1, wherein the rotatable input mechanism comprises a watch crown.

19. The non-transitory computer-readable storage medium of claim 1, wherein the rotatable input mechanism comprises a depressible button, depressible along an axis of rotation.

20. The non-transitory computer-readable storage medium of claim 1, wherein the display is smaller than 3 inches by 3 inches.

21. A method, comprising:
at an electronic device having a display, an audio output part, and a rotatable input mechanism:
displaying, on the display, a plurality of user interface objects in an ordered progression;
displaying a visual highlight associated with a first user interface object of the plurality of interface objects and producing auditory output associated with the first user interface object;
detecting rotation of the rotatable input mechanism in a first rotational direction; and
in response to detecting rotation of the rotatable input mechanism in the first rotational direction:
in accordance with a determination that a rotary navigation mode is activated, displaying a visual highlight associated with a second user interface object of the plurality of user interface objects and producing auditory output associated with the second user interface object, wherein the second user interface object follows the first user interface object in the ordered progression, and wherein a rate of navigation or a quantity of traversed objects in the ordered progression to select the second user interface object has a non-linear relationship to the rate of rotation or angular displacement of the detected rotation of the rotatable input mechanism, and in accordance with a determination that the rotary navigation mode is not activated, maintaining display of the visual highlight associated with the first user interface object without displaying a visual highlight associated with the second user interface object and producing auditory output associated with the second user interface object.

22. An electronic device comprising:
a display;
an audio output part;
a rotatable input mechanism;
one or more processors; and
memory storing instructions that, when executed by the one or more processors, cause the electronic device to:
   display, on the display, a plurality of user interface objects in an ordered progression;
   display a visual highlight associated with a first user interface object of the plurality of interface objects and producing auditory output associated with the first user interface object;
   detect rotation of the rotatable input mechanism in a first rotational direction; and
   in response to detecting rotation of the rotatable input mechanism in the first rotational direction:
      in accordance with a determination that a rotary navigation mode is activated, display a visual highlight associated with a second user interface object of the plurality of user interface objects and produce auditory output associated with the second user interface object, wherein the second user interface object follows the first user interface object in the ordered progression, and wherein a rate of navigation or a quantity of traversed objects in the ordered progression to select the second user interface object has a non-linear relationship to the rate of rotation or angular displacement of the detected rotation of the rotatable input mechanism,
      in accordance with a determination that the rotary navigation mode is not activated, maintain display of the visual highlight associated with the first user interface object without displaying a visual highlight associated with the second user interface object and producing auditory output associated with the second user interface object.

23. The method of claim 21, further comprising:
while displaying the visual highlight associated with the second user interface object, detecting rotation of the rotatable input mechanism in a second rotational direction substantially opposite the first rotational direction;
in response to detecting rotation of the rotatable input mechanism in the second rotational direction:
   in accordance with a determination that the rotary navigation mode is activated, displaying a visual highlight associated with one of the first user interface object and a third user interface object of the plurality of user interface objects and producing auditory output associated with one of the first user interface object and the third user interface object, wherein the third user interface object precedes the second user interface object in the ordered progression; and
   in accordance with a determination that the rotary navigation mode is not activated, forgo displaying a visual highlight associated with either of the first or the third user interface objects and forgo producing auditory output associated with either of the first or the third user interface objects.

24. The method of claim 23, wherein the second user interface object immediately follows the first user interface object in the ordered progression.

25. The method of claim 24, wherein the third user interface object immediately precedes the second user interface object in the ordered progression.

26. The method of claim 21, further comprising:
detecting a first touch input; and
in response to detecting the first touch input, activating the rotary navigation mode.

27. The method of claim 21, wherein rotary navigation mode is a sub-mode of a screenreader mode.

28. The method of claim 27, further comprising:
detecting a depression input of the rotatable input mechanism;
in response to detecting the depression input of the rotatable input mechanism, activating the screenreader mode.

29. The method of claim 24, further comprising:
while displaying a visual highlight associated with the first user interface object, detect a swipe input;
in response to detecting the swipe input:
   if the swipe input is in a first predefined direction and comprises a first predefined number of contacts, displaying a visual highlight associated with the second user interface object and producing auditory output associated with the second user interface object; and
   if the swipe input is in a second predefined direction that is substantially opposite the first predefined direction and comprises the first predefined number of contacts, displaying a visual highlight associated with one of the third user interface object and a fifth user interface object of the plurality of user interface objects and producing auditory output associated with one of the third user interface object and fifth user interface object, wherein one of the third user interface object and the fifth user interface object immediately precedes the first user interface object.

30. The method of claim 29, wherein the first and second predefined directions are substantially horizontal with respect to the display of the electronic device.

31. The method of claim 29, further comprising:
in response to detecting the swipe input:
   if the swipe input is in a third predefined direction that is substantially orthogonal to the first predefined direction and comprises a second predefined number of contacts, producing auditory output associated with a first contextual action; and
   if the swipe input is in a fourth predefined direction that is substantially opposite to the third predefined direction and comprises the second predefined number of contacts, producing auditory output associated with a second contextual action that precedes or follows the first contextual action in a second ordered progression.

32. The method of claim 31, wherein the third and fourth predefined directions are substantially vertical with respect to the display of the electronic device.

33. The method of claim 31, wherein the first and second contextual actions correspond to the first user interface object.

34. The method of claim 31, wherein the first and second contextual actions correspond to a user interface that is displayed when the swipe input is detected.

35. The method of claim 29, further comprising:
in response to detecting the swipe input, if the swipe input comprises a third predefined number of contacts, ceasing to display a first user interface and displaying a second user interface.

36. The method of claim 21, further comprising:
detecting a third touch input; and
in response to detecting the third touch input, activating a first function corresponding to a most recent auditory output.

37. The method of claim 36, wherein the third touch input is detected at a location that does not correspond to a pre-selected user interface object or an activated function.

38. The method of claim 21, wherein the rotatable input mechanism comprises a knob on a wrist-wearable device, the knob being rotatable about a single axis.

39. The method of claim 21, wherein the rotatable input mechanism comprises a watch crown.

40. The method of claim 21, wherein the rotatable input mechanism comprises a depressible button, depressible along an axis of rotation.

41. The method of claim 21, wherein the display is smaller than 3 inches by 3 inches.

42. The electronic device of claim 22, wherein the instructions further cause the electronic device to:
while displaying the visual highlight associated with the second user interface object, detect rotation of the rotatable input mechanism in a second rotational direction substantially opposite the first rotational direction;
in response to detecting rotation of the rotatable input mechanism in the second rotational direction:
in accordance with a determination that the rotary navigation mode is activated, display a visual highlight associated with one of the first user interface object and a third user interface object of the plurality of user interface objects and produce auditory output associated with one of the first user interface object and the third user interface object, wherein the third user interface object precedes the second user interface object in the ordered progression; and
in accordance with a determination that the rotary navigation mode is not activated, forgo displaying a visual highlight associated with either of the first or the third user interface objects and forgo producing auditory output associated with either of the first or the third user interface objects.

43. The electronic device of claim 22, wherein the second user interface object immediately follows the first user interface object in the ordered progression.

44. The electronic device of claim 43, wherein the third user interface object immediately precedes the second user interface object in the ordered progression.

45. The electronic device of claim 22, wherein the instructions further cause the electronic device to:
detect a first touch input; and
in response to detecting the first touch input, activate the rotary navigation mode.

46. The electronic device of claim 22, wherein rotary navigation mode is a sub-mode of a screenreader mode.

47. The electronic device of claim 46, wherein the instructions further cause the electronic device to:
detect a depression input of the rotatable input mechanism;
in response to detecting the depression input of the rotatable input mechanism, activate screenreader mode.

48. The electronic device of claim 43, wherein the instructions further cause the electronic device to:
while displaying a visual highlight associated with the first user interface object, detect a swipe input;
in response to detecting the swipe input:
if the swipe input is in a first predefined direction and comprises a first predefined number of contacts, display a visual highlight associated with the second user interface object and produce auditory output associated with the second user interface object; and
if the swipe input is in a second predefined direction that is substantially opposite the first predefined direction and comprises the first predefined number of contacts, display a visual highlight associated with one of the third user interface object and a fifth user interface object of the plurality of user interface objects and produce auditory output associated with one of the third user interface object and fifth user interface object, wherein one of the third user interface object and the fifth user interface object immediately precedes the first user interface object.

49. The electronic device of claim 48, wherein the first and second predefined directions are substantially horizontal with respect to the display of the electronic device.

50. The electronic device of claim 48, wherein the instructions further cause the electronic device to:
in response to detecting the swipe input:
if the swipe input is in a third predefined direction that is substantially orthogonal to the first predefined direction and comprises a second predefined number of contacts, produce auditory output associated with a first contextual action; and
if the swipe input is in a fourth predefined direction that is substantially opposite to the third predefined direction and comprises the second predefined number of contacts, produce auditory output associated with a second contextual action that precedes or follows the first contextual action in a second ordered progression.

51. The electronic device of claim 50, wherein the third and fourth predefined directions are substantially vertical with respect to the display of the electronic device.

52. The electronic device of claim 50, wherein the first and second contextual actions correspond to the first user interface object.

53. The electronic device of claim 50, wherein the first and second contextual actions correspond to a user interface that is displayed when the swipe input is detected.

54. The electronic device of claim 48, wherein the instructions further cause the electronic device to:
in response to detecting the swipe input, if the swipe input comprises a third predefined number of contacts, cease to display a first user interface and displaying a second user interface.

55. The electronic device of claim 22, wherein the instructions further cause the electronic device to:
  detect a third touch input; and
  in response to detecting the third touch input, activate a first function corresponding to a most recent auditory output.

56. The electronic device of claim 55, wherein the third touch input is detected at a location that does not correspond to a pre-selected user interface object or an activated function.

57. The electronic device of claim 22, wherein the rotatable input mechanism comprises a knob on a wrist-wearable device, the knob being rotatable about a single axis.

58. The electronic device of claim 22, wherein the rotatable input mechanism comprises a watch crown.

59. The electronic device of claim 22, wherein the rotatable input mechanism comprises a depressible button, depressible along an axis of rotation.

60. The electronic device of claim 22, wherein the display is smaller than 3 inches by 3 inches.

* * * * *